US012742025B2

(12) United States Patent
Tsuchiya et al.

(10) Patent No.: US 12,742,025 B2
(45) **Date of Patent: *Sep. 22, 2026**

(54) METHOD FOR MANUFACTURING PERFLUOROELASTOMER AQUEOUS DISPERSION, COMPOSITION, CROSSLINKABLE COMPOSITION, AND CROSSLINKED PRODUCT

(71) Applicant: DAIKIN INDUSTRIES, LTD., Osaka (JP)

(72) Inventors: Soushi Tsuchiya, Osaka (JP); Masaki Irie, Osaka (JP); Takuma Iwasaka, Osaka (JP); Rina Tamai, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 619 days.

This patent is subject to a terminal disclaimer.

(21) Appl. No.: 18/319,177

(22) Filed: May 17, 2023

(65) Prior Publication Data

US 2023/0303732 A1 Sep. 28, 2023

Related U.S. Application Data

(63) Continuation of application No. PCT/JP2021/042652, filed on Nov. 19, 2021.

(30) Foreign Application Priority Data

Nov. 19, 2020 (JP) ................................ 2020-192791
May 19, 2021 (JP) ................................ 2021-084877

(51) Int. Cl.

| | |
|---|---|
| ***C08F 116/14*** | (2006.01) |
| ***C08F 14/26*** | (2006.01) |
| ***C08F 214/26*** | (2006.01) |
| ***C08F 259/08*** | (2006.01) |
| ***C08F 261/06*** | (2006.01) |
| ***C08K 3/28*** | (2006.01) |
| ***C08K 5/57*** | (2006.01) |

(52) U.S. Cl.

CPC ............ *C08F 116/14* (2013.01); *C08F 14/26* (2013.01); *C08F 214/262* (2013.01); *C08F 259/08* (2013.01); *C08F 261/06* (2013.01); *C08K 3/28* (2013.01); *C08K 5/57* (2013.01)

(58) Field of Classification Search

CPC .... C08F 116/14; C08F 14/26; C08F 214/262; C08F 259/08; C08F 261/06; C08K 3/28; C08K 5/57

See application file for complete search history.

(56) References Cited

U.S. PATENT DOCUMENTS

| | | | | |
|---|---|---|---|---|
| 12,448,466 | B2 * | 10/2025 | Tsuchiya | C08F 14/185 |
| 2004/0087703 | A1 | 5/2004 | Kaspar et al. | |
| 2007/0004848 | A1 | 1/2007 | Hintzer et al. | |
| 2010/0160531 | A1 | 6/2010 | Leffew et al. | |
| 2015/0073111 | A1 * | 3/2015 | Hung | C08K 5/3492 526/247 |
| 2016/0347895 | A1 | 12/2016 | Morikawa et al. | |
| 2021/0108008 | A1 | 4/2021 | Kato et al. | |
| 2021/0403623 | A1 | 12/2021 | Shibasaki et al. | |
| 2022/0002531 | A1 | 1/2022 | Nanba et al. | |
| 2022/0282007 | A1 | 9/2022 | Yamanaka et al. | |
| 2022/0282008 | A1 | 9/2022 | Nanba et al. | |
| 2023/0101829 | A1 | 3/2023 | Kato et al. | |
| 2024/0317907 | A1 | 9/2024 | Kato et al. | |

FOREIGN PATENT DOCUMENTS

| | | | |
|---|---|---|---|
| CN | 110446723 | A | 11/2019 |
| JP | 11-181009 | A | 7/1999 |
| JP | 2008-545873 | A | 12/2008 |
| JP | 2012-513532 | A | 6/2012 |
| RU | 2 342 403 | C2 | 12/2008 |
| WO | 2004/067588 | A1 | 8/2004 |
| WO | 2006/135825 | A1 | 12/2006 |
| WO | 2012/082707 | A1 | 6/2012 |
| WO | 2015/125726 | A1 | 8/2015 |
| WO | 2018/167190 | A1 | 9/2018 |
| WO | 2020/105651 | A1 | 5/2020 |
| WO | 2020/196779 | A1 | 10/2020 |
| WO | 2021/100835 | A1 | 5/2021 |
| WO | 2021/100836 | A1 | 5/2021 |

OTHER PUBLICATIONS

Machine English translation of WO 2020/105651, Nanba et al., May 28, 2020.*
International Preliminary Report on Patentability and translation of the Written Opinion dated May 16, 2023 issued by the International Searching Authority in International Application No. PCT/JP2021/042652.
International Search Report for PCT/JP2021/042652 dated Jan. 11, 2022 (PCT/ISA/210).
Extended European Search Report issued Sep. 16, 2024 in European Application No. 21894761.2.

* cited by examiner

*Primary Examiner* — Patrick D Niland
(74) *Attorney, Agent, or Firm* — Sughrue Mion, PLLC

(57) ABSTRACT

The present disclosure provides a method for producing a perfluoroelastomer aqueous dispersion by polymerizing a perfluoromonomer in the presence of a polymer (1) and an aqueous medium to produce an aqueous dispersion of a perfluoroelastomer, the polymer (1) containing a polymerization unit (1) based on a monomer (1) represented by a general formula (1) and the polymer (1) having an ion exchange capacity of 1.50 meq/g or more.

24 Claims, No Drawings

METHOD FOR MANUFACTURING PERFLUOROELASTOMER AQUEOUS DISPERSION, COMPOSITION, CROSSLINKABLE COMPOSITION, AND CROSSLINKED PRODUCT

CROSS-REFERENCE TO RELATED APPLICATIONS

This application is a Rule 53(b) Continuation of International Application No. PCT/JP2021/042652 filed Nov. 19, 2021, which claims priorities based on Japanese Patent Application No. 2020-192791 filed Nov. 19, 2020 and Japanese Patent Application No. 2021-084877 filed May 19, 2021, the respective disclosures of which are incorporated herein by reference in their entirety.

TECHNICAL FIELD

The present disclosure relates to a method for producing a perfluoroelastomer aqueous dispersion, a composition, a crosslinkable composition, and a crosslinked product.

BACKGROUND ART

As a method for producing a perfluoroelastomer, for example, Patent Document 1 proposes a method for producing a perfluoroelastomer aqueous dispersion characterized in that the production method includes subjecting a perfluoromonomer to emulsion polymerization in an aqueous medium to obtain an aqueous dispersion containing perfluoroelastomer particles in the presence of 2 parts by mass or more of a fluorine-containing surfactant represented by the following general formula (1) based on 100 parts by mass of the aqueous medium.

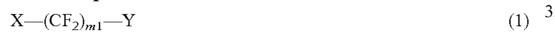

$$X—(CF_2)_{m1}—Y \quad (1)$$

(In the formula, X represents H or F, m1 represents an integer of 3 to 6, and Y represents $—SO_3M$, $—SO_4M$, $—SO_3R$, $—SO_4R$, —COOM, $—PO_3M_2$, or $—PO_4M_2$ (M represents H, $NH_4$, or an alkali metal and R represents an alkyl group having 1 to 12 carbon atoms).)

CITATION LIST

Patent Document

Patent Document 1: International Publication No. WO 2015/125726

SUMMARY

According to the present disclosure, provided is a method for producing a perfluoroelastomer aqueous dispersion by polymerizing a perfluoromonomer in the presence of a polymer (1) and an aqueous medium to produce an aqueous dispersion of a perfluoroelastomer, the polymer (1) containing a polymerization unit (1) based on a monomer (1) represented by a general formula (1) and the polymer (1) having an ion exchange capacity of 1.50 meq/g or more.

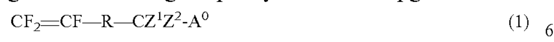

$$CF_2{=}CF—R—CZ^1Z^2\text{-}A^0 \quad (1)$$

(In the formula, R is a linking group, $Z^1$ and $Z^2$ are each independently F or $CF_3$, and $A^0$ is an anionic group.)

Effects

According to the present disclosure, it is possible to provide a method for producing a perfluoroelastomer aqueous dispersion, the production method being capable of generating a sufficient number of perfluoroelastomer particles at a sufficient polymerization rate while suppressing adhesion of the perfluoroelastomer to a polymerization tank.

DESCRIPTION OF EMBODIMENTS

Before describing the present disclosure in detail, some terms used in the present disclosure will be defined or described.

In the present disclosure, the term "fluoroelastomer" refers to an amorphous fluoropolymer. The term "amorphous" means that a fluoropolymer has a melting peak (ΔH) of 4.5 J/g or lower as determined by differential scanning calorimetry (DSC) (temperature-increasing rate: 10° C./min) or differential thermal analysis (DTA) (temperature-increasing rate: 10° C./min). The fluoroelastomer exhibits elastomeric characteristics when crosslinked. The elastomeric characteristics means characteristics by which the polymer can be stretched and it can retain its original length when the force required to stretch the polymer is no longer applied.

In the present disclosure, the term "partially fluorinated elastomer" refers to a fluoropolymer comprising a fluoromonomer unit and having a perfluoromonomer unit content of less than 90 mol % based on all polymerization units, wherein the fluoropolymer has a glass transition temperature of 20° C. or lower and has a melting peak (ΔH) of 4.5 J/g or lower.

In the present disclosure, the term "perfluoroelastomer" refers to a fluoropolymer having a perfluoromonomer unit content of 90 mol % or more, preferably 91 mol % or more, based on all polymerization units, wherein the fluoropolymer has a glass transition temperature of 20° C. or lower, has a melting peak (ΔH) of 4.5 J/g or lower, and further has a fluorine atom concentration in the fluoropolymer of 71% by mass or more, preferably 71.5% by mass or more. In the present disclosure, the fluorine atom concentration in the fluoropolymer is determined by calculation of the fluorine atom concentration (% by mass) in the fluoropolymer from the type and content of each monomer constituting the fluoropolymer.

In the present disclosure, the term "perfluoromonomer" refers to a monomer that is free from a carbon atom-hydrogen atom bond in the molecule. In addition to carbon atoms and fluorine atoms, the perfluoromonomer described above may be a monomer in which some fluorine atoms bonded to carbon atoms are replaced with chlorine atoms, or may be a monomer having a nitrogen atom, an oxygen atom, a sulfur atom, a phosphorus atom, a boron atom, or a silicon atom in addition to carbon atoms. It is preferable that the perfluoromonomer described above is a monomer in which all hydrogen atoms are replaced with fluorine atoms. The perfluoromonomer described above does not include a monomer that provides a crosslinking site.

The term "monomer that provides a crosslinking site" refers to a monomer having a crosslinkable group that provides the fluoropolymer with a crosslinking site to form crosslinking by a curing agent (cure site monomer).

In the present disclosure, the content of each monomer constituting the perfluoroelastomer can be calculated by combining NMR, FT-IR, elemental analysis, fluorescent X-ray analysis, and other known methods as appropriate depending on the type of monomer.

In the present disclosure, the term "organic group" refers to a group containing one or more carbon atoms or a group formed by removing one hydrogen atom from an organic compound.

Examples of the "organic group" include:

an alkyl group optionally having one or more substituents;
an alkenyl group optionally having one or more substituents;
an alkynyl group optionally having one or more substituents;
a cycloalkyl group optionally having one or more substituents;
a cycloalkenyl group optionally having one or more substituents;
a cycloalkadienyl group optionally having one or more substituents;
an aryl group optionally having one or more substituents;
an aralkyl group optionally having one or more substituents;
a non-aromatic heterocyclic group optionally having one or more substituents;
a heteroaryl group optionally having one or more substituents;
a cyano group;
a formyl group;
RaO—;
RaCO—;
$RaSO_2$—;
RaCOO—;
RaNRaCO—;
RaCONRa—;
RaOCO—;
$RaOSO_2$—; and
$RaNRbSO_2$—
(in these formulas, Ra is each independently
an alkyl group optionally having one or more substituents,
an alkenyl group optionally having one or more substituents,
an alkynyl group optionally having one or more substituents,
a cycloalkyl group optionally having one or more substituents,
a cycloalkenyl group optionally having one or more substituents,
a cycloalkadienyl group optionally having one or more substituents,
an aryl group optionally having one or more substituents,
an aralkyl group optionally having one or more substituents,
a non-aromatic heterocyclic group optionally having one or more substituents, or
a heteroaryl group optionally having one or more substituents, and
Rb is independently H or an alkyl group optionally having one or more substituents).

The organic group described above is preferably an alkyl group optionally having one or more substituents.

Also, in the present disclosure, the term "substituent" refers to a group that is capable of replacing another atom or group. Examples of the "substituent" include an aliphatic group, an aromatic group, a heterocyclic group, an acyl group, an acyloxy group, an acylamino group, an aliphatic oxy group, an aromatic oxy group, a heterocyclic oxy group, an aliphatic oxycarbonyl group, an aromatic oxycarbonyl group, a heterocyclic oxycarbonyl group, a carbamoyl group, an aliphatic sulfonyl group, an aromatic sulfonyl group, a heterocyclic sulfonyl group, an aliphatic sulfonyloxy group, an aromatic sulfonyloxy group, a heterocyclic sulfonyloxy group, a sulfamoyl group, an aliphatic sulfonamide group, an aromatic sulfonamide group, a heterocyclic sulfonamide group, an amino group, an aliphatic amino group, an aromatic amino group, a heterocyclic amino group, an aliphatic oxycarbonylamino group, an aromatic oxycarbonylamino group, a heterocyclic oxycarbonylamino group, an aliphatic sulfinyl group, an aromatic sulfinyl group, an aliphatic thio group, an aromatic thio group, a hydroxy group, a cyano group, a sulfo group, a carboxy group, an aliphatic oxyamino group, an aromatic oxyamino group, a carbamoylamino group, a sulfamoylamino group, a halogen atom, a sulfamoylcarbamoyl group, a carbamoylsulfamoyl group, a dialiphatic oxyphosphinyl group, and a diaromatic oxyphosphinyl group.

The aliphatic group described above may be saturated or unsaturated, and may have a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic group described above include alkyl groups having 1 to 8, preferably 1 to 4, carbon atoms in total, such as a methyl group, an ethyl group, a vinyl group, a cyclohexyl group, and a carbamoylmethyl group.

The aromatic group described above may have, for example, a nitro group, a halogen atom, an aliphatic oxy group, a carbamoyl group, an aliphatic oxycarbonyl group, an aliphatic thio group, an amino group, an aliphatic amino group, an acylamino group, a carbamoylamino group, or the like. Examples of the aromatic group described above include aryl groups having 6 to 12 carbon atoms, preferably 6 to 10 carbon atoms in total, such as a phenyl group, a 4-nitrophenyl group, a 4-acetylaminophenyl group, and a 4-methanesulfonylphenyl group.

The heterocyclic group described above may have a halogen atom, a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the heterocyclic group described above include 5- or 6-membered heterocyclic groups having 2 to 12, preferably 2 to 10, carbon atoms in total, such as a 2-tetrahydrofuryl group and a 2-pyrimidyl group.

The acyl group described above may have an aliphatic carbonyl group, an arylcarbonyl group, a heterocyclic carbonyl group, a hydroxy group, a halogen atom, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the acyl group described above include acyl groups having 2 to 8, preferably 2 to 4, carbon atoms in total, such as an acetyl group, a propanoyl group, a benzoyl group, and a 3-pyridinecarbonyl group.

The acylamino group described above may have an aliphatic group, an aromatic group, a heterocyclic group, or the like, and may have, for example, an acetylamino group, a benzoylamino group, a 2-pyridinecarbonylamino group, a propanoylamino group, or the like. Examples of the acylamino group described above include acylamino groups having 2 to 12, preferably 2 to 8, carbon atoms in total, and alkylcarbonylamino groups having 2 to 8 carbon atoms in total, such as an acetylamino group, a benzoylamino group, a 2-pyridinecarbonylamino group, and a propanoylamino group.

The aliphatic oxycarbonyl group described above may be saturated or unsaturated, and may have a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic oxycarbonyl group described above include alkoxycarbonyl groups having 2 to 8, preferably 2 to 4, carbon atoms in total, such as a methoxycarbonyl group, an ethoxycarbonyl group, and a (t)-butoxycarbonyl group.

The carbamoyl group described above may have an aliphatic group, an aromatic group, a heterocyclic group, or the like. Examples of the carbamoyl group described above include an unsubstituted carbamoyl group and alkylcarbamoyl groups having 2 to 9 carbon atoms in total, preferably an unsubstituted carbamoyl group and alkylcarbamoyl groups having 2 to 5 carbon atoms in total, such as a N-methylcarbamoyl group, a N,N-dimethylcarbamoyl group, and a N-phenylcarbamoyl group.

The aliphatic sulfonyl group described above may be saturated or unsaturated, and may have a hydroxy group, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic sulfonyl group described above include alkylsulfonyl groups having 1 to 6 carbon atoms in total, preferably 1 to 4 carbon atoms in total, such as a methanesulfonyl group.

The aromatic sulfonyl group described above may have a hydroxy group, an aliphatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aromatic sulfonyl group described above include arylsulfonyl groups having 6 to 10 carbon atoms in total, such as a benzenesulfonyl group.

The amino group described above may have an aliphatic group, an aromatic group, a heterocyclic group, or the like.

The acylamino group described above may have, for example, an acetylamino group, a benzoylamino group, a 2-pyridinecarbonylamino group, a propanoylamino group, or the like. Examples of the acylamino group described above include acylamino groups having 2 to 12 carbon atoms in total, preferably 2 to 8 carbon atoms in total, and more preferably alkylcarbonylamino groups having 2 to 8 carbon atoms in total, such as an acetylamino group, a benzoylamino group, a 2-pyridinecarbonylamino group, and a propanoylamino group.

The aliphatic sulfonamide group, aromatic sulfonamide group, and heterocyclic sulfonamide group described above may be, for example, a methanesulfonamide group, a benzenesulfonamide group, a 2-pyridinesulfonamide group, respectively.

The sulfamoyl group described above may have an aliphatic group, an aromatic group, a heterocyclic group, or the like. Examples of the sulfamoyl group described above include a sulfamoyl group, alkylsulfamoyl groups having 1 to 9 carbon atoms in total, dialkylsulfamoyl groups having 2 to 10 carbon atoms in total, arylsulfamoyl groups having 7 to 13 carbon atoms in total, and heterocyclic sulfamoyl groups having 2 to 12 carbon atoms in total, more preferably a sulfamoyl group, alkylsulfamoyl groups having 1 to 7 carbon atoms in total, dialkylsulfamoyl groups having 3 to 6 carbon atoms in total, arylsulfamoyl groups having 6 to 11 carbon atoms in total, and heterocyclic sulfamoyl groups having 2 to 10 carbon atoms in total, such as a sulfamoyl group, a methylsulfamoyl group, a N,N-dimethylsulfamoyl group, a phenylsulfamoyl group, and a 4-pyridinesulfamoyl group.

The aliphatic oxy group described above may be saturated or unsaturated, and may have a methoxy group, an ethoxy group, an i-propyloxy group, a cyclohexyloxy group, a methoxyethoxy group, or the like. Examples of the aliphatic oxy group described above include alkoxy groups having 1 to 8, preferably 1 to 6, carbon atoms in total, such as a methoxy group, an ethoxy group, an i-propyloxy group, a cyclohexyloxy group, and a methoxyethoxy group.

The aromatic amino group and heterocyclic amino group described above may each have an aliphatic group, an aliphatic oxy group, a halogen atom, a carbamoyl group, a heterocyclic group ring-fused with the aryl group, and an aliphatic oxycarbonyl group, preferably an aliphatic group having 1 to 4 carbon atoms in total, an aliphatic oxy group having 1 to 4 carbon atoms in total, a halogen atom, a carbamoyl group having 1 to 4 carbon atoms in total, a nitro group, or an aliphatic oxycarbonyl group having 2 to 4 carbon atoms in total.

The aliphatic thio group described above may be saturated or unsaturated, and examples thereof include alkylthio groups having 1 to 8 carbon atoms in total, more preferably 1 to 6 carbon atoms in total, such as a methylthio group, an ethylthio group, a carbamoylmethylthio group, and a t-butylthio group.

The carbamoylamino group described above may have an aliphatic group, an aryl group, a heterocyclic group, or the like. Examples of the carbamoylamino group described above include a carbamoylamino group, alkylcarbamoylamino groups having 2 to 9 carbon atoms in total, dialkylcarbamoylamino groups having 3 to 10 carbon atoms in total, arylcarbamoylamino groups having 7 to 13 carbon atoms in total, and heterocyclic carbamoylamino groups having 3 to 12 carbon atoms in total, preferably a carbamoylamino group, alkylcarbamoylamino groups having 2 to 7 carbon atoms in total, dialkylcarbamoylamino groups having 3 to 6 carbon atoms in total, arylcarbamoylamino groups having 7 to 11 carbon atoms in total, and heterocyclic carbamoylamino groups having 3 to 10 carbon atoms in total, such as a carbamoylamino group, a methylcarbamoylamino group, a N,N-dimethylcarbamoylamino group, a phenylcarbamoylamino group, and a 4-pyridinecarbamoylamino group.

In the present disclosure, a range represented by endpoints includes all numerical values that fall within that range (for example, 1 to 10 includes 1.4, 1.9, 2.33, 5.75, 9.98, and the like).

In the present disclosure, the description of "at least 1" includes all numerical values of 1 or more (for example, at least 2, at least 4, at least 6, at least 8, at least 10, at least 25, at least 50, at least 100, and the like).

Hereinafter, specific embodiments of the present disclosure will be described in detail, but the present disclosure is not limited to the following embodiments.

The present disclosure relates to a method for producing a perfluoroelastomer aqueous dispersion by polymerizing a perfluoromonomer in the presence of a polymer (1) and an aqueous medium to produce an aqueous dispersion of a perfluoroelastomer.

The polymer (1) used in the production method of the present disclosure contains a polymerization unit (1) based on a monomer (1) represented by a general formula (1).

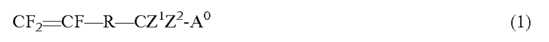

$$CF_2{=}CF{-}R{-}CZ^1Z^2{-}A^0 \quad (1)$$

(In the formula, R is a linking group, $Z^1$ and $Z^2$ are each independently F or $CF_3$, and $A^0$ is an anionic group.)

Furthermore, the polymer (1) used in the production method of the present disclosure has an ion exchange capacity of 1.50 meq/g or more.

The production method of the present disclosure comprises polymerizing a perfluoromonomer in the presence of the polymer (1) and an aqueous medium, and thus can generate a sufficient number of perfluoroelastomer particles at a sufficient polymerization rate while suppressing adhesion of the perfluoroelastomer to a polymerization tank. Furthermore, according to the production method of the present disclosure, it is possible to produce a perfluoroelastomer that exhibits excellent compression set properties even at very high temperatures.

The ion exchange capacity of the polymer (1) is, in an increasing order of preference, 1.50 meq/g or more, 1.75 meq/g or more, 2.00 meq/g or more, 2.40 meq/g or more, 2.50 meq/g or more, 2.60 meq/g or more, 3.00 meq/g or more, 3.20 meq/g or more, or 3.50 meq/g or more. The ion exchange capacity is the content of ionic groups (anionic groups) in the polymer (1) and can be determined by calculation from the compositional features of the polymer (1). A precursor group that becomes ionic by hydrolysis (such as $-COOCH_3$) is not regarded as an ionic group for the purpose of determining the ion exchange capacity. It is conjectured that the higher the ion exchange capacity of the polymer (1), the more anionic groups in the polymer (1), the more stable particles are formed, and due to high particle formability, the number of particles per unit amount of water is increased, thus resulting in a higher polymerization rate. When the ion exchange capacity of the polymer (1) is too low, the perfluoroelastomer produced by the polymerization may adhere to the polymerization tank, a sufficient polymerization rate may not be achieved, or the number of perfluoroelastomer particles generated may be small.

In the production method of the present disclosure, one or two or more monomers can be used as the monomer (1) represented by the general formula (1).

In the present disclosure, the anionic group includes a functional group that imparts an anionic group, for example, an acid group such as $-COOH$ and an acid base such as $-COONH_4$, in addition to anionic groups such as a sulfate group and a carboxylate group. The anionic group is preferably a sulfate group, a carboxylate group, a phosphate group, a phosphonate group, a sulfonate group, or $-C(CF_3)_2OM$ (in the formula, M is $-H$, a metal atom, $-NR^7_4$, imidazolium optionally having a substituent, pyridinium optionally having a substituent, or phosphonium optionally having a substituent and $R^7$ is H or an organic group).

R is a linking group. In the present disclosure, the term "linking group" refers to a divalent linking group. The linking group may be a single bond and preferably contains at least one carbon atom, and the number of carbon atoms may be 2 or more, 4 or more, 8 or more, 10 or more, or 20 or more. The upper limit is not limited, and may be 100 or less, and may be 50 or less, for example.

The linking group may be linear or branched, cyclic or acyclic, saturated or unsaturated, substituted or unsubstituted, and optionally contains one or more heteroatoms selected from the group consisting of sulfur, oxygen, and nitrogen, and optionally contains one or more functional groups selected from the group consisting of ester, amide, sulfonamide, carbonyl, carbonate, urethane, urea, and carbamate. The linking group described above may be free from carbon atoms and may be a catenary heteroatom such as oxygen, sulfur, or nitrogen.

It is preferable that R is a catenary heteroatom such as oxygen, sulfur, or nitrogen, or a divalent organic group.

When R is a divalent organic group, a hydrogen atom bonded to a carbon atom may be replaced with a halogen other than fluorine, such as chlorine, and the divalent organic group may or may not contain a double bond. Furthermore, R may be linear or branched, and may be cyclic or acyclic. R may also contain a functional group (for example, ester, ether, ketone (a keto group), amine, halide, or the like).

Furthermore, R may be a fluorine-free divalent organic group, or may be a partially fluorinated or perfluorinated divalent organic group.

R may be, for example, a hydrocarbon group in which a fluorine atom is not bonded to a carbon atom, a hydrocarbon group in which some of the hydrogen atoms bonded to carbon atoms are replaced with fluorine atoms, or a hydrocarbon group in which all of the hydrogen atoms bonded to carbon atoms are replaced with fluorine atoms, and these groups optionally contain an oxygen atom, optionally contain a double bond, and optionally contain a functional group.

R is preferably a hydrocarbon group having 1 to 100 carbon atoms that optionally contains an ether bond or a keto group, wherein some or all of the hydrogen atoms bonded to carbon atoms in the hydrocarbon group may be replaced with fluorine.

R is preferably at least one selected from $-(CH_2)_a-$, $-(CF_2)_a-$, $-O-(CF_2)_a-$, $-(CF_2)_a-O-(CF_2)_b-$, $-O(CF_2)_a-O-(CF_2)_b-$, $-(CF_2)_a-[O-(CF_2)_b]_c-$, $-O(CF_2)_a-[O-(CF_2)_b]_c-$, $-[(CF_2)_a-O]_b-[(CF_2)_c-O]_d-$, $-O[(CF_2)_a-O]_b-$, $-O[(CF_2)_a-O]_b-[(CF_2)_c-O]_d-$, $-O-[CF_2CF(CF_3)O]_a-(CF_2)_b-$, $-O-(CF_2)_a-O-[CF(CF_3)CF_2O]_b-O-$, $-O-[CF_2CF(CF_3)O]_a-(CF_2)_b-O-$, $-O-[CF_2CF(CF_3)O]_a-(CF_2)_b-O-[CF(CF_3)CF_2O]_c-O-$, $-[CF_2CF(CF_3)O]_a-$, $-[CF(CF_3)CF_2O]_a-$, $-(CF_2)_a-O-[CF(CF_3)CF_2O]_a-$, $-(CF_2)_a-O-[CF(CF_3)CF_2O]_a-(CF_2)_b-$, $-[CF_2CF(CF_3)]_a-CO-(CF_2)_b-$, and combinations thereof.

In the formulas, a, b, c, and d are each independently at least 1 or more. a, b, c, and d may each independently be 2 or more, 3 or more, 4 or more, 10 or more, or 20 or more. The upper limits of a, b, c, and d are, for example, 100.

R is more preferably at least one selected from $-O-CF_2-$, $-O-CF_2CF_2-$, $-O-CF_2CF_2-O-$, $-O-CF_2CF_2CF_2-$, $-O-CF_2CF_2CF_2-O-$, $-O-CF_2CF(CF_3)-O-$, $-O-CF_2CF_2-O-CF(CF_3)CF_2-O-$, $-O-CF_2CF(CF_3)-O-CF_2CF_2-O-$, and $-O-CF_2CF(CF_3)-O-CF_2-$.

R is preferably a divalent group represented by a general formula (r1):

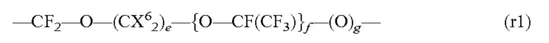

$$-CF_2-O-(CX^6_2)_e-\{O-CF(CF_3)\}_f-(O)_g- \quad (r1)$$

(in the formula, $X^6$ is each independently H, F, or $CF_3$; e is an integer of 0 to 3; f is an integer of 0 to 3; and g is 0 or 1), and more preferably a divalent group represented by a general formula (r2):

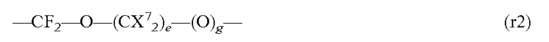

$$-CF_2-O-(CX^7_2)_e-(O)_g- \quad (r2)$$

(in the formula, $X^7$ is each independently H, F, or $CF_3$; e is an integer of 0 to 3; and g is 0 or 1).

Specific suitable examples of R include $-CF_2-O-CF_2-$, $-CF_2-O-CH_2-$, $-CF_2-O-CH_2CF_2-$, $-CF_2-O-CF_2CF_2-$, $-CF_2-O-CF_2CH_2-$, $-CF_2-$ $O—CF_2CF_2CH_2—$, $—CF_2—O—CF(CF_3)—$, $—CF_2—O—CF(CF_3)CF_2—$, $—CF_2—O—CF(CF_3)CF_2—O—$, $—CF_2—O—CF(CF_3)CF_2—O—CF_2—$, and $—CF_2—O—CF(CF_3)CH_2—$. In particular, R is preferably a perfluoroalkylene group optionally containing an oxygen atom, and specifically, $—CF_2—O—$, $—CF_2—O—CF_2—$, $—CF_2—O—CF_2CF_2—$, $—CF_2—O—CF(CF_3)—$, $—CF_2—O—CF(CF_3)CF_2—$, and $—CF_2—O—CF(CF_3)CF_2—O—$ are preferred.

$—R—CZ^1Z^2—$ in the general formula (1) is preferably one represented by a general formula (s1):

$$—CF_2—O—(CX^6{}_2)_e—\{O—CF(CF_3)\}_f—(O)_g—CZ^1Z^2— \quad (s1)$$

(in the formula, $X^6$ is each independently H, F, or $CF_3$; e is an integer of 0 to 3; f is an integer of 0 to 3; g is 0 or 1; and $Z^1$ and $Z^2$ are each independently F or $CF_3$), and in the formula (s1), it is more preferable that one of $Z^1$ and $Z^2$ is F and the other is $CF_3$.

Furthermore, $—R—CZ^1Z^2—$ in the general formula (1) is preferably one represented by a general formula (s2):

$$—CF_2—O—(CX^7{}_2)_e—(O)_g—CZ^1Z^2— \quad (s2)$$

(in the formula, $X^7$ is each independently H, F, or $CF_3$; e is an integer of 0 to 3; g is 0 or 1; and $Z^1$ and $Z^2$ are each independently F or $CF_3$), and in the formula (s2), it is more preferable that one of $Z^1$ and $Z^2$ is F and the other is $CF_3$.

$—R—CZ^1Z^2—$ in the general formula (1) is preferably $—O—CF_2CF_2—$, $—O—CF_2CF_2CF_2—$, $—O—CF_2CF_2CF_2CF_2—$, $—O—CF_2CF(CF_3)—O—CF_2—$, $—O—CF_2CF(CF_3)—O—CF_2CF_2—$, $—CF_2—O—CF_2—$, $—CF_2—O—CF(CF_3)—$, $—CF_2—O—C(CF_3)_2—$, $—CF_2—O—CF_2—CF_2—$, $—CF_2—O—CF_2—CF(CF_3)—$, $—CF_2—O—CF_2—C(CF_3)_2—$, $—CF_2—O—CF_2CF_2—CF_2—$, $—CF_2—O—CF_2CF_2—CF(CF_3)—$, $—CF_2—O—CF_2CF_2—C(CF_3)_2—$, $—CF_2—O—CF(CF_3)—CF_2—$, $—CF_2—O—CF(CF_3)—CF(CF_3)—$, $—CF_2—O—CF(CF_3)—C(CF_3)_2—$, $—CF_2—O—CF(CF_3)CF_2—CF_2—$, $—CF_2—O—CF(CF_3)CF_2—CF(CF_3)—$, $—CF_2—O—CF(CF_3)CF_2—C(CF_3)_2—$, $—CF_2—O—CF(CF_3)CF_2—O—CF_2—$, $—CF_2—O—CF(CF_3)CF_2—O—CF(CF_3)—$, or $—CF_2—O—CF(CF_3)CF_2—O—C(CF_3)_2—$, more preferably $—O—CF_2CF_2—$, $—O—CF_2CF_2CF_2—$, $—O—CF_2CF_2CF_2CF_2—$, $—O—CF_2CF(CF_3)—O—CF_2—$, $—O—CF_2CF(CF_3)—O—CF_2CF_2—$, $—CF_2—O—CF(CF_3)—$, $—CF_2—O—CF_2—CF(CF_3)—$, $—CF_2—O—CF_2CF_2—CF(CF_3)—$, $—CF_2—O—CF(CF_3)—CF(CF_3)—$, $—CF_2—O—CF(CF_3)CF_2—CF(CF_3)—$, or $—CF_2—O—CF(CF_3)CF_2—O—CF(CF_3)—$, and still more preferably $—O—CF_2CF_2—$ or $—O—CF_2CF(CF_3)—O—CF_2CF_2—$.

It is also preferable that the polymer (1) be highly fluorinated. Except for the anionic group ($A^0$) such as a phosphate group moiety (such as $CH_2OP(O)(OM)_2$) or a sulfate group moiety (such as $CH_2OS(O)_2OM$), it is preferable that 80% or more, 90% or more, 95% or more, or 100% of the C—H bonds in the polymer (1) is replaced with C—F bonds.

It is also preferable that the monomer (1) and the polymer (1) have a C—F bond and do not have a C—H bond, in the portion excluding the anionic group ($A^0$). In other words, in the general formula (1), it is preferable that R is a perfluoroalkylene group having one or more carbon atoms, and the perfluoroalkylene group described above may be either linear or branched, may be either cyclic or acyclic, and may contain at least one catenary heteroatom. The perfluoroalkylene group described above may have 2 to 20 carbon atoms or 4 to 18 carbon atoms.

The monomer (1) and the polymer (1) may be partially fluorinated. In other words, it is also preferable that the monomer (1) and the polymer (1) have at least one hydrogen atom bonded to a carbon atom and at least one fluorine atom bonded to a carbon atom, in the portion excluding the anionic group ($A^0$).

The anionic group ($A^0$) may be $—SO_3M$, $—OSO_3M$, $—COOM$, $—SO_2NR'CH_2COOM$, $—CH_2OP(O)(OM)_2$, $[—CH_2O]_2P(O)(OM)$, $—CH_2CH_2OP(O)(OM)_2$, $[—CH_2CH_2O]_2P(O)(OM)$, $—CH_2CH_2OSO_3M$, $—P(O)(OM)_2$, $—SO_2NR'CH_2CH_2OP(O)(OM)_2$, $[—SO_2NR'CH_2CH_2O]_2P(O)(OM)$, $—CH_2OSO_3M$, $—SO_2NR'CH_2CH_2OSO_3M$, or $—C(CF_3)_2OM$. In particular, $—SO_3M$, $—OSO_3M$, $—COOM$, $—P(O)(OM)_2$, or $—C(CF_3)_2OM$ is preferred, $—COOM$, $—SO_3M$, $—OSO_3M$, or $—C(CF_3)_2OM$ is more preferred, $—SO_3M$, $—COOM$, or $—P(O)(OM)_2$ is still more preferred, $—SO_3M$ or $—COOM$ is particularly preferred, and $—COOM$ is most preferred. The polymer (1) may be a polymer containing both a polymerization unit (1) in which A is $—COOM$ and a polymerization unit (1) in which A is $—SO_3M$.

M is H, a metal atom, $NR^7{}_4$, imidazolium optionally having a substituent, pyridinium optionally having a substituent, or phosphonium optionally having a substituent, and $R^7$ is H or an organic group.

Examples of the metal atom include an alkali metal (Group 1) and an alkaline earth metal (Group 2), and Na, K, or Li is preferred.

M is preferably H, a metal atom, or $NR^7{}_4$, more preferably H, an alkali metal (Group 1), an alkaline earth metal (Group 2), or $NR^7{}_4$, still more preferably H, Na, K, Li, or $NH_4$, further preferably H, Na, K, or $NH_4$, particularly preferably H or $NH_4$, and most preferably H.

It is also preferable that the monomer (1) is a monomer represented by a general formula (1a).

It is also preferable that the polymer (1) is a polymer containing a polymerization unit (1a) based on a monomer represented by the general formula (1a).

$$CF_2{=}CF—O—Rf^0\text{-}A^0 \quad (1a)$$

(In the formula, $A^0$ is an anionic group, and $Rf^0$ is a perfluorinated divalent linking group that is perfluorinated, that may be linear or branched, cyclic or acyclic, saturated or unsaturated, and substituted or unsubstituted, and that optionally contains one or more heteroatoms selected from the group consisting of sulfur, oxygen, and nitrogen.)

It is preferable that $Rf^0$ is a fluorine-containing alkylene group having 1 to 40 carbon atoms or a fluorine-containing alkylene group having 2 to 100 carbon atoms and having an ether bond. The fluorine-containing alkylene group having 2 to 100 carbon atoms and having an ether bond described above is an alkylene group that does not include a structure in which an oxygen atom is an end and that contains an ether bond between carbon atoms.

In a preferred embodiment, $A^0$ in the general formula (1) is a sulfate group. $A^0$ is, for example, $—CH_2OSO_3M$, $—CH_2CH_2OSO_3M$, or $—SO_2NR'CH_2CH_2OSO_3M$, wherein R' is H or an alkyl group having 1 to 4 carbon atoms, and M is as described above.

When $A^0$ is a sulfate group, examples of the monomer represented by the general formula (1) include $CF_2{=}CF(OCF_2CF_2CH_2OSO_3M)$, $CF_2{=}CF(O(CF_2)_4CH_2OSO_3M)$, $CF_2{=}CF(OCF_2CF(CF_3)CH_2OSO_3M)$, $CF_2{=}CF(OCF_2CF(CF_3)OCF_2CF_2CH_2OSO_3M)$, $CF_2{=}CF(OCF_2CF_2SO_2N(CH_3)CH_2CH_2OSO_3M)$, and $CF_2{=}CF(OCF_2CF_2CF_2CF_2SO_2N(CH_3)CH_2CH_2OSO_3M)$. In the formulas described above, M is as described above.

In a preferred embodiment, $A^0$ in the general formula (1) is a sulfonate group. $A^0$ is, for example, $—SO_3M$, wherein M is as described above.

When $A^0$ is a sulfonate group, examples of the monomer represented by the general formula (1) include $CF_2═CF(OCF_2CF_2SO_3M)$, $CF_2═CF(O(CF_2)_3SO_3M)$, $CF_2═CF(O(CF_2)_4SO_3M)$, $CF_2═CF(OCF_2CF(CF_3)SO_3M)$, $CF_2═CF(OCF_2CF(CF_3)OCF_2CF_2SO_3M)$, and $CF_2═CF(OCF_2CF(CF_3)OCF_2CF_2CF_2CF_2SO_3M)$. In the formulas described above, M is as described above.

In a preferred embodiment, $A^0$ in the general formula (1) is a carboxylate group. $A^0$ is, for example, COOM or $SO_2NR'CH_2COOM$, wherein R' is H or an alkyl group having 1 to 4 carbon atoms, and M is as described above. When $A^0$ is a carboxylate group, examples of the monomer represented by the general formula (1) include $CF_2═CF(OCF_2CF_2COOM)$, $CF_2═CF(O(CF_2)_3COOM)$, $CF_2═CF(O(CF_2)_5COOM)$, $CF_2═CF(OCF_2CF(CF_3)COOM)$, $CF_2═CF(OCF_2CF(CF_3)O(CF_2)_nCOOM)$ (n is greater than 1), $CF_2═CF(OCF_2CF_2SO_2NR'CH_2COOM)$, $CF_2═CF(O(CF_2)_4SO_2NR'CH_2COOM)$, $CF_2═CF(OCF_2CF(CF_3)SO_2NR'CH_2COOM)$, and $CF_2═CF(OCF_2CF(CF_3)OCF_2CF_2SO_2NR'CH_2COOM)$. In the formulas described above, R' is H or an alkyl group having 1 to 4 carbon atoms, and M is as described above.

In a preferred embodiment, $A^0$ in the general formula (1) is a phosphate group. $A^0$ is, for example, $—CH_2OP(O)(OM)_2$, $[—CH_2O]_2P(O)(OM)$, $—CH_2CH_2OP(O)(OM)_2$, $[—CH_2CH_2O]_2P(O)(OM)$, $[—SO_2NR'CH_2CH_2O]_2P(O)(OM)$, or $SO_2NR'CH_2CH_2OP(O)(OM)_2$, and in the formulas, R' is an alkyl group having 1 to 4 carbon atoms and M is as described above.

When $A^0$ is phosphate, examples of the monomer represented by the general formula (1) include $CF_2═CF(OCF_2CF_2CH_2OP(O)(OM)_2)$, $CF_2═CF(O(CF_2)_4CH_2OP(O)(OM)_2)$, $CF_2═CF(OCF_2CF(CF_3)CH_2OP(O)(OM)_2)$, $CF_2═CF(OCF_2CF(CF_3)OCF_2CF_2CH_2OP(O)(OM)_2)$, $CF_2═CF(OCF_2CF_2SO_2N(CH_3)CH_2CH_2OP(O)(OM)_2)$, and $CF_2═CF(OCF_2CF_2CF_2CF_2SO_2N(CH_3)CH_2CH_2OP(O)(OM)_2)$. In the formulas described above, M is as described above.

In a preferred embodiment, $A^0$ in the general formula (1) is a phosphonate group. When $A^0$ is a phosphonate group, examples of the monomer represented by the general formula (1) include $CF_2═CF(OCF_2CF_2P(O)(OM)_2)$, $CF_2═CF(O(CF_2)_4P(O)(OM)_2)$, $CF_2═CF(OCF_2CF(CF_3)P(O)(OM)_2)$, and $CF_2═CF(OCF_2CF(CF_3)OCF_2CF_2P(O)(OM)_2)$, and in the formulas, M is as described above.

It is also preferable that the monomer (1) is a monomer (2) represented by a general formula (2).

It is also preferable that the polymer (1) be a polymer (2) containing a polymerization unit (2) based on a monomer (2) represented by the general formula (2).

$$CF_2═CF(—O—Rf\text{-}A) \quad (2)$$

(In the formula, Rf is a fluorine-containing alkylene group having 1 to 40 carbon atoms or a fluorine-containing alkylene group having 2 to 100 carbon atoms and having an ether bond or a keto group. A is $—COOM$, $—SO_3M$, $—OSO_3M$, or $—C(CF_3)_2OM$ (M is H, a metal atom, $NR^7_4$, imidazolium optionally having a substituent, pyridinium optionally having a substituent, or phosphonium optionally having a substituent, and $R^7$ is H or an organic group).)

The polymer (2) may be a homopolymer of the monomer represented by the general formula (2), or may be a copolymer thereof with a further monomer.

In the general formula (2), the above Rf is a fluorine-containing alkylene group having 1 to 40 carbon atoms, a fluorine-containing alkylene group having 2 to 100 carbon atoms and having an ether bond, or a fluorine-containing alkylene group having 2 to 100 carbon atoms and having a keto group. Rf may contain $—CZ^1Z^2—$ ($Z^1$ and $Z^2$ are as previously described) at the end bonded to —COOM. Note that the fluorine-containing alkylene group having 2 to 100 carbon atoms and having an ether bond described above is an alkylene group that does not include a structure in which an oxygen atom is an end and that contains an ether bond between carbon atoms.

The fluorine-containing alkylene group of Rf preferably has 2 or more carbon atoms. Furthermore, the number of carbon atoms is preferably 30 or less, more preferably 20 or less, still more preferably 10 or less, and particularly preferably 5 or less. Examples of the fluorine-containing alkylene group include $—CF_2—$, $—CH_2CF_2—$, $—CF_2CF_2—$, $—CF_2CH_2—$, $—CF_2CF_2CH_2—$, $—CF(CF_3)—$, $—CF(CF_3)CF_2—$, $—CF(CF_3)CH_2—$, $—CF_2CF_2CF_2—$, and $—CF_2CF_2CF_2CF_2—$. It is preferable that the fluorine-containing alkylene group is a perfluoroalkylene group, and it is more preferable that it is an unbranched linear perfluoroalkylene group.

The fluorine-containing alkylene group having an ether bond described above preferably has 3 or more carbon atoms. Furthermore, the number of carbon atoms in the fluorine-containing alkylene group having an ether bond described above is preferably 60 or less, more preferably 30 or less, still more preferably 12 or less, and particularly preferably 5 or less. It is also preferable that the fluorine-containing alkylene group having an ether bond described above is, for example, a divalent group represented by a general formula:

$$—(\underset{Z^1}{C}FCF_2O)_{p1}—(CF_2O)_{q1}—(CZ^2_2CF_2CF_2O)_{r1}—\underset{Z^4}{C}Z^3—(CF_2)_{s1}—(CH_2)_{t1}—$$

(in the formula, $Z^1$ is F or $CF_3$; $Z^2$ and $Z^3$ are each H or F; $Z^4$ is H, F, or $CF_3$; p1+q1+r1 is an integer of 1 to 10; s1 is 0 or 1; and t1 is an integer of 0 to 5).

Specific examples of the fluorine-containing alkylene group having an ether bond described above include $—CF_2CF(CF_3)OCF_2—$, $—CF(CF_3)CF_2—O—CF(CF_3)—$, $—CF_2CF(CF_3)OCF_2CF_2CF_2—$, $—(CF(CF_3)CF_2—O)_n—CF(CF_3)—$ (in the formula, n is an integer of 1 to 10), $—CF(CF_3)CF_2—O—CF(CF_3)CH_2—$, $—(CF(CF_3)CF_2—O)_n—CF(CF_3)CH_2—$ (in the formula, n is an integer of 1 to 10), $—CH_2CF_2CF_2O—CH_2CF_2CH_2—$, $—CF_2CF_2CF_2O—CF_2—$, $—CF_2CF_2CF_2O—CF_2CF_2—$, $—CF_2CF_2CF_2O—CF_2CF_2CF_2—$, $—CF_2CF_2CF_2O—CF_2CF_2CH_2—$, $—CF_2CF_2O—CF_2—$, and $—CF_2CF_2O—CF_2CH_2—$. It is preferable that the fluorine-containing alkylene group having an ether bond described above is a perfluoroalkylene group.

The fluorine-containing alkylene group having a keto group described above preferably has 3 or more carbon atoms. Furthermore, the number of carbon atoms in the fluorine-containing alkylene group having a keto group described above is preferably 60 or less, more preferably 30 or less, still more preferably 12 or less, and particularly preferably 5 or less.

Examples of the fluorine-containing alkylene group having a keto group described above include $—CF_2CF(CF_3)CO—CF_2—$, $—CF_2CF(CF_3)CO—CF_2CF_2—$, $—CF_2CF$ $(CF_3)CO—CF_2CF_2CF_2—$, and $—CF_2CF(CF_3)CO—CF_2CF_2CF_2CF_2—$. It is preferable that the fluorine-containing alkylene group having a keto group described above is a perfluoroalkylene group.

Water may be added to the keto group in the fluorine-containing alkylene group. Accordingly, the monomer (2) may be a hydrate. Examples of the fluorine-containing alkylene group in which water is added to the keto group include $—CF_2CF(CF_3)C(OH)_2—CF_2—$, $—CF_2CF(CF_3)C(OH)_2—CF_2CF_2—$, $—CF_2CF(CF_3)C(OH)_2—CF_2CF_2CF_2—$, and $—CF_2CF(CF_3)C(OH)_2—CF_2CF_2CF_2CF_2—$.

A is $—COOM$, $—SO_3M$, $—OSO_3M$, or $—C(CF_3)_2OM$ (M may be the same or different in each occurrence and is H, a metal atom, $NR^7_4$, imidazolium optionally having a substituent, pyridinium optionally having a substituent, or phosphonium optionally having a substituent, and $R^7$ is H or an organic group).

$R^7$ is preferably H or a $C_{1-10}$ organic group, more preferably H or a $C_{1-4}$ organic group, and still more preferably H or a $C_{1-4}$ alkyl group.

Examples of the metal atom include an alkali metal (Group 1) and an alkaline earth metal (Group 2), and Na, K, or Li is preferred.

M may be the same or different in each occurrence, and is preferably H, a metal atom, or $NR^7_4$, more preferably H, an alkali metal (Group 1), an alkaline earth metal (Group 2), or $NR^7_4$, still more preferably H, Na, K, Li, or $NH_4$, further preferably H, Na, K, or $NH_4$, particularly preferably H or $NH_4$, and most preferably H.

A is preferably $—COOM$ or $—SO_3M$, and more preferably $—COOM$.

The monomer represented by the general formula (2) is preferably at least one selected from the group consisting of monomers represented by the following general formulas (2a), (2b), (2c), (2d), (2e), (2f), and (2g):

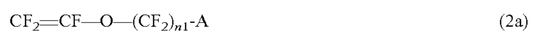

$CF_2═CF—O—(CF_2)_{n1}\text{-}A$ (2a)

wherein n1 represents an integer of 1 to 10, and A is as defined above;

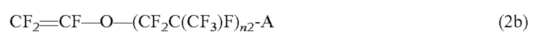

$CF_2═CF—O—(CF_2C(CF_3)F)_{n2}\text{-}A$ (2b)

wherein n2 represents an integer of 1 to 5, and A is as defined above;

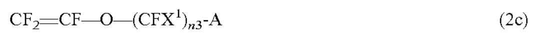

$CF_2═CF—O—(CFX^1)_{n3}\text{-}A$ (2c)

wherein $X^1$ represents F or $CF_3$, n3 represents an integer of 1 to 10, and A is as defined above;

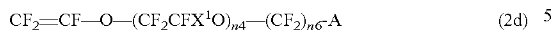

$CF_2═CF—O—(CF_2CFX^1O)_{n4}—(CF_2)_{n6}\text{-}A$ (2d)

wherein n4 represents an integer of 1 to 10, n6 represents an integer of 1 to 3, and A and $X^1$ are as defined above;

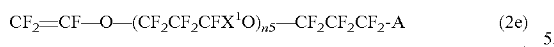

$CF_2═CF—O—(CF_2CF_2CFX^1O)_{n5}—CF_2CF_2CF_2\text{-}A$ (2e)

wherein n5 represents an integer of 0 to 10, and A and $X^1$ are as defined above;

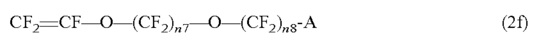

$CF_2═CF—O—(CF_2)_{n7}—O—(CF_2)_{n8}\text{-}A$ (2f)

wherein n7 represents an integer of 1 to 10, n8 represents an integer of 1 to 3, and A is as defined above; and

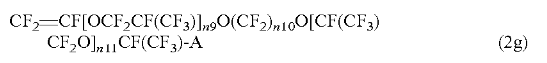

$CF_2═CF[OCF_2CF(CF_3)]_{n9}O(CF_2)_{n10}O[CF(CF_3)CF_2O]_{n11}CF(CF_3)\text{-}A$ (2g)

wherein n9 represents an integer of 0 to 5, n10 represents an integer of 1 to 8, n11 represents an integer of 0 to 5, and A is as defined above.

In the general formula (2a), the above n1 is preferably an integer of 5 or less, more preferably an integer of 3 or less, and still more preferably an integer of 2 or less.

Examples of the monomer represented by the general formula (2a) include $CF_2═CF—O—CF_2COOM$, $CF_2═CF(OCF_2CF_2COOM)$, $CF_2═CF(O(CF_2)_3COOM)$, $CF_2═CF(OCF_2CF_2SO_3M)$, $CF_2═CFOCF_2SO_3M$, $CF_2═CFOCF_2CF_2CF_2SO_3M$, and $CF_2═CFOCF_2CF_2CF_2CF_2SO_3M$ (in the formulas, M is as defined above).

In the general formula (2b), it is preferable that n2 is an integer of 3 or less from the viewpoint of dispersion stability of the resulting composition.

In the general formula (2c), it is preferable that n3 is an integer of 5 or less from the viewpoint of water solubility, it is preferable that the above A is $—COOM$, and it is preferable that the above M is H, Na, or $NH_4$.

In the general formula (2d), it is preferable that $X^1$ is $—CF_3$ from the viewpoint of dispersion stability of the composition, it is preferable that n4 is an integer of 5 or less from the viewpoint of water solubility, it is preferable that A is $—COOM$, and it is preferable that M is H, Na, or $NH_4$.

Examples of the monomer represented by the general formula (2d) include $CF_2═CFOCF_2CF(CF_3)OCF_2CF_2COOM$, $CF_2═CFOCF_2CF(CF_3)OCF_2COOM$, $CF_2═CFOCF_2CF(CF_3)OCF_2CF_2CF_2COOM$, $CF_2═CFOCF_2CF(CF_3)OCF_2SO_3M$, $CF_2═CFOCF_2CF(CF_3)OCF_2CF_2SO_3M$, and $CF_2═CFOCF_2CF(CF_3)OCF_2CF_2CF_2SO_3M$ (in the formulas, M represents H, $NH_4$, or an alkali metal).

In the general formula (2e), it is preferable that n5 is an integer of 5 or less from the viewpoint of water solubility, it is preferable that A is $—COOM$, and it is preferable that M is H, Na, or $NH_4$.

Examples of the monomer represented by the general formula (2e) include $CF_2═CFOCF_2CF_2CF_2COOM$ and $CF_2═CFOCF_2CF_2CF_2SO_3M$ (in the formulas, M represents H, $NH_4$, or an alkali metal).

In the general formula (2f), it is preferable that n7 is an integer of 5 or less from the viewpoint of water solubility, it is preferable that A is $—COOM$, and it is preferable that M is H, Na, or $NH_4$.

Examples of the monomer represented by the general formula (2f) include $CF_2═CF—O—(CF_2)_3—O—CF_2—COOM$ (in the formula, M represents H, $NH_4$, or an alkali metal).

In the general formula (2g), it is preferable that n9 is an integer of 3 or less from the viewpoint of water solubility, it is preferable that n10 is an integer of 3 or less, it is preferable that n11 is an integer of 3 or less, it is preferable that A is $—COOM$, and it is preferable that M is H, Na, or $NH_4$.

Examples of the monomer represented by the general formula (2g) include $CF_2═CFO(CF_2)_2OCF(CF_3)COOM$, $CF_2═CFOCF_2CF_2OCF(CF_3)CF_2OCF(CF_3)COOM$, $CF_2═CFOCF_2CF(CF_3)OCF_2CF_2OCF(CF_3)COOM$, $CF_2═CF[OCF_2CF(CF_3)]_2O(CF_2)_2O[CF(CF_3)CF_2O]CF(CF_3)COOM$, and $CF_2═CF[OCF_2CF(CF_3)]_3O(CF_2)_2O[CF(CF_3)CF_2O]_3CF(CF_3)COOM$ (in the formulas, M represents H, $NH_4$, or an alkali metal).

The polymer (1) may be a homopolymer composed solely of the polymerization unit (1), or may be a copolymer comprising the polymerization unit (1) and a polymerization unit based on a further monomer that is copolymerizable with the monomer (1) represented by the general formula (1). From the viewpoint of solubility in an aqueous medium, preferred is a homopolymer composed solely of the polymerization unit (1). The polymerization unit (1) may be the same or different in each occurrence, and the polymer (1) may contain polymerization units (1) based on two or more different monomers represented by the general formula (1).

The further monomer described above is preferably a monomer represented by a general formula $CFR{=}CR_2$ (in the formula, R is independently H, F, or a perfluoroalkyl group having 1 to 4 carbon atoms). Also, the further monomer is preferably a fluorine-containing ethylenic monomer having 2 or 3 carbon atoms. Examples of the further monomer include $CF_2{=}CF_2$, $CF_2{=}CFCl$, $CH_2{=}CF_2$, $CFH{=}CH_2$, $CFH{=}CF_2$, $CF_2{=}CFCF_3$, $CH_2{=}CFCF_3$, $CH_2{=}CHCF_3$, $CHF{=}CHCF_3$ (E-form), and $CHF{=}CHCF_3$ (Z-form).

Of these, preferred is at least one selected from the group consisting of tetrafluoroethylene ($CF_2{=}CF_2$), chlorotrifluoroethylene ($CF_2{=}CFCl$), and vinylidene fluoride ($CH_2{=}CF_2$) from the viewpoint of achieving good copolymerizability, and more preferred is at least one selected from the group consisting of tetrafluoroethylene and vinylidene fluoride. Accordingly, it is preferable that the polymerization unit based on the further monomer described above is a polymerization unit based on at least one selected from the group consisting of tetrafluoroethylene and vinylidene fluoride. The polymerization unit based on the further monomer described above may be the same or different in each occurrence, and the polymer (1) may contain polymerization units based on two or more different further monomers.

In the case where the polymer (1) contains the polymerization unit (1) and a polymerization unit based on a further monomer that is copolymerizable with the monomer (1), the content of the polymerization unit (1) based on the monomer (1) is preferably 40 to 60 mol %, more preferably 45 to 55 mol %, based on all polymerization units constituting the polymer (1), and the content of the polymerization unit based on a further monomer is preferably 60 to 40 mol %, more preferably 55 to 45 mol %, based on all polymerization units constituting the polymer (1). Such a configuration is particularly suitable when the polymerization unit based on a further monomer that is copolymerizable with the monomer (1) is a polymerization unit based on a monomer represented by the general formula $CFR{=}CR_2$.

In the case where the polymer (1) contains the polymerization unit (1) and a polymerization unit based on a further monomer that is copolymerizable with the monomer (1), the alternation ratio between the polymerization unit (1) and the polymerization unit based on a further monomer that is copolymerizable with the monomer (1) is preferably 40% or more, more preferably 50% or more, still more preferably 60% or more, even more preferably 70% or more, particularly preferably 80% or more, and most preferably 90% or more. The alternation ratio may be, for example, 40 to 99%. Such a configuration is particularly suitable in the case where the polymerization unit based on a further monomer that is copolymerizable with the monomer (1) is a polymerization unit based on a monomer represented by the general formula $CFR{=}CR_2$.

The alternation ratio between the polymerization unit (1) and the polymerization unit based on a further monomer that is copolymerizable with the monomer (1) in the polymer (1) can be determined by $^{19}F$-NMR analysis of the polymer (1).

For example, in the case where the monomer (1) is $CF_2{=}CFOCF_2CF_2COOH$ and the further monomer is vinylidene fluoride ($CH_2{=}CF_2$), the alternation ratio of the polymer (1) can be calculated by the following method. $^{19}F$-NMR measurement of the polymer (1) is carried out, and from the total integrated value of each of the two peaks (the peak appearing at −79 ppm to −83 ppmm and the peak appearing at −83 ppm to −87 ppm) derived from "$OCF_2$*" of $CF_2{=}CFOCF_2CF_2COOH$ that appear in the NMR spectrum, the alternation ratio is calculated according to the following calculation formula.

$$\text{Alternation ratio (\%)} \geq (b\times 2)/(a+b)\times 100$$

a: total integrated value of peak in −79 ppm to −83 ppmm area b: total integrated value of peak in −83 ppm to −87 ppm area Examples of the further monomer described above include a monomer represented by a general formula (n1-2):

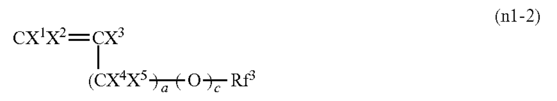

(n1-2)

(in the formula, $X^1$ and $X^2$ are the same as or different from each other, and are each H or F; $X^3$ is H, F, Cl, $CH_3$, or $CF_3$; $X^4$ and $X^5$ are the same as or different from each other, and are each H or F; a and c are the same as or different from each other, and are each 0 or 1; and $Rf^3$ is a fluorine-containing alkyl group having 1 to 40 carbon atoms or a fluorine-containing alkyl group having 2 to 100 carbon atoms and having an ether bond).

Specific preferred examples thereof include $CH_2{=}CFCF_2{-}O{-}Rf^3$, $CF_2{=}CF{-}O{-}Rf^3$, $CF_2{=}CFCF_2{-}O{-}Rf^3$, $CF_2{=}CF{-}Rf^3$, $CH_2{=}CH{-}Rf^3$, and $CH_2{=}CH{-}O{-}Rf^3$ (in the formulas, $Rf^3$ is as described in the above formula (n1-2)).

Examples of the further monomer described above also include a fluorine-containing acrylate monomer represented by a formula (n2-1):

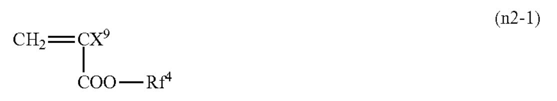

(n2-1)

(in the formula, $X^9$ is H, F, or $CH_3$; and $Rf^4$ is a fluorine-containing alkyl group having 1 to 40 carbon atoms or a fluorine-containing alkyl group having 2 to 100 carbon atoms and having an ether bond). Examples of the above $Rf^4$ group include:

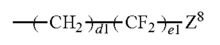

wherein $Z^0$ is H, F, or Cl; d1 is an integer of 1 to 4; and e1 is an integer of 1 to 10,

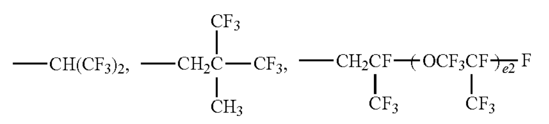

wherein e2 is an integer of 1 to 5,

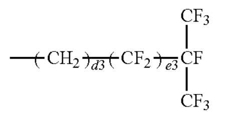

wherein d3 is an integer of 1 to 4; and e3 is an integer of 1 to 10.

Examples of the further monomer described above also include a fluorine-containing vinyl ether represented by a formula (n2-2):

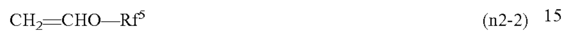

(in the formula, $Rf^5$ is a fluorine-containing alkyl group having 1 to 40 carbon atoms or a fluorine-containing alkyl group having 2 to 100 carbon atoms and having an ether bond).

Specifically, preferred examples of the monomer represented by the general formula (n2-2) include:

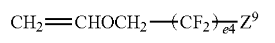

wherein $Z^9$ is H or F; and e4 is an integer of 1 to 10,

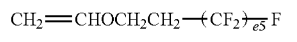

wherein e5 is an integer of 1 to 10,

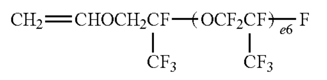

wherein e6 is an integer of 1 to 10.

More specific examples thereof include:

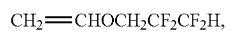

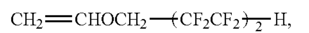

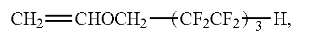

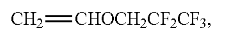

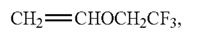

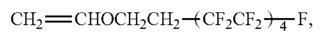

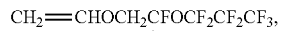

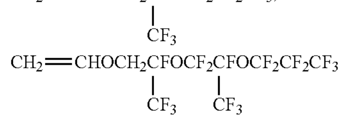

and the like.

In addition, examples of the further monomer also include a fluorine-containing allyl ether represented by a general formula (n2-3):

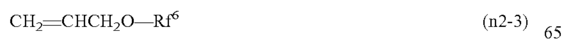

(in the formula, $Rf^6$ is a fluorine-containing alkyl group having 1 to 40 carbon atoms or a fluorine-containing alkyl group having 2 to 100 carbon atoms and having an ether bond); and a fluorine-containing vinyl monomer represented by a general formula (n2-4):

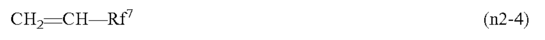

(in the formula, $Rf^7$ is a fluorine-containing alkyl group having 1 to 40 carbon atoms or a fluorine-containing alkyl group having 2 to 100 carbon atoms and having an ether bond).

Specific examples of the monomers represented by the general formulas (n2-3) and (n2-4) include a monomer such as:

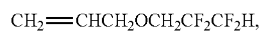

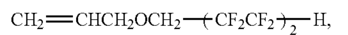

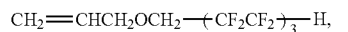

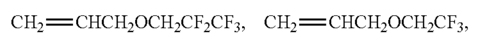

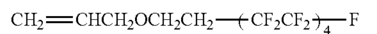

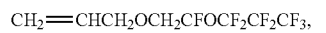

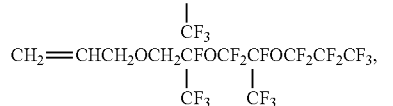

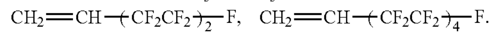

In the polymer (1), the content of the polymerization unit (1) is, in an increasing order of preference, 1.0 mol % or more, 3.0 mol % or more, 5.0 mol % or more, 10 mol % or more, 20 mol % or more, 30 mol % or more, 40 mol % or more, 50 mol % or more, 60 mol % or more, 70 mol % or more, 80 mol % or more, or 90 mol % or more based on all polymerization units. The content of the polymerization unit (1) is, particularly preferably, substantially 100 mol %, and the polymer (1) is most preferably composed solely of the polymerization unit (1).

In the polymer (1), the content of the polymerization unit based on the further monomer that is copolymerizable with the monomer represented by the general formula (1) is, in an increasing order of preference, 99.0 mol % or less, 97.0 mol % or less, 95.0 mol % or less, 90 mol % or less, 80 mol % or less, 70 mol % or less, 60 mol % or less, 50 mol % or less, 40 mol % or less, 30 mol % or less, 20 mol % or less, or 10 mol % or less based on all polymerization units. The content of the polymerization unit based on the further monomer that is copolymerizable with the monomer represented by the general formula (1) is, particularly preferably, substantially 0 mol %, and most preferably the polymer (1) does not contain the polymerization unit based on the further monomer.

The lower limit of the weight average molecular weight (Mw) of the polymer (1) is, in an increasing order of preference, $0.2\times10^4$ or more, $0.4\times10^4$ or more, $0.6\times10^4$ or more, $0.8\times10^4$ or more, $1.0\times10^4$ or more, $1.3\times10^4$ or more, $1.4\times10^4$ or more, $1.5\times10^4$ or more, $1.7\times10^4$ or more, $1.9\times10^4$ or more, $2.1\times10^4$ or more, $2.3\times10^4$ or more, $2.7\times10^4$ or more, $3.1\times10^4$ or more, $3.5\times10^4$ or more, $3.9\times10^4$ or more, or $4.3\times10^4$ or more. The upper limit of the weight average molecular weight (Mw) of the polymer (1) is, in an increasing order of preference, $150.0\times10^4$ or less, $100.0\times10^4$ or less, $60.0\times10^4$ or less, $50.0\times10^4$ or less, or $40.0\times10^4$ or less.

The lower limit of the number average molecular weight (Mn) of the polymer (1) is, in an increasing order of preference, $0.1\times10^4$ or more, $0.2\times10^4$ or more, $0.3\times10^4$ or more, $0.4\times10^4$ or more, $0.5\times10^4$ or more, $1.0\times10^4$ or more, $1.2\times10^4$ or more, $1.4\times10^4$ or more, $1.6\times10^4$ or more, or $1.8\times10^4$ or more. The upper limit of the number average molecular weight (Mn) of the polymer (1) is, in an increasing order of preference, $75.0\times10^4$ or less, $50.0\times10^4$ or less, $40.0\times10^4$ or less, $30.0\times10^4$ or less, or $20.0\times10^4$ or less.

The molecular weight distribution (Mw/Mn) of the polymer (1) is, in an increasing order of preference, 3.0 or less, 2.7 or less, 2.4 or less, 2.2 or less, 2.0 or less, 1.9 or less, 1.7 or less, 1.5 or less, 1.4 or less, or 1.3 or less.

The number average molecular weight and the weight average molecular weight are molecular weight values calculated by gel permeation chromatography (GPC) using monodisperse polyethylene oxide (PEO) and polyethylene glycol (PEG) as standards. Also, in the case where measurement by GPC is not possible, the number average molecular weight of the polymer (1) can be determined by the correlation between the number average molecular weight calculated from the number of terminal groups obtained by NMR, FT-IR, or the like and the melt flow rate. The melt flow rate can be measured in accordance with JIS K 7210.

The polymer (1) usually has a terminal group. The terminal group is a terminal group generated during the polymerization, and a representative terminal group is independently selected from hydrogen, iodine, bromine, a linear or branched alkyl group, and a linear or branched fluoroalkyl group, and may optionally contain at least one catenary heteroatom. It is preferable that the alkyl group or fluoroalkyl group have 1 to 20 carbon atoms. These terminal groups are, in general, produced from an initiator or a chain transfer agent used to form the polymer (1) or produced during a chain transfer reaction.

It is preferable that the polymer (1) have an ion exchange rate (IXR) of 53 or less. The IXR described above is defined as the number of carbon atoms in the polymer main chain relative to the ionic group. A precursor group that becomes ionic by hydrolysis (such as $-SO_2F$) is not regarded as an ionic group for the purpose of determining the IXR.

The IXR is preferably 0.5 or more, more preferably 0.7 or more, still more preferably 1.0 or more, further preferably 1.2 or more, still further preferably 1.5 or more, and particularly preferably 1.9 or more. Furthermore, the IXR is more preferably 30 or less, still more preferably 10 or less, particularly preferably 3 or less, and most preferably 2.2 or less.

In the polymer (1), the ionic groups (anionic groups) are typically distributed along the polymer main chain. The polymer (1) contains the polymer main chain together with repeating side chains bonded to this main chain, and it is preferable that these side chains have ionic groups.

It is preferable that the polymer (1) contain ionic groups having a pKa of less than 10, more preferably less than 7. The ionic group of the polymer (1) is preferably selected from the group consisting of sulfonate, carboxylate, phosphonate, and phosphate.

The term "sulfonate, carboxylate, phosphonate, and phosphate" is intended to refer to the respective salts or the respective acids that can form the salts. When a salt is used, that salt is preferably an alkali metal salt or an ammonium salt. The preferred ionic group is a sulfonate group.

It is preferable that the polymer (1) have water solubility. The term "water solubility" refers to the property of being easily dissolved or dispersed in an aqueous medium. When a polymer has water solubility, the particle size thereof cannot be measured by, for example, dynamic light scattering (DLS), or a particle size of 10 nm or less is indicated.

It is preferable that the polymer (1) have sufficient water solubility. In general, the higher the content of the polymer (1) in the aqueous solution, the more difficult it is for the polymer (1) to be sufficiently dissolved or dispersed in the aqueous medium. Accordingly, the polymer (1) whose particle size cannot be measured by dynamic light scattering (DLS) even in the case where the content of the polymer (1) in the aqueous solution is high can be said to have high water solubility. It is preferable that the particle size of the polymer (1) is not measurable even when contained in the aqueous solution at a content of 1.0% by mass. It is more preferable that the particle size is not measurable even when the polymer (1) is contained in the aqueous solution at a content of 1.5% by mass, and still more preferably at a content of 2.0% by mass.

The viscosity of the aqueous solution of the polymer (1) is preferably 5.0 mPa·s or more, more preferably 8.0 mPa·s or more, still more preferably 10.0 mPa·s or more, particularly preferably 12.0 mPa·s or more, and most preferably 14.0 mPa·s or more, and it is preferably 100.0 mPa·s or less, more preferably 50.0 mPa·s or less, still more preferably 25.0 mPa·s or less, and still further preferably 20.0 mPa·s or less.

The viscosity of the aqueous solution of the polymer (1) can be specified by adjusting the content of the polymer (1) in the aqueous solution to 33% by mass based on the aqueous solution and measuring the viscosity of the obtained aqueous solution at 20° C. using a tuning fork vibration viscometer (model number: SV-10) manufactured by A&D Company, Limited.

The critical micelle concentration (CMC) of the polymer (1) is preferably 0.1% by mass or more, more preferably 0.5% by mass or more, and still more preferably 1% by mass or more, and it is preferably 20% by mass or less, more preferably 10% by mass or less, and still more preferably 5% by mass or less.

The critical micelle concentration of the polymer (1) can be determined by measuring the surface tension. The surface tension can be measured with, for example, a surface tensiometer CBVP-A3 model manufactured by Kyowa Interface Science Co., Ltd.

The acid number of the polymer (1) is preferably 60 or more, more preferably 90 or more, still more preferably 120 or more, particularly preferably 150 or more, and most preferably 180 or more, and the upper limit thereof is not limited, but is preferably 300 or less.

When the polymer (1) has an anionic group other than an acid-type functional group, such as $-COOM$, $-SO_3M$, $-OSO_3M$, or $-C(CF_3)_2OM$ (M is a metal atom, $NR^7{}_4$, imidazolium optionally having a substituent, pyridinium optionally having a substituent, or phosphonium optionally having a substituent, and $R^7$ is H or an organic group), the acid number of the polymer (1) can be measured by converting these groups into acid-type groups, and then performing acid-base titration.

The polymer (1) may also be a polymer (12) of a monomer (12) represented by a general formula (12), wherein the content of a polymerization unit (12) based on the monomer (12) is 40 mol % or more based on all polymerization units constituting the polymer (12), and the weight average molecular weight (Mw) is $1.4\times10^4$ or more. The polymer (12) is a novel polymer.

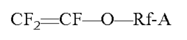

General formula (12):

(In the formula, X is independently F or $CF_3$, and Rf is a fluorine-containing alkylene group having 1 to 40 carbon atoms or a fluorine-containing alkylene group having 2 to 100 carbon atoms and having an ether bond or a keto group. A is —COOM, —$SO_3$M, —$OSO_3$M, or —$C(CF_3)_2$OM (M is —H, a metal atom, —$NR^7_4$, imidazolium optionally having a substituent, pyridinium optionally having a substituent, or phosphonium optionally having a substituent, and $R^7$ is H or an organic group).)

Rf and A in the general formula (12) are the same as Rf and A in the general formula (2) representing the monomer constituting the polymer (2).

The polymer (12) may be a homopolymer composed solely of the polymerization unit (12) based on the monomer (12), or may be a copolymer comprising the polymerization unit (12) and a polymerization unit based on a further monomer that is copolymerizable with the monomer (12). The further monomer is as described above. The polymerization unit (12) may be the same or different in each occurrence, and the polymer (12) may contain polymerization units (12) based on two or more different monomers represented by the general formula (12).

The content of the polymerization unit (12) in the polymer (12) is, in an increasing order of preference, 40 mol % or more, 50 mol % or more, 60 mol % or more, 70 mol % or more, 80 mol % or more, 90 mol % or more, or 99 mol % or more based on all polymerization units constituting the polymer (12). The content of the polymerization unit (12) is, particularly preferably, substantially 100 mol %, and the polymer (12) is most preferably composed solely of the polymerization unit (12).

In the polymer (12), the content of the polymerization unit based on the further monomer that is copolymerizable with the monomer (12) is, in an increasing order of preference, 60 mol % or less, 50 mol % or less, 40 mol % or less, 30 mol % or less, 20 mol % or less, 10 mol % or less, or 1 mol % or less based on all polymerization units constituting the polymer (12). The content of the polymerization unit based on the further monomer that is copolymerizable with the monomer (12) is, particularly preferably, substantially 0 mol %, and most preferably the polymer (12) does not contain the polymerization unit based on the further monomer.

The lower limit of the weight average molecular weight (Mw) of the polymer (12) is, in an increasing order of preference, $1.4\times10^4$ or more, $1.7\times10^4$ or more, $1.9\times10^4$ or more, $2.1\times10^4$ or more, $2.3\times10^4$ or more, $2.7\times10^4$ or more, $3.1\times10^4$ or more, $3.5\times10^4$ or more, $3.9\times10^4$ or more, $4.3\times10^4$ or more, $4.7\times10^4$ or more, or $5.1\times10^4$ or more. The upper limit of the weight average molecular weight (Mw) of the polymer (12) is, in an increasing order of preference, $150.0\times10^4$ or less, $100.0\times10^4$ or less, $60.0\times10^4$ or less, $50.0\times10^4$ or less, or $40.0\times10^4$ or less.

The lower limit of the number average molecular weight (Mn) of the polymer (12) is, in an increasing order of preference, $1.0\times10^4$ or more, $1.2\times10^4$ or more, $1.4\times10^4$ or more, $1.6\times10^4$ or more, or $1.8\times10^4$ or more. The upper limit of the number average molecular weight (Mn) of the polymer (12) is, in an increasing order of preference, $75.0\times10^4$ or less, $50.0\times10^4$ or less, $40.0\times10^4$ or less, $30.0\times10^4$ or less, or $20.0\times10^4$ or less.

The molecular weight distribution (Mw/Mn) of the polymer (12) is preferably 3.0 or less, more preferably 2.7 or less, still more preferably 2.4 or less, even more preferably 2.2 or less, particularly preferably 2.0 or less, and most preferably 1.9 or less.

Concerning the polymer (1), the polymer (12) is a novel polymer and can be produced by a production method (12) comprising polymerizing the monomer (12) represented by the general formula (12) to produce the polymer (12) of the monomer (12), wherein the oxygen concentration in the reaction system of the polymerization is maintained at 1,500 ppm by volume or less.

In the production method (12), the oxygen concentration in the reaction system of the polymerization is 1,500 ppm by volume or less. In the production method (12), the oxygen concentration in the reaction system is maintained at 1,500 ppm by volume or less throughout the polymerization of the monomer (12). The oxygen concentration in the reaction system is preferably 500 ppm by volume or less, more preferably 100 ppm by volume or less, and still more preferably 50 ppm by volume or less. The oxygen concentration in the reaction system is usually 0.01 ppm by volume or more.

The polymer (1) may also be a polymer (13) of a monomer (13) represented by a general formula (13), wherein the content of a polymerization unit (13) based on the monomer (13) is 50% by mass or more based on all polymerization units constituting the polymer (13). The polymer (13) is a novel polymer.

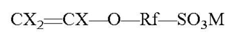

$CX_2$=CX—O—Rf—$SO_3$M General formula (13):

(In the formula, X is independently F or $CF_3$, and Rf is a fluorine-containing alkylene group having 1 to 40 carbon atoms or a fluorine-containing alkylene group having 2 to 100 carbon atoms and having an ether bond or a keto group. M is —H, a metal atom, —$NR^7_4$, imidazolium optionally having a substituent, pyridinium optionally having a substituent, or phosphonium optionally having a substituent, and $R^7$ is H or an organic group.)

In the general formula (13), each X is independently F or $CF_3$. It is preferable that at least one or more X is F, and it is more preferable that all X is F.

Rf and M in the general formula (13) are the same as Rf and A in the general formula (2) representing the monomer constituting the polymer (2).

The polymer (13) may be a homopolymer composed solely of the polymerization unit (13) based on the monomer (13), or may be a copolymer comprising the polymerization unit (13) and a polymerization unit based on a further monomer that is copolymerizable with the monomer (13). The further monomer is as described above. The polymerization unit (13) may be the same or different in each occurrence, and the polymer (13) may contain polymerization units (13) based on two or more different monomers represented by the general formula (13).

In the polymer (13), the content of the polymerization unit (13) based on the monomer (13) is 50% by mass or more based on all polymerization units constituting the polymer (13). The content of the polymerization unit (13) in the polymer (13) is, in an increasing order of preference, 60% by mass or more, 70% by mass or more, 80% by mass or more, 90% by mass or more, or 99% by mass or more based on all polymerization units constituting the polymer (13). The content of the polymerization unit (13) is, particularly preferably, substantially 100% by mass, and the polymer (13) is most preferably composed solely of the polymerization unit (13).

In the polymer (13), the content of the polymerization unit based on the further monomer that is copolymerizable with the monomer (13) is, in an increasing order of preference, 50% by mass or less, 40% by mass or less, 30% by mass or less, 20% by mass or less, 10% by mass or less, or 1% by mass or less based on all polymerization units constituting the polymer (13). The content of the polymerization unit based on the further monomer that is copolymerizable with the monomer (13) is, particularly preferably, substantially 0% by mass, and most preferably the polymer (13) does not contain the polymerization unit based on the further monomer.

The lower limit of the number average molecular weight of the polymer (13) is, in an increasing order of preference, $0.3\times10^4$ or more, $0.4\times10^4$ or more, $0.5\times10^4$ or more, $0.7\times10^4$ or more, $0.8\times10^4$ or more, $1.0\times10^4$ or more, $1.2\times10^4$ or more, $1.4\times10^4$, $1.6\times10^4$ or more, $1.8\times10^4$ or more, $2.0\times10^4$ or more, or $3.0\times10^4$ or more. The upper limit of the number average molecular weight of the polymer (13) is, in an increasing order of preference, $75.0\times10^4$ or less, $50.0\times10^4$ or less, $40.0\times10^4$ or less, $30.0\times10^4$ or less, or $20.0\times10^4$ or less.

The lower limit of the weight average molecular weight of the polymer (13) is, in an increasing order of preference, $0.4\times10^4$ or more, $0.5\times10^4$ or more, $0.6\times10^4$ or more, $0.8\times10^4$ or more, $1.0\times10^4$ or more, $1.2\times10^4$ or more, $1.4\times10^4$ or more, $1.7\times10^4$ or more, $1.9\times10^4$ or more, $2.1\times10^4$ or more, $2.3\times10^4$ or more, $2.7\times10^4$ or more, $3.1\times10^4$ or more, $3.5\times10^4$ or more, $3.9\times10^4$ or more, $4.3\times10^4$ or more, $4.7\times10^4$ or more, $5.1\times10^4$ or more, $10.0\times10^4$ or more, $15.0\times10^4$ or more, $20.0\times10^4$ or more, or $25.0\times10^4$ or more. The upper limit of the weight average molecular weight of the polymer (13) is, in an increasing order of preference, $150.0\times10^4$ or less, $100.0\times10^4$ or less, $60.0\times10^4$ or less, $50.0\times10^4$ or less, or $40.0\times10^4$ or less.

The molecular weight distribution (Mw/Mn) of the polymer (13) is, in an increasing order of preference, 3.0 or less, 2.7 or less, 2.4 or less, 2.2 or less, 2.0 or less, 1.9 or less, 1.7 or less, 1.5 or less, 1.4 or less, or 1.3 or less.

Concerning the polymer (1), the polymer (13) is a novel polymer and can be produced by a production method (13) comprising polymerizing the monomer (13) represented by the general formula (13) to produce the polymer (13) of the monomer (13).

In the production method (13), the oxygen concentration in the reaction system of the polymerization is preferably 1,500 ppm by volume or less, more preferably 500 ppm by volume or less, still more preferably 100 ppm by volume or less, and particularly preferably 50 ppm by volume or less. The oxygen concentration in the reaction system is usually 0.01 ppm by volume or more. In the production method described above, it is preferable that the oxygen concentration in the reaction system is maintained within the range described above throughout the polymerization of the monomer (13).

In the production method (12) and production method (13), because the polymer (12) and polymer (13) having a higher molecular weight can be readily produced, the polymerization temperature of the monomer (12) and monomer (13) is preferably 70° C. or lower, more preferably 65° C. or lower, still more preferably 60° C. or lower, particularly preferably 55° C. or lower, still further preferably 50° C. or lower, particularly preferably 45° C. or lower, and most preferably 40° C. or lower, and is preferably 10° C. or higher, more preferably 15° C. or higher, and still more preferably 20° C. or higher.

In the production method (12) and production method (13), the monomer (12) or monomer (13) may be copolymerized with the further monomer described above.

In the production method (12) and production method (13), the polymerization pressure is usually atmospheric pressure to 10 MPaG. The polymerization pressure is determined as appropriate according to the type of monomer used, the molecular weight of the target polymer, and the reaction rate.

In the production method (12) and production method (13), the polymerization time is usually 1 to 200 hours, and may be 5 to 100 hours.

In the production method (12) and production method (13), the oxygen concentration in the reaction system of the polymerization can be controlled by causing, for example, an inert gas such as nitrogen or argon, or the gaseous monomer when a gaseous monomer is used, to flow through the liquid phase or the gas phase in the reactor. The oxygen concentration in the reaction system of the polymerization can be determined by measuring and analyzing the gas emitted from the discharge gas line of the polymerization system with a low-concentration oxygen analyzer.

In the production method (12) and production method (13), the polymerization of the monomer (12) or monomer (13) may be carried out in an aqueous medium, or may be carried out in the absence of an aqueous medium. Also, the polymerization of the monomer (12) or monomer (13) may be carried out in the absence of an aqueous medium and in the presence of a non-aqueous medium (for example, an organic solvent such as toluene) of less than 10% by mass relative to the amount of monomers containing the monomer (12) or monomer (13). The polymerization of the monomer (12) or monomer (13) may be by emulsion polymerization or suspension polymerization, or it may be by bulk polymerization.

In the production method (12) and production method (13), the aqueous medium is a reaction medium in which the polymerization is carried out, and means a liquid containing water. The aqueous medium is not limited as long as it contains water, and it may be a medium that contains water and, for example, a fluorine-free organic solvent such as alcohol, ether, or ketone, and/or a fluorine-containing organic solvent having a boiling point of 40° C. or lower. The aqueous medium is preferably water.

In the production method (12) and production method (13), the monomer can be polymerized in the presence of a polymerization initiator. The polymerization initiator is not limited as long as it can generate radicals within the polymerization temperature range described above, and known oil-soluble and/or water-soluble polymerization initiators can be used. Furthermore, the polymerization initiator can be combined with a reducing agent or the like to form a redox agent and initiate the polymerization. The concentration of the polymerization initiator is determined as appropriate according to the type of monomer used, the molecular weight of the target polymer, and the reaction rate. When the polymerization of the monomer (12) or monomer (13) is carried out in an aqueous medium, it is preferable to use a water-soluble polymerization initiator such as a persulfate. When the polymerization of the monomer (12) or monomer (13) is carried out in the absence of an aqueous medium, it is preferable to use an oil-soluble polymerization initiator such as a peroxide.

As the polymerization initiator, a persulfate (such as ammonium persulfate) and an organic peroxide such as disuccinic acid peroxide or diglutaric acid peroxide can be used alone or in the form of a mixture thereof. Furthermore, the polymerization initiator may be used together with a reducing agent such as sodium sulfite so as to form a redox system. Moreover, it is also possible to regulate the concentration of radicals in the system by adding a radical scavenger such as hydroquinone or catechol or adding a peroxide decomposer such as ammonium sulfate during the polymerization.

As the polymerization initiator, a persulfate is particularly preferred because a polymer having a higher molecular weight can be readily produced. Examples of the persulfate include ammonium persulfate, potassium persulfate, and sodium persulfate, and ammonium persulfate is preferred.

As the polymerization initiator, an oil-soluble radical polymerization initiator may be used. The oil-soluble radical polymerization initiator may be a known oil-soluble peroxide, and representative examples thereof include a dialkyl peroxycarbonate such as diisopropyl peroxydicarbonate and di-sec-butyl peroxydicarbonate; a peroxy ester such as t-butyl peroxyisobutyrate and t-butyl peroxypivalate; and a dialkyl peroxide such as di-t-butyl peroxide, as well as a di[perfluoro (or fluorochloro) acyl]peroxide such as di(ω-hydro-dodecafluorohexanoyl)peroxide, di(ω-hydro-tetradecafluoroheptanoyl)peroxide, di(ω-hydro-hexadecafluorononanoyl)peroxide, di(perfluorobutyryl)peroxide, di(perfluorovaleryl)peroxide, di(perfluorohexanoyl)peroxide, di(perfluoroheptanoyl)peroxide, di(perfluorooctanoyl)peroxide, di(perfluorononanoyl)peroxide, di(ω-chloro-hexafluorobutyryl)peroxide, di(ω-chloro-decafluorohexanoyl)peroxide, di(ω-chloro-tetradecafluorooctanoyl)peroxide, ω-hydro-dodecafluoroheptanoyl-ω-hydrohexadecafluorononanoyl-peroxide, ω-chloro-hexafluorobutyryl-ω-chloro-decafluorohexanoyl-peroxide, ω-hydrododecafluoroheptanoyl-perfluorobutyryl-peroxide, di(dichloropentafluorobutanoyl)peroxide, di(trichlorooctafluorohexanoyl)peroxide, di(tetrachloroundecafluorooctanoyl)peroxide, di(pentachlorotetradecafluorodecanoyl)peroxide, and di(undecachlorodotoriacontafluorodocosanoyl)peroxide.

The amount of the polymerization initiator added is not limited, and the polymerization initiator may be added in an amount that does not significantly decrease the polymerization rate (for example, a concentration of several ppm in water) or more at once in the initial stage of polymerization, or added successively or continuously. The upper limit is within a range where the reaction temperature is allowed to increase while the polymerization reaction heat is removed through the device surface, and the more preferred upper limit is within a range where the polymerization reaction heat can be removed through the device surface.

In the production method (12) and production method (13), the polymerization initiator can be added at the initiation of polymerization, and can be added also during the polymerization. The proportion of the amount of the polymerization initiator added at the initiation of polymerization to the amount of the polymerization initiator added during the polymerization is preferably 95/5 to 5/95, more preferably 60/40 to 10/90, and still more preferably 30/70 to 15/85. The method for adding the polymerization initiator during the polymerization is not limited, and the entire amount may be added at once, may be added in two or more divided portions, or may be added continuously.

In the production method (12) and production method (13), the total amount of the polymerization initiator added to be used in the polymerization is preferably 0.00001 to 10% by mass based on the aqueous medium because a polymer having a higher molecular weight can be readily produced. The total amount of the polymerization initiator added to be used in the polymerization is more preferably 0.0001% by mass or more, still more preferably 0.001% by mass or more, and particularly preferably 0.01% by mass or more, and it is more preferably 5% by mass or less, and still more preferably 2% by mass or less.

In the production method (12) and production method (13), the total amount of the polymerization initiator added to be used in the polymerization is preferably 0.001 to 10 mol % based on the monomer because a polymer having a higher molecular weight can be readily produced. The total amount of the polymerization initiator added to be used in the polymerization is more preferably 0.005 mol % or more, still more preferably 0.01 mol % or more, still further preferably 0.1 mol % or more, and most preferably 0.5 mol % or more, and it is more preferably 5 mol % or less, still more preferably 2.5 mol % or less, particularly preferably 2.2 mol % or less, and most preferably 2.0 mol % or less.

In the production method (12) and production method (13), because a polymer having a higher molecular weight can be readily produced, it is preferable that the amount of monomers present containing the monomer (12) or monomer (13) at the initiation of polymerization is 20% by mass or more based on the amount of the aqueous medium present. The amount of monomers present is more preferably 30% by mass or more, and still more preferably 40% by mass or more. The upper limit of the amount of monomers present is not limited, and may be 200% by mass or less from the viewpoint of causing the polymerization to proceed smoothly. The amount of monomers present at the initiation of polymerization is the total amount of the monomer (12) or monomer (13) and, if any, further monomers present in the reactor at the initiation of polymerization.

In the production method (12) and production method (13), the polymerization may be carried out in the presence of a pH adjuster. The pH adjuster may be added before the initiation of polymerization or after the initiation of polymerization.

When the polymerization of the monomer (12) or monomer (13) is carried out in the absence of an aqueous medium, it is preferable that the total amount of the polymerization initiator, such as a peroxide, is 0.001 to 10 mol % based on the total amount of monomers (monomer mixture) containing the monomer (12) or monomer (13). The total amount of the polymerization initiator added to be used in the polymerization is more preferably 0.005 mol % or more, and still more preferably 0.01 mol % or more, and it is more preferably 10 mol % or less, still more preferably 5.0 mol % or less, still further preferably 2.5 mol % or less, particularly most preferably 2.2 mol % or less, and preferably 2.0 mol % or less.

Examples of the pH adjuster include ammonia, sodium hydroxide, potassium hydroxide, sodium carbonate, potassium carbonate, ammonium carbonate, sodium hydrogen carbonate, potassium hydrogen carbonate, ammonium hydrogen carbonate, sodium phosphate, potassium phosphate, sodium citrate, potassium citrate, ammonium citrate, sodium gluconate, potassium gluconate, and ammonium gluconate.

In the production method (12) and production method (13), the polymerization of the monomer (12) or monomer (13) can be carried out by charging a polymerization reactor with an aqueous medium, the monomer (12) or monomer (13), optionally a further monomer, and optionally a further additive, stirring the contents of the reactor, maintaining the reactor at a predetermined polymerization temperature, and then adding a predetermined amount of a polymerization initiator to initiate the polymerization reaction. After the initiation of the polymerization reaction, the monomer, the polymerization initiator, and the further additive may be added depending on the purpose.

In the production method (12) and production method (13), the polymerization of the monomer can be carried out substantially in the absence of a fluorine-containing surfactant. In the present disclosure, the expression "substantially in the absence of a fluorine-containing surfactant" means that the amount of the fluorine-containing surfactant is 10 ppm by mass or less based on the aqueous medium. The amount of the fluorine-containing surfactant based on the aqueous medium is preferably 1 ppm by mass or less, more preferably 100 ppb by mass or less, still more preferably 10 ppb by mass or less, and further preferably 1 ppb by mass or less.

In the production method of the present disclosure, it is preferable that the polymer (1) is added in an amount of 0.01 to 20% by mass based on 100% by mass of the aqueous medium. When the amount of the polymer (1) added (the amount present) in the polymerization described above is within the range described above, the polymerization reaction of the perfluoromonomer progresses smoothly and the perfluoroelastomer can be produced efficiently. When the amount of the polymer (1) added is too small, a sufficient polymerization rate cannot be obtained or a sufficient yield cannot be obtained.

Since the polymerization reaction of the perfluoromonomer progresses further smoothly, the amount of the polymer (1) added is more preferably 0.1% by mass or more, still more preferably 0.5% by mass or more, particularly preferably 0.75% by mass or more, and most preferably 1.0% by mass or more, based on 100% by mass of the aqueous medium.

In addition, when the amount added is too large, effects commensurate with the amount added cannot be obtained, which is economically disadvantageous, and post-treatment after the completion of polymerization may also be complicated, and therefore, the amount of the polymer (1) added is more preferably 15% by mass or less, still more preferably 10% by mass or less, and particularly preferably 5% by mass or less, based on 100% by mass of the aqueous medium.

The timing of addition of the polymer (1) in the polymerization described above is not limited, and it may be added before the initiation of polymerization or may be added after the initiation of polymerization. In addition, in the polymerization described above, the polymer (1) may be added all at once at an arbitrary timing, or it may be added continuously. Adding the polymer (1) continuously means, for example, adding the polymer (1) not all at once, but adding over time and without interruption or adding in portions. When the polymer (1) is added continuously, it is preferable to add the polymer (1) such that the total amount of the polymer (1) added is in the range described above. When the polymer (1) is added, an aqueous solution containing the polymer (1) and water may be prepared and that aqueous solution may be added.

As the polymer (1), an aqueous solution containing the polymer (1) can be used.

The polymer (1) or the aqueous solution containing the polymer (1) may contain the dimer and trimer of the monomer (1) or may be substantially free from the dimer and trimer of the monomer (1). The dimer and trimer of the monomer (1) are usually generated when the monomer (1) is polymerized to obtain the polymer (1). The content of the dimer and trimer in the polymer (1) or the aqueous solution containing the polymer (1) is 1.0% by mass or less, preferably 0.1% by mass or less, more preferably 0.01% by mass or less, still more preferably 0.001% by mass or less, and particularly preferably 0.0001% by mass or less, based on the polymer (1).

The content of the dimer and trimer in the polymer (1) or the aqueous solution containing the polymer (1) can be specified by carrying out gel permeation chromatography (GPC) analysis of the polymer (1) and calculating the proportion (area percentage) of the total area of the dimer and trimer peaks to the total area of each peak in the chromatogram obtained by the GPC analysis.

Also, when the content of the dimer and trimer in the polymer (1) or the aqueous solution containing the polymer (1) is less than 0.5% by mass based on the polymer (1), it can be specified by measurement by liquid chromatography-mass spectrometry (LC/MS).

Specifically, aqueous solutions having five or more different content levels of the monomer (1) are prepared, the LC/MS analysis is carried out on the aqueous solutions with the respective content levels, and the relationship between the content level and the area (peak integrated value) corresponding to that content level is plotted to prepare a calibration curve of the monomer (1). Furthermore, from the calibration curve of the monomer (1), a calibration curve of the dimer and trimer of the monomer (1) is prepared.

Methanol is added to the polymer (1) to prepare a mixture, which is filtered using an ultrafiltration disk (molecular weight cutoff 3000 Da), and the resulting recovered liquid is subjected to LC/MS analysis.

Then, using the calibration curve, the area (peak integrated value) of the chromatogram of the dimer and trimer of the monomer (1) can be converted to the content of the dimer and trimer.

The dimer and trimer in the polymer (1) or the aqueous solution containing the polymer (1) can be removed by treating the aqueous solution containing the polymer (1) by at least one means selected from the group consisting of ultrafiltration, microfiltration, dialysis membrane treatment, liquid separation, and reprecipitation.

In the production method of the present disclosure, the use of at least one type of polymer (1) enables efficient production of the perfluoroelastomer, but two or more polymers (1) may be used.

It is preferable that, in the production method of the present disclosure, perfluoromonomers are polymerized substantially in the absence of a fluorine-containing surfactant.

Conventionally, a fluorine-containing surfactant has been used for polymerization of perfluoromonomers, but the production method of the present disclosure allows for, by using the polymer (1), polymerization of the perfluoromonomer to obtain the perfluoroelastomer without the use of a fluorine-containing surfactant.

In the present disclosure, the expression "substantially in the absence of a fluorine-containing surfactant" means that the proportion of the fluorine-containing surfactant contained based on the aqueous medium is 10 ppm by mass or less, and the proportion of the fluorine-containing surfactant contained is preferably 1 ppm by mass or less, more preferably 100 ppb by mass or less, even more preferably 10 ppb by mass or less, and particularly preferably 1 ppb by mass or less.

Examples of the fluorine-containing surfactant described above include an anionic fluorine-containing surfactant. The fluorine-containing surfactant described above is preferably a fluorine-containing surfactant (excluding compounds having a functional group capable of reacting by radical polymerization and a hydrophilic group).

The anionic fluorine-containing surfactant described above may be, for example, a fluorine atom-containing surfactant having, in the portion excluding the anionic group, 20 or less carbon atoms in total.

Alternatively, the fluorine-containing surfactant described above may be a fluorine-containing surfactant having an anionic moiety having a molecular weight of 800 or less.

Note that the "anionic moiety" described above means the portion of the fluorine-containing surfactant described above excluding the cation. For example, in the case of $F(CF_2)_{n1}COOM$ represented by a formula (I), which will be described below, the anionic moiety is the "$F(CF_2)_{n1}COO$" portion.

Examples of the fluorine-containing surfactant described above include a fluorine-containing surfactant having a Log POW of 3.5 or less. The Log POW described above is a partition coefficient between 1-octanol and water, which is represented by Log P [in the expression, P represents the ratio between the concentration of the fluorine-containing surfactant in octanol and the concentration of the fluorine-containing surfactant in water in a phase-separated octanol/water (1:1) liquid mixture containing the fluorine-containing surfactant].

The Log POW described above is obtained by performing HPLC on standard substances with known octanol/water partition coefficients (heptanoic acid, octanoic acid, nonanoic acid, and decanoic acid) under the following conditions: column; TOSOH ODS-120T column (φ4.6 mm×250 mm, manufactured by Tosoh Corporation), eluent; acetonitrile/0.6 mass % $HClO_4$ water=1/1 (vol/vol %), flow rate; 1.0 ml/min, sample volume; 300 μL, column temperature; 40° C., detection light; UV 210 nm, preparing a calibration curve between each elution time and the known octanol/water partition coefficients, and calculating from the elution time in HPLC for the sample liquid based on this calibration curve.

Specific examples of the fluorine-containing surfactant described above include those disclosed in U.S. Patent Application Publication No. 2007/0015864, U.S. Patent Application Publication No. 2007/0015865, U.S. Patent Application Publication No. 2007/0015866, U.S. Patent Application Publication No. 2007/0276103, U.S. Patent Application Publication No. 2007/0117914, U.S. Patent Application Publication No. 2007/0142541, U.S. Patent Application Publication No. 2008/0015319, U.S. Pat. Nos. 3,250,808, 3,271,341, Japanese Patent Laid-Open No. 2003-119204, International Publication No. WO 2005/042593, International Publication No. WO 2008/060461, International Publication No. WO 2007/046377, Japanese Patent Laid-Open No. 2007-119526, International Publication No. WO 2007/046482, International Publication No. WO 2007/046345, U.S. Patent Application Publication No. 2014/0228531, International Publication No. WO 2013/189824, and International Publication No. WO 2013/189826.

The anionic fluorine-containing surfactant described above may be a compound represented by the following general formula ($N^0$):

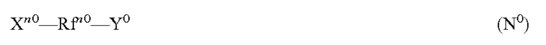

$$X^{n0}—Rf^{n0}—Y^0 \quad (N^0)$$

(in the formula, $X^{n0}$ is H, Cl, or F; $Rf^{n0}$ is a linear, branched, or cyclic alkylene group having 3 to 20 carbon atoms in which some or all of H is replaced with F; the alkylene group may contain one or more ether bonds, and some H may be replaced with Cl; and $Y^0$ is an anionic group).

The anionic group of $Y^0$ may be —COOM, —$SO_2M$, or —$SO_3M$, and it may be —COOM or —$SO_3M$.

M is H, a metal atom, $NR^7_4$, imidazolium optionally having a substituent, pyridinium optionally having a substituent, or phosphonium optionally having a substituent, and $R^7$ is —H or an organic group.

Examples of the metal atom described above include an alkali metal (Group 1) and an alkaline earth metal (Group 2), and it is Na, K, or Li, for example.

$R^7$ may be —H or a $C_{1-10}$ organic group, may be —H or a $C_{1-4}$ organic group, and may be —H or a $C_{1-4}$ alkyl group.

M may be H, a metal atom, or $NR^7_4$, may be H, an alkali metal (Group 1), an alkaline earth metal (Group 2), or $NR^7_4$, and may be H, Na, K, Li, or $NH_4$.

The above $Rf^{n0}$ may be one in which 50% or more of H is replaced with fluorine.

Examples of the compound represented by the above general formula ($N^0$) may be a compound represented by the following general formula ($N^1$):

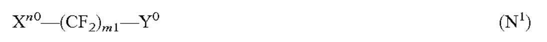

$$X^{n0}—(CF_2)_{m1}—Y^0 \quad (N^1)$$

(in the formula, $X^{n0}$ is H, Cl, or F; m1 is an integer of 3 to 15; and $Y^0$ is as defined above);

a compound represented by the following general formula ($N^2$):

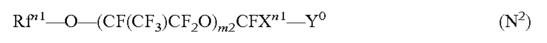

$$Rf^{n1}—O—(CF(CF_3)CF_2O)_{m2}CFX^{n1}—Y^0 \quad (N^2)$$

(in the formula, $Rf^{n1}$ is a perfluoroalkyl group having 1 to 5 carbon atoms; m2 is an integer of 0 to 3; $X^{n1}$ is F or $CF_3$; and $Y^0$ is as defined above);

a compound represented by the following general formula ($N^3$):

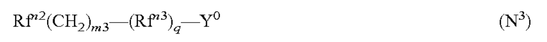

$$Rf^{n2}(CH_2)_{m3}—(Rf^{n3})_q—Y^0 \quad (N^3)$$

(in the formula, $Rf^{n2}$ is a partially or completely fluorinated alkyl group having 1 to 13 carbon atoms and optionally containing an ether bond and/or a chlorine atom; m3 is an integer of 1 to 3; $Rf^{n3}$ is a linear or branched perfluoroalkylene group having 1 to 3 carbon atoms; q is 0 or 1; and $Y^0$ is as defined above);

a compound represented by the following general formula ($N^4$):

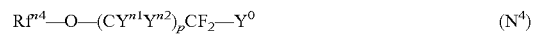

$$Rf^{n4}—O—(CY^{n1}Y^{n2})_pCF_2—Y^0 \quad (N^4)$$

(in the formula, $Rf^{n4}$ is a partially or fully fluorinated, linear or branched alkyl group having 1 to 12 carbon atoms and optionally containing an ether bond; $Y^{n1}$ and $Y^{n2}$ are the same as or different from each other, and are each H or F; p is 0 or 1; and $Y^0$ is as defined above); and a compound represented by the following general formula ($N^5$):

($N^5$)

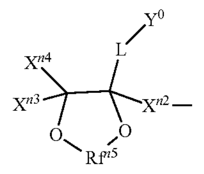

(in the formula, $X^{n2}$, $X^{n3}$, and $X^{n4}$ may be the same as or different from each other, and are each H, F, or a linear or branched, partially or fully fluorinated alkyl group having 1 to 6 carbon atoms and optionally containing an ether bond; $Rf^{n5}$ is a linear or branched, partially or fully fluorinated alkylene group having 1 to 3 carbon atoms and optionally containing an ether bond; L is a linking group; and $Y^0$ is as defined above, with the proviso that the total number of carbon atoms in $X^{n2}$, $X^{n3}$, $X^{n4}$, and $Rf^{n5}$ is 18 or less).

More specific examples of the compound represented by the above general formula ($N^0$) include a perfluorocarboxylic acid (I) represented by the following general formula (I), an ω-H perfluorocarboxylic acid (II) represented by the following general formula (II), a perfluoroethercarboxylic acid (III) represented by the following general formula (III), a perfluoroalkylalkylenecarboxylic acid (IV) represented by the following general formula (IV), a perfluoroalkoxyfluorocarboxylic acid (V) represented by the following general formula (V), a perfluoroalkylsulfonic acid (VI) represented by the following general formula (VI), an ω-H perfluorosulfonic acid (VII) represented by the following general formula (VII), a perfluoroalkylalkylenesulfonic acid (VIII) represented by the following general formula (VIII), an alkylalkylenecarboxylic acid (IX) represented by the following general formula (IX), a fluorocarboxylic acid (X) represented by the following general formula (X), an alkoxyfluorosulfonic acid (XI) represented by the following general formula (XI), a compound (XII) represented by the following general formula (XII), and a compound (XIII) represented by the following general formula (XIII).

The perfluorocarboxylic acid (I) described above is represented by the following general formula (I):

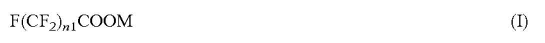

$F(CF_2)_{n1}COOM$ (I)

(in the formula, n1 is an integer of 3 to 14; M is H, a metal atom, $NR^7_4$, imidazolium optionally having a substituent, pyridinium optionally having a substituent, or phosphonium optionally having a substituent; and $R^7$ is —H or an organic group).

The ω-H perfluorocarboxylic acid (II) described above is represented by the following general formula (II):

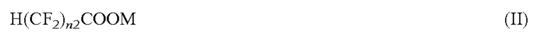

$H(CF_2)_{n2}COOM$ (II)

(in the formula, n2 is an integer of 4 to 15; and M is as defined above).

The perfluoroethercarboxylic acid (III) described above is represented by the following general formula (III):

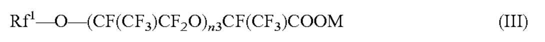

$Rf^1—O—(CF(CF_3)CF_2O)_{n3}CF(CF_3)COOM$ (III)

(in the formula, $Rf^1$ is a perfluoroalkyl group having 1 to 5 carbon atoms; n3 is an integer of 0 to 3; and M is as defined above).

The perfluoroalkylalkylenecarboxylic acid (IV) described above is represented by the following general formula (IV):

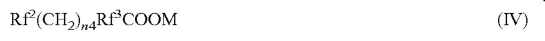

$Rf^2(CH_2)_{n4}Rf^3COOM$ (IV)

(in the formula, $Rf^2$ is a perfluoroalkyl group having 1 to 5 carbon atoms; $Rf^3$ is a linear or branched perfluoroalkylene group having 1 to 3 carbon atoms; n4 is an integer of 1 to 3; and M is as defined above).

The alkoxyfluorocarboxylic acid (V) described above is represented by the following general formula (V):

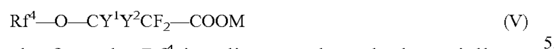

$Rf^4—O—CY^1Y^2CF_2—COOM$ (V)

(in the formula, $Rf^4$ is a linear or branched, partially or fully fluorinated alkyl group having 1 to 12 carbon atoms and optionally containing an ether bond and/or a chlorine atom; $Y^1$ and $Y^2$ are the same as or different from each other, and are each H or F; and M is as defined above).

The perfluoroalkylsulfonic acid (VI) described above is represented by the following general formula (VI):

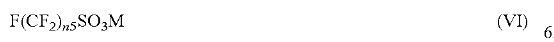

$F(CF_2)_{n5}SO_3M$ (VI)

(in the formula, n5 is an integer of 3 to 14; and M is as defined above).

The ω-H perfluorosulfonic acid (VII) described above is represented by the following general formula (VII):

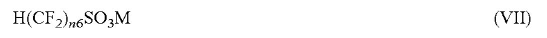

$H(CF_2)_{n6}SO_3M$ (VII)

(in the formula, n6 is an integer of 4 to 14; and M is as defined above).

The perfluoroalkylalkylenesulfonic acid (VIII) described above is represented by the following general formula (VIII):

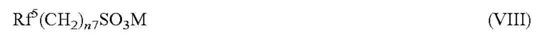

$Rf^5(CH_2)_{n7}SO_3M$ (VIII)

(in the formula, $Rf^5$ is a perfluoroalkyl group having 1 to 13 carbon atoms; n7 is an integer of 1 to 3; and M is as defined above).

The alkylalkylenecarboxylic acid (IX) described above is represented by the following general formula (IX):

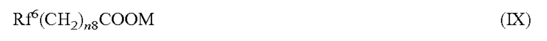

$Rf^6(CH_2)_{n8}COOM$ (IX)

(in the formula, $Rf^6$ is a linear or branched, partially or fully fluorinated alkyl group having 1 to 13 carbon atoms and optionally containing an ether bond; n8 is an integer of 1 to 3; and M is as defined above).

The fluorocarboxylic acid (X) described above is represented by the following general formula (X):

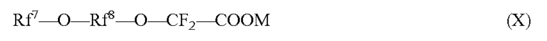

$Rf^7—O—Rf^8—O—CF_2—COOM$ (X)

(in the formula, $Rf^7$ is a linear or branched, partially or fully fluorinated alkyl group having 1 to 6 carbon atoms and optionally containing an ether bond and/or a chlorine atom; $Rf^8$ is a linear or branched, partially or fully fluorinated alkyl group having 1 to 6 carbon atoms; and M is as defined above).

The alkoxyfluorosulfonic acid (XI) described above is represented by the following general formula (XI):

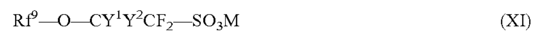

$Rf^9—O—CY^1Y^2CF_2—SO_3M$ (XI)

(in the formula, $Rf^9$ is a linear or branched, partially or fully fluorinated alkyl group having 1 to 12 carbon atoms and optionally containing an ether bond and optionally containing chlorine; $Y^1$ and $Y^2$ are the same as or different from each other, and are each H or F; and M is as defined above).

The compound (XII) described above is represented by the following general formula (XII):

(XII)

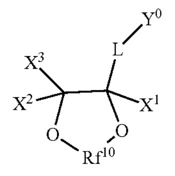

(in the formula, $X^1$, $X^2$, and $X^3$ are the same as or different from each other, and are each H, F, or a linear or branched, partially or fully fluorinated alkyl group having 1 to 6 carbon atoms and optionally containing an ether bond; $Rf^{10}$ is a perfluoroalkylene group having 1 to 3 carbon atoms; L is a linking group; and $Y^0$ is an anionic group).

$Y^0$ may be —COOM, —$SO_2M$, or —$SO_3M$, and may be —$SO_3M$ or —COOM (in the formulas, M is as defined above).

Examples of L include a single bond and a partially or fully fluorinated alkylene group having 1 to 10 carbon atoms and optionally containing an ether bond.

The compound (XIII) described above is represented by the following general formula (XIII):

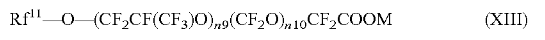

$Rf^{11}—O—(CF_2CF(CF_3)O)_{n9}(CF_2O)_{n10}CF_2COOM$ (XIII)

(in the formula, $Rf^{11}$ is a fluoroalkyl group having 1 to 5 carbon atoms and containing chlorine; n9 is an integer of 0 to 3; n10 is an integer of 0 to 3; and M is as defined above). Examples of the compound (XIII) include $CF_2ClO(CF_2CF(CF_3)O)_{n9}(CF_2O)_{n10}CF_2COONH_4$ (a mixture having an average molecular weight of 750, n9 and n10 in the formula are as defined above).

The fluorine-containing surfactant may be a single fluorine-containing surfactant, or may be a mixture containing two or more fluorine-containing surfactants.

Examples of the fluorine-containing surfactant include compounds represented by the following formulas. The fluorine-containing surfactant may be a mixture of these compounds. In one embodiment of the polymerization described above, a fluoromonomer is polymerized substantially in the absence of compounds represented by the following formulas:

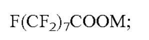

$F(CF_2)_7COOM$;

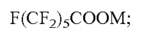

$F(CF_2)_5COOM$;

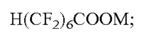

$H(CF_2)_6COOM$;

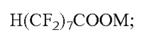

$H(CF_2)_7COOM$;

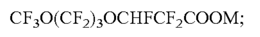

$CF_3O(CF_2)_3OCHFCF_2COOM$;

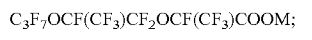

$C_3F_7OCF(CF_3)CF_2OCF(CF_3)COOM$;

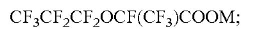

$CF_3CF_2CF_2OCF(CF_3)COOM$;

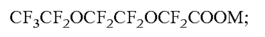

$CF_3CF_2OCF_2CF_2OCF_2COOM$;

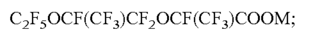

$C_2F_5OCF(CF_3)CF_2OCF(CF_3)COOM$;

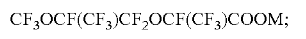

$CF_3OCF(CF_3)CF_2OCF(CF_3)COOM$;

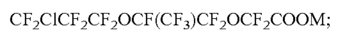

$CF_2ClCF_2CF_2OCF(CF_3)CF_2OCF_2COOM$;

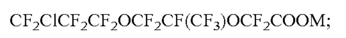

$CF_2ClCF_2CF_2OCF_2CF(CF_3)OCF_2COOM$;

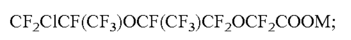

$CF_2ClCF(CF_3)OCF(CF_3)CF_2OCF_2COOM$;

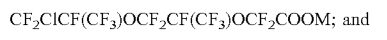

$CF_2ClCF(CF_3)OCF_2CF(CF_3)OCF_2COOM$; and

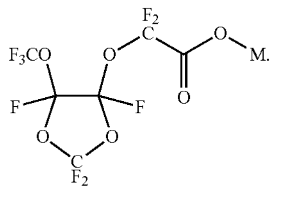

(in each formula, M is H, a metal atom, $NR^7_4$, imidazolium optionally having a substituent, pyridinium optionally having a substituent, or phosphonium optionally having a substituent; and $R^7$ represents H or an organic group.)

In the production method of the present disclosure, the polymerization is carried out by, for example, charging a polymerization reactor with an aqueous medium, the polymer (1), a perfluoromonomer, and optionally a further additive, stirring the contents of the reactor, maintaining the reactor at a predetermined polymerization temperature, and then adding a predetermined amount of a polymerization initiator to initiate the polymerization reaction. After the initiation of the polymerization reaction, components such as a monomer, a polymerization initiator, a chain transfer agent, and the polymer (1) may additionally be added depending on the purpose.

In the production method of the present disclosure, the polymerization may be carried out in the presence of a polymerization initiator.

The polymerization initiator is not limited as long as it can generate radicals within the polymerization temperature range, and known oil-soluble and/or water-soluble polymerization initiators can be used. Furthermore, the polymerization initiator can be combined with a reducing agent or the like to form a redox agent and initiate the polymerization. The concentration of the polymerization initiator described above is determined as appropriate in accordance with the type of monomer, the molecular weight of the target perfluoroelastomer, and the reaction rate.

As the polymerization initiator described above, an oil-soluble radical polymerization initiator or a water-soluble radical polymerization initiator can be used.

The oil-soluble radical polymerization initiator may be a known oil-soluble peroxide, and representative examples thereof include a dialkyl peroxycarbonate such as diisopropyl peroxydicarbonate and di-sec-butyl peroxydicarbonate; a peroxy ester such as t-butyl peroxyisobutyrate and t-butyl peroxypivalate; and a dialkyl peroxide such as di-t-butyl peroxide, as well as a di[perfluoro (or fluorochloro) acyl] peroxide such as di(ω-hydro-dodecafluorohexanoyl)peroxide, di(ω-hydro-tetradecafluoroheptanoyl)peroxide, di(ω-hydro-hexadecafluorononanoyl)peroxide, di(perfluorobutyryl)peroxide, di(perfluorovaleryl)peroxide, di(perfluorohexanoyl)peroxide, di(perfluoroheptanoyl)peroxide, di(perfluorooctanoyl)peroxide, di(perfluorononanoyl)peroxide, di(ω-chloro-hexafluorobutyryl)peroxide, di(ω-chloro-decafluorohexanoyl)peroxide, di(ω-chloro-tetradecafluorooctanoyl)peroxide, ω-hydro-dodecafluoroheptanoyl-ω-hydrohexadecafluorononanoyl-peroxide, ω-chloro-hexafluorobutyryl-ω-chloro-decafluorohexanoyl-peroxide, ω-hydrododecafluoroheptanoyl-perfluorobutyryl-peroxide, di(dichloropentafluorobutanoyl)peroxide, di(trichlorooctafluorohexanoyl)peroxide, di(tetrachloroundecafluorooctanoyl)peroxide, di(pentachlorotetradecafluorodecanoyl) peroxide, and di(undecachlorodotoriacontafluorodocosanoyl)peroxide.

The water-soluble radical polymerization initiator may be a known water-soluble peroxide, and examples thereof include ammonium salts, potassium salts, and sodium salts of persulfuric acid, perboric acid, perchloric acid, perphosphoric acid, and percarbonic acid, an organic peroxide such as disuccinic acid peroxide and diglutaric acid peroxide, t-butyl permaleate, and t-butyl hydroperoxide. A reducing agent such as a sulfite may be contained together, and the amount thereof may be 0.1 to 20 times the amount of the peroxide.

For example, in the case where the polymerization is performed at a low temperature of 30° C. or lower, the polymerization initiator used is preferably a redox initiator obtained by combining an oxidizing agent and a reducing agent. Examples of the oxidizing agent include a persulfate, an organic peroxide, potassium permanganate, manganese triacetate, and ammonium cerium nitrate. Examples of the reducing agent include a sulfite, a bisulfite, a bromate, a diimine, and oxalic acid. Examples of the persulfate include ammonium persulfate, potassium persulfate, and sodium persulfate. Examples of the sulfite include sodium sulfite and ammonium sulfite. In order to increase the decomposition rate of the initiator, the combination of the redox initiator preferably contains a copper salt or an iron salt. Examples of the copper salt include copper(II) sulfate and examples of the iron salt include iron(II) sulfate.

Examples of the redox initiator described above include potassium permanganate/oxalic acid, ammonium persulfate/bisulfite/iron sulfate, manganese triacetate/oxalic acid, cerium ammonium nitrate/oxalic acid, and bromate/bisulfite, and potassium permanganate/oxalic acid is preferred. In the case of using a redox initiator, either an oxidizing agent or a reducing agent may be charged into a polymerization tank in advance, followed by adding the other continuously or intermittently thereto to initiate the polymerization. For example, in the case of using potassium permanganate/oxalic acid, it is preferable that oxalic acid is charged into a polymerization tank and potassium permanganate is continuously added thereto.

The amount of the polymerization initiator added is preferably 0.0001 to 10% by mass, and more preferably 0.01 to 5% by mass, based on 100% by mass of the perfluoromonomer. When the amount of the polymerization initiator added (the amount present) in the polymerization described above is within the range described above, the polymerization reaction of the perfluoromonomer progresses smoothly and the perfluoroelastomer can be produced efficiently. When the amount of the polymerization initiator added is too small, a sufficient polymerization rate cannot be obtained or a sufficient yield cannot be obtained.

The timing of addition of the polymerization initiator in the polymerization described above is not limited, and it may be added before the initiation of polymerization or may be added after the initiation of polymerization. In addition, in the polymerization described above, the polymerization initiator may be added all at once at an arbitrary timing, or it may be added continuously. Adding the polymerization initiator continuously means, for example, adding the polymerization initiator not all at once, but adding over time and without interruption or adding in portions. When the polymerization initiator is added continuously, it is preferable to add the polymerization initiator such that the total amount of the polymerization initiator added is in the range described above. When the polymerization initiator is added, an aqueous solution containing the polymerization initiator and water may be prepared and that aqueous solution may be added.

In the polymerization described above, a chain transfer agent may be further added to adjust the polymerization rate and the molecular weight depending on the purpose.

In the polymerization described above, an iodine compound or bromine compound can also be used as a chain transfer agent from the viewpoint that the resulting polymer has a narrow molecular weight distribution, the molecular weight can be easily controlled, and an iodine atom or bromine atom can be introduced at its terminals. Examples of the polymerization method using an iodine compound or bromine compound include a method in which the polymerization is carried out in an aqueous medium under pressure in the presence of an iodine compound or bromine compound under the substantially oxygen-free state (iodine transfer polymerization method). Representative examples of the iodine compound or bromine compound used include a compound represented by a general formula:

$R^{21}I_xBr_y$ (in the formula, x and y are each an integer of 0 to 2 and satisfy $1 \le x+y \le 2$; and $R^{21}$ is a saturated or unsaturated fluorohydrocarbon group or chlorofluorohydrocarbon group having 1 to 16 carbon atoms, or a hydrocarbon group having 1 to 3 carbon atoms, and optionally contains an oxygen atom). By using the iodine compound or bromine compound, an iodine atom or bromine atom is introduced into the polymer and functions as a crosslinking point.

Examples of the iodine compound or bromine compound include 1,3-diiodoperfluoropropane, 2-iodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1, and a monoiodo- and monobromo-substitution product, diiodo- and monobromo-substitution product, and (2-iodoethyl)- and (2-bromoethyl)-substitution product of benzene. These compounds may be used alone or in any combination.

Of these, it is preferable to use 1,4-diiodoperfluorobutane, 1,6-diiodoperfluorohexane, and 2-iodoperfluoropropane from the viewpoint of polymerization reactivity, crosslinking reactivity, ease of availability, and the like.

Examples of the chain transfer agent also include an ester such as dimethyl malonate, diethyl malonate, methyl acetate, ethyl acetate, butyl acetate, and dimethyl succinate, as well as isopentane, methane, ethane, propane, methanol, isopropanol, acetone, various mercaptans, various halogenated hydrocarbons such as carbon tetrachloride, and cyclohexane.

The amount of the chain transfer agent added is usually 1 to 50,000 ppm by mass, preferably 1 to 20,000 ppm by mass, based on the total amount of the perfluoromonomer fed.

The chain transfer agent may be added to the reaction vessel all at once before the initiation of polymerization, may be added all at once after the initiation of polymerization, may be added in multiple portions during the polymerization, or may be added continuously during the polymerization.

In the case of using a fluoromonomer having an iodine atom as the fluoromonomer and/or using an iodine compound as the chain transfer agent, from the viewpoint that the perfluoroelastomer can be peroxide crosslinked to obtain a crosslinked elastic body of the perfluoroelastomer with excellent mechanical characteristics, the iodine content of the resulting perfluoroelastomer is preferably 0.02 to 5.0% by mass, more preferably 0.05 to 3.0% by mass, and still more preferably 0.1 to 2.0% by mass.

In the production method of the present disclosure, in addition to the polymer (1), an additive may also be used to stabilize each compound. Examples of the additive described above include a buffer, a pH adjuster, a stabilizing aid, and a dispersion stabilizer.

The aqueous medium described above is a reaction medium in which the polymerization is carried out, and means a liquid containing water. The aqueous medium described above is not limited as long as it contains water, and it may be a medium containing water and, for example, a fluorine-free organic solvent such as alcohol, ether, or ketone, and/or a fluorine-containing organic solvent having a boiling point of 40° C. or lower.

In the production method of the present disclosure, the polymerization may be carried out in the presence of a pH adjuster. By carrying out the polymerization in the presence of a pH adjuster, it is possible to generate a sufficient number of perfluoroelastomer particles at a sufficient polymerization rate while further suppressing adhesion of the perfluoroelastomer to a polymerization tank. The pH adjuster may be added before the initiation of polymerization or after the initiation of polymerization.

Examples of the pH adjuster include ammonia, sodium hydroxide, potassium hydroxide, sodium carbonate, potassium carbonate, ammonium carbonate, sodium hydrogen carbonate, potassium hydrogen carbonate, ammonium hydrogen carbonate, sodium phosphate, potassium phosphate, sodium citrate, potassium citrate, ammonium citrate, sodium gluconate, potassium gluconate, and ammonium gluconate.

The polymerization described above is usually performed at a polymerization temperature of 5 to 120° C. and a polymerization pressure of 0.05 to 10 MPaG. The polymerization temperature and the polymerization pressure are determined as appropriate according to the type of monomer used, the molecular weight of the target perfluoroelastomer, and the reaction rate.

In the production method of the present disclosure, the perfluoromonomer is polymerized in the presence of the polymer (1) and an aqueous medium, and thus adhesion of a polymer (a perfluoroelastomer) to a polymerization tank can be suppressed. The adhesion rate of the polymer to a polymerization tank is preferably 10% by mass or less, more preferably 5% by mass or less, still more preferably 3% by mass or less, and most preferably 1% by mass or less.

The polymer adhesion rate is a ratio (an adhesion rate to a polymerization tank) of the mass of polymer deposits adhering to the polymerization tank after the completion of polymerization to the total amount of the polymer (the perfluoroelastomer) after the completion of polymerization. Polymer deposits include the polymer adhering to the inside of a polymerization tank such as the inner wall of a polymerization tank and a stirring blade after an aqueous dispersion is removed from the polymerization tank after the completion of polymerization, and the polymer that is freed from the aqueous dispersion due to aggregation and floats or precipitates without being dispersed in the aqueous dispersion. The mass of polymer deposits is the mass after water contained in the polymer deposits is dried and removed at 120° C.

Polymer adhesion rate(mass %)=Mass of polymer deposits/Mass of resulting polymer(including deposits)×100

Mass of resulting polymer=Mass of aqueous dispersion×Solid concentration(mass %) of aqueous dispersion/100+Mass of polymer deposits In the production method of the present disclosure, polymerization of a perfluoromonomer is carried out in an aqueous medium to provide an aqueous dispersion of a perfluoroelastomer. The perfluoromonomer preferably does not contain a hydrophilic group. The fluoropolymer obtained by the production method of the present disclosure is a perfluoroelastomer, not a partially fluorinated elastomer.

It is preferable that the perfluoromonomer is at least one selected from the group consisting of:

tetrafluoroethylene [TFE];

hexafluoropropylene [HFP];

a fluoromonomer represented by a general formula (13):

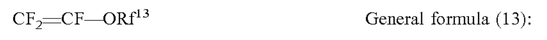

(in the formula, $Rf^{13}$ represents a perfluoroalkyl group having 1 to 8 carbon atoms);

a fluoromonomer represented by a general formula (14):

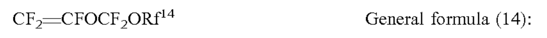

(in the formula, $Rf^{14}$ is a linear or branched perfluoroalkyl group having 1 to 6 carbon atoms, a cyclic perfluoroalkyl group having 5 to 6 carbon atoms, or a linear or branched perfluorooxyalkyl group having 2 to 6 carbon atoms and containing 1 to 3 oxygen atoms); and a fluoromonomer represented by a general formula (15):

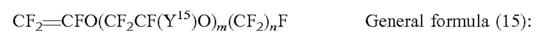

(in the formula, $Y^{15}$ represents a fluorine atom or a trifluoromethyl group; m is an integer of 1 to 4; and n is an integer of 1 to 4).

Also, in the polymerization of the perfluoromonomer, a monomer that provides a crosslinking site may be polymerized together with the perfluoromonomer.

Examples of the monomer that provides a crosslinking site include a monomer represented by a general formula (16):

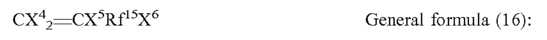

(in the formula, $X^4$ and $X^5$ are each independently H, F, or an alkyl group having 1 to 5 carbon atoms; $Rf^{15}$ is a linear or branched alkylene group or oxyalkylene group in which some or all of the hydrogen atoms may be replaced with fluorine atoms, optionally having one or more oxygen atoms derived from ether bonds and optionally having an aromatic ring; and $X^6$ is an iodine atom, a bromine atom, a cyano group, a carboxyl group, an alkoxycarbonyl group, a hydroxyl group, a vinyl group, an azide group, a sulfonyl azide group, a carbonyl azide group, or an alkyne group). The alkyne group may be an ethynyl group.

Among the above, it is preferable that the monomer that provides a crosslinking site is at least one selected from the group consisting of:

a fluoromonomer represented by a general formula (17):

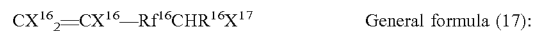

(in the formula, $X^{16}$ is each independently a hydrogen atom, a fluorine atom, or $CH_3$; $Rf^{16}$ is a fluoroalkylene group, a perfluoroalkylene group, a fluoro(poly)oxyalkylene group, or a perfluoro(poly)oxyalkylene group; $R^{16}$ is a hydrogen atom or $CH_3$; and $X^{17}$ is an iodine atom or a bromine atom);

a fluoromonomer represented by a general formula (18):

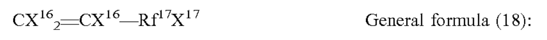

(in the formula, $X^{16}$ is each independently a hydrogen atom, a fluorine atom, or $CH_3$; $Rf^{17}$ is a fluoroalkylene group, a perfluoroalkylene group, a fluoro(poly)oxyalkylene group, or a perfluoro(poly)oxyalkylene group; and $X^{17}$ is an iodine atom or a bromine atom);

a fluoromonomer represented by a general formula (19):

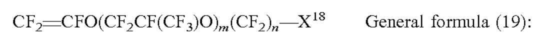

(in the formula, m is an integer of 0 to 5; n is an integer of 1 to 3; and $X^{18}$ is a cyano group, an azide group, a sulfonyl azide group, a carbonyl azide group, a carboxyl group, an alkoxycarbonyl group, an alkyne group, an iodine atom, a bromine atom, or $CH_2I$);

a fluoromonomer represented by a general formula (20):

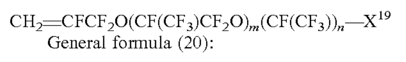

(in the formula, m is an integer of 0 to 5; n is an integer of 1 to 3; and $X^{19}$ is a cyano group, a carboxyl group, an alkoxycarbonyl group, an iodine atom, a bromine atom, or $CH_2OH$); and a monomer represented by a general formula (21):

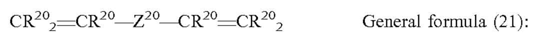

(in the formula, $R^{20}$ is each independently a hydrogen atom or an alkyl group having 1 to 5 carbon atoms; and $Z^{20}$ is a linear or branched alkylene group having 1 to 18 carbon atoms and optionally having an oxygen atom, a cycloalkylene group having 3 to 18 carbon atoms, and at least partially fluorinated alkylene group or oxyalkylene group having 1 to 10 carbon atoms, or a (per)fluoropolyoxyalkylene group represented by:

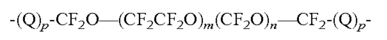

(in the formula, Q is an alkylene group or an oxyalkylene group; p is 0 or 1; and m/n is 0.2 to 5) and having a molecular weight of 500 to 10,000).

It is preferable that $X^{16}$ is a fluorine atom. It is preferable that $Rf^{16}$ and $Rf^{17}$ are each a perfluoroalkylene group having 1 to 5 carbon atoms. It is preferable that $R^{16}$ is a hydrogen atom. It is preferable that $X^{18}$ is a cyano group, an alkoxycarbonyl group, an iodine atom, a bromine atom, or $—CH_2I$. It is preferable that $X^{19}$ is a cyano group, an alkoxycarbonyl group, an iodine atom, a bromine atom, or $—CH_2OH$.

It is preferable that the monomer that provides a crosslinking site is at least one selected from the group consisting of $CF_2═CFOCF_2CF(CF_3)OCF_2CF_2CN$, $CF_2═CFOCF_2CF(CF_3)OCF_2CF_2COOH$, $CF_2═CFOCF_2CF(CF_3)OCF_2CF_2CH_2I$, $CF_2═CFOCF_2CF_2CH_2I$, $CH_2═CFCF_2OCF(CF_3)CF_2OCF(CF_3)CN$, $CH_2═CFCF_2OCF(CF_3)CF_2OCF(CF_3)COOH$, $CH_2═CFCF_2OCF(CF_3)CF_2OCF(CF_3)CH_2OH$, $CH_2═CHCF_2CF_2I$, $CH_2═CH(CF_2)_2CH═CH_2$, $CH_2═CH(CF_2)_6CH═CH_2$, and $CF_2═CFO(CF_2)_5CN$, and it is more preferable that it is at least one selected from the group consisting of $CF_2═CFOCF_2CF(CF_3)OCF_2CF_2CN$ and $CF_2═CFOCF_2CF_2CH_2I$.

The polymerization of the perfluoromonomer or of the perfluoromonomer and the monomer that provides a crosslinking site can be carried out to provide a perfluoroelastomer.

The perfluoroelastomer is preferably at least one selected from the group consisting of perfluoroelastomers comprising TFE units, such as a copolymer of TFE/fluoromonomer represented by the general formula (13), (14), or (15) and a copolymer of TFE/fluoromonomer represented by the general formula (13), (14), or (15)/monomer that provides a crosslinking site.

When the perfluoroelastomer is a TFE/perfluoro(methyl vinyl ether) (PMVE) copolymer, it has compositional features of preferably 45 to 90/10 to 55 (mol %), more preferably 55 to 80/20 to 45, still more preferably 55 to 70/30 to 45, and most preferably 56 to 69.5/30.5 to 44.

When the perfluoroelastomer is a copolymer of TFE/PMVE/monomer that provides a crosslinking site, it has compositional features of preferably 45 to 89.9/10 to 54.9/0.01 to 4 (mol %), more preferably 55 to 77.9/20 to 49.9/0.1 to 3.5, still more preferably 55 to 69.8/30 to 44.8/0.2 to 3, and most preferably 55.3 to 69.5/30.3 to 44.5/0.2 to 2.8.

When the perfluoroelastomer is a copolymer of TFE/fluoromonomer represented by the general formula (13), (14), or (15) having 4 to 12 carbon atoms, it has compositional features of preferably 50 to 90/10 to 50 (mol %), more preferably 60 to 88/12 to 40, still more preferably 65 to 85/15 to 35, and most preferably 66 to 84/16 to 34.

When the perfluoroelastomer is a copolymer of TFE/fluoromonomer represented by the general formula (13), (14), or (15) having 4 to 12 carbon atoms/monomer that provides a crosslinking site, it has compositional features of preferably 50 to 89.9/10 to 49.9/0.01 to 4 (mol %), more preferably 60 to 87.9/12 to 39.9/0.1 to 3.5, still more preferably 65 to 84.8/15 to 34.8/0.2 to 3, and most preferably 66 to 84.3/15.5 to 33.8/0.2 to 2.8.

Outside of these ranges of compositional features, the perfluoroelastomer tends to lose its properties as a rubber elastic material and to become more like a resin.

It is preferable that the perfluoroelastomer is at least one selected from the group consisting of a copolymer of TFE/fluoromonomer represented by the general formula (15)/monomer that provides a crosslinking site, a copolymer of TFE/fluoromonomer represented by the general formula (15), a copolymer of TFE/fluoromonomer represented by the general formula (13), and a copolymer of TFE/fluoromonomer represented by the general formula (13)/monomer that provides a crosslinking site.

Examples of the perfluoroelastomer may also include those described in International Publication No. WO 97/24381, Japanese Patent Publication No. 61-57324, Japanese Patent Publication No. 4-81608, Japanese Patent Publication No. 5-13961, and the like.

The perfluoroelastomer preferably has a glass transition temperature of −70° C. or higher, more preferably −60° C. or higher, and still more preferably −50° C. or higher, from the viewpoint of excellent compression set properties at a high temperature. Also, it preferably has a glass transition temperature of 5° C. or lower, more preferably 0° C. or lower, and still more preferably −3° C. or lower, from the viewpoint of good low-temperature resistance.

By using a differential scanning calorimeter (manufactured by Mettler-Toledo, DSC822e) and increasing the temperature of 10 mg of the sample at 10° C./min, a DSC curve is obtained, and then the temperature indicating the midpoint of the two intersections between the extension line of the baseline before and after the secondary transition of the DSC curve and the tangent line at the inflection point of the DSC curve is determined, which is used as the glass transition temperature described above.

The perfluoroelastomer preferably has a Mooney viscosity ML (1+20) at 170° C. of 30 or more, more preferably 40 or more, and still more preferably 50 or more, from the viewpoint of good heat resistance. Also, it preferably has a Mooney viscosity of 150 or less, more preferably 120 or less, and still more preferably 110 or less, from the viewpoint of good processability.

The perfluoroelastomer preferably has a Mooney viscosity ML (1+20) at 140° C. of 30 or more, more preferably 40 or more, and still more preferably 50 or more, from the viewpoint of good heat resistance. Also, it preferably has a Mooney viscosity of 180 or less, more preferably 150 or less, and still more preferably 110 or less, from the viewpoint of good processability.

The perfluoroelastomer preferably has a Mooney viscosity ML (1+10) at 100° C. of 10 or more, more preferably 20 or more, and still more preferably 30 or more, from the viewpoint of good heat resistance. Also, it preferably has a Mooney viscosity of 120 or less, more preferably 100 or less, and still more preferably 80 or less, from the viewpoint of good processability.

The Mooney viscosity described above can be measured in accordance with JIS K6300 at 170° C., 140° C., or 100° C. using a Mooney viscometer MV2000E model manufactured by ALPHA TECHNOLOGIES.

By the production method of the present disclosure, an aqueous dispersion of a perfluoroelastomer is obtained. The resulting perfluoroelastomer aqueous dispersion preferably has a solid concentration (a perfluoroelastomer content) of 10 to 50% by mass, more preferably 15 to 40% by mass, and still more preferably 20 to 30% by mass, when polymerization is complete.

The solid concentration (the perfluoroelastomer content) of the perfluoroelastomer aqueous dispersion can be determined by drying 1 g of the aqueous dispersion under 150° C. and 60-minute conditions, measuring the mass of the heating residue, and calculating the proportion of the mass of the heating residue to the mass of the aqueous dispersion.

The aqueous dispersion of a perfluoroelastomer may contain perfluoroelastomer particles. The average particle size of perfluoroelastomer particles is preferably 0.1 to 700 nm, more preferably 1.0 to 400 nm, and still more preferably 10 to 200 nm. The average particle size of perfluoroelastomer particles is a cumulant average diameter and can be measured by dynamic light scattering.

The number of perfluoroelastomer particles contained in the aqueous dispersion of a perfluoroelastomer is preferably $1.0\times10^{14}$ particles/cc or more, more preferably $5.0\times10^{14}$ particles/cc or more, and still more preferably $1.0\times10^{15}$ particles/cc or more. The number of particles (the number of polymer particles) described above can be calculated in accordance with the following expression:

$$\text{Number of polymer particles} = \left\{\frac{\text{Solid concentration of aqueous dispersion (mass\%)}}{100-\text{Solid concentration of aqueous dispersion (mass\%)}}\right\} / \left\{\frac{4}{3}\times3.14\times\left(\frac{\text{Average particle size (nm)}}{2}\times10^{-9}\right)^3\times\text{Specific gravity}\times10^6\right\}$$

The number of perfluoroelastomer particles obtained by the expression described above is the number of particles per 1 cc of water. The specific gravity is the specific gravity of the perfluoroelastomer. The specific gravity of the perfluoroelastomer can be determined in accordance with JIS Z 8807:2012.

A treatment such as coagulation or heating may be carried out on the aqueous dispersion of a perfluoroelastomer.

The coagulation described above can be carried out by adding a coagulating agent to the aqueous dispersion. Examples of the coagulating agent include an acid such as hydrochloric acid, nitric acid, hydrofluoric acid, sulfuric acid, and trifluoroacetic acid, but it is preferably at least one selected from the group consisting of nitric acid and hydrochloric acid.

The coagulated perfluoroelastomer may be washed with water to remove a small amount of impurities such as a buffer and a salt present in the perfluoroelastomer, and then the washed perfluoroelastomer may be dried. The drying temperature is preferably 40 to 200° C., more preferably 50 to 180° C., and still more preferably 70 to 150° C.

The form of the perfluoroelastomer obtained after coagulation is not limited, and may be gum, crumb, powder, pellet, or the like, and is preferably gum or crumb. Gum is a small mass of particles made of the perfluoroelastomer, and crumb is in the form of an amorphous mass as a result of the perfluoroelastomer being unable to maintain a small particulate form as a gum at room temperature and fusing to each other. Gum or crumb is suitably obtained by coagulation, drying, or the like by a conventionally known method from the aqueous dispersion obtained by the production method of the present disclosure.

The perfluoroelastomer in the aqueous dispersion may be coagulated using an acid not having a metal element, and the coagulated perfluoroelastomer may be washed with a liquid medium that has a reduced metal element content. Furthermore, the washed perfluoroelastomer may be dried. The liquid medium is preferably water, and still more preferably ultrapure water. The metal content of the liquid medium is preferably 10 ppm by mass or less, more preferably 2 ppm by mass or less, still more preferably 1 ppm by mass or less, and particularly preferably 0.5% by mass or less. Alternatively, the production method described in International Publication No. WO 2018/225586 may be used. By such a production method, a perfluoroelastomer with a reduced metal content can be produced, and a perfluoroelastomer suited for components in semiconductor manufacturing apparatuses can be produced. The metal content in the perfluoroelastomer is preferably 10 ppm by mass or less, more preferably 7 ppm by mass or less, and still more preferably 5 ppm by mass or less. The metal content in the perfluoroelastomer can be measured by the same method as the metal content in a composition, which will be described later.

The polymer (1), decomposition products and by-products of the polymer (1) by-produced from the polymer (1), residual monomers, and the like may be collected from discharge water generated in the above coagulation or washing and/or from off gas generated in the drying, and then purified to reuse the polymer (1), the decomposition products and by-products of the polymer (1) by-produced from the polymer (1), the residual monomers, and the like. Although the method for carrying out the collection and purification described above is not limited, it may be carried out by a known method. For example, it can be performed by the method described in Japanese Translation of PCT International Application Publication No. 2011-520020.

Although the method for collecting and purifying the polymer (1), the decomposition products and by-products of the polymer (1) by-produced from the polymer (1), the residual monomers, and the like from discharge water generated in the above coagulation, discharge water generated in the washing, and off gas generated in the drying is not limited, a conventionally known method can be adopted. Examples thereof include those described in U.S. Patent Application Publication No. 2007/0015937, U.S. Patent Application Publication No. 2007/0025902, and U.S. Patent Application Publication No. 2007/0027251, and specific examples thereof include the following methods.

Examples of the method for collecting the polymer (1), the decomposition products and by-products of the polymer (1) by-produced from the polymer (1), the residual monomers, and the like from the above discharge water include a method in which the discharge water is brought into contact with adsorbent particles formed of ion exchange resin, activated carbon, silica gel, clay, zeolite, or the like, so that the particles are allowed to adsorb the polymer (1) and the others and the discharge water and the adsorbent particles are then separated. By incinerating the adsorbent particles that have adsorbed the polymer (1) and the others, release of the polymer (1) and the others to the environment can be prevented.

Alternatively, the polymer (1) and the others can be collected by removing and eluting the polymer (1) and the others from the ion exchange resin particles that have adsorbed the polymer (1) and the others by a known method. For example, when the ion exchange resin particles are anion exchange resin particles, the polymer (1) and the others can be eluted by bringing a mineral acid into contact with the anion exchange resin. Subsequently, when a water-soluble organic solvent is added to the resulting eluate, it is usually separated into two phases, and therefore, by collecting and neutralizing the lower phase, which contains the polymer (1) and the others, the polymer (1) and the others can be collected. Examples of the water-soluble organic solvent described above include a polar solvent such as alcohol, ketone, and ether.

Other examples of the method for collecting the polymer (1) and the others from the ion exchange resin particles include a method using an ammonium salt and a water-soluble organic solvent, and a method using an alcohol and, if desired, an acid. In the latter method, ester derivatives of the polymer (1) and the others are produced, and thus, they can easily be separated from the alcohol by distillation.

When the discharge water described above contains perfluoroelastomer particles and other solids, it is preferable that they are removed before the discharge water and the adsorbent particles are brought into contact with each other. Examples of the method for removing the perfluoroelastomer particles and other solids include a method of adding an aluminum salt or the like to deposit these components, and then separating the discharge water and the deposits, and an electrocoagulation method. They may also be removed by a mechanical method, such as a crossflow filtration method, a deep bed filtration method, or a precoat filtration method.

The concentration of the above perfluoroelastomer that has not yet been agglomerated in the discharge water described above is preferably low, more preferably less than 1.0% by mass, and particularly preferably less than 0.5% by mass, from the viewpoint of productivity.

Examples of the method for collecting the polymer (1) and the others from the off gas described above include a method in which a scrubber is used and brought into contact with deionized water, an alkaline aqueous solution, an organic solvent such as a glycol ether solvent, or the like to provide a scrubber solution containing the polymer (1) and the others. When an alkaline aqueous solution with a high concentration is used as the alkaline aqueous solution, the scrubber solution can be collected with the polymer (1) and the others in a phase-separated state, making it easy to collect and reuse the polymer (1) and the others described above. Examples of the alkali compound include an alkali metal hydroxide and a quaternary ammonium salt.

The scrubber solution containing the polymer (1) and the others may be concentrated using a reverse osmosis membrane or the like. The concentrated scrubber solution usually contains fluorine ions, but by further adding alumina after the concentration to remove the fluorine ions, it is also possible to facilitate the reuse of the polymer (1) and the others. Alternatively, adsorbent particles may be brought into contact with the scrubber solution to adsorb the polymer (1) and the others, thereby collecting the polymer (1) and the others by the method mentioned above.

The polymer (1) and the others collected by any of the above methods can be reused for production of the perfluoroelastomer.

Next, a method for producing a crosslinkable composition of the present disclosure will be specifically described.

The method for producing a crosslinkable composition of the present disclosure includes obtaining an aqueous dispersion of a perfluoroelastomer by the production method mentioned above, and then mixing the obtained aqueous dispersion or the perfluoroelastomer obtained by recovering the perfluoroelastomer from the aqueous dispersion with at least one selected from the group consisting of an inorganic nitride, an organotin compound, an ammonia-generating compound, and a cross-linking agent, to provide a crosslinkable composition. From the crosslinkable composition obtained by the production method of the present disclosure, a crosslinked product can be easily obtained.

The inorganic nitride is not limited, but examples thereof include silicon nitride ($Si_3N_4$), lithium nitride, titanium nitride, aluminum nitride, boron nitride, vanadium nitride, and zirconium nitride. Among these, it is preferable that the inorganic nitride is silicon nitride because it can supply nano-sized fine particles.

Examples of the organotin compound include tetraphenyltin and triphenyltin.

As the ammonia-generating compound, a compound that generates ammonia at 40 to 330° C. is preferred.

As the ammonia-generating compound, preferred is urea or a derivative thereof, or an ammonium salt, more preferred is urea or an ammonium salt, and still more preferred is urea. The ammonium salt may be either an organic ammonium salt or an inorganic ammonium salt. Also, the ammonia-generating compound may be one that reacts with a minute amount of water to generate ammonia.

Examples of the derivative of urea include biurea, thiourea, urea hydrochloride, and biuret.

Examples of the organic ammonium salt include the compounds described in Japanese Patent Laid-Open No. 9-111081, International Publication No. WO 00/09603, and International Publication No. WO 98/23675, including ammonium salts of polyfluorocarboxylic acids such as ammonium perfluorohexanoate and ammonium perfluorooctanoate; ammonium salts of polyfluorosulfonic acids such as ammonium perfluorohexanesulfonate and ammonium perfluorooctanesulfonate; ammonium salts of polyfluoroalkyl group-containing phosphoric acids or phosphonic acids such as ammonium perfluorohexanephosphate and ammonium perfluorooctanephosphate; and ammonium salts of non-fluorinated carboxylic or sulfonic acids such as ammonium benzoate, ammonium adipate, and ammonium phthalate.

Examples of the inorganic ammonium salt include the compounds described in Japanese Patent Laid-Open No. 9-111081, such as ammonium sulfate, ammonium carbonate, ammonium nitrate, and ammonium phosphate.

In addition, examples of the ammonia-generating compound also include acetaldehyde ammonia, hexamethylenetetramine, formamidine, formamidine hydrochloride, formamidine acetate, t-butyl carbamate, benzyl carbamate, $HCF_2CF_2CH(CH_3)OCONH_2$, and phthalamide.

Examples of the cross-linking agent include a cross-linking agent used in peroxide crosslinking, polyol crosslinking, polyamine crosslinking, triazine crosslinking, oxazole crosslinking, imidazole crosslinking, and thiazole crosslinking.

The cross-linking agent used in peroxide crosslinking may be any organic peroxide that can easily generate peroxy radicals in the presence of heat or a redox system, and specific examples thereof may include 1,1-bis(t-butylperoxy)-3,5,5-trimethylcyclohexane, 2,5-dimethylhexane-2,5- dihydroperoxide, di-t-butyl peroxide (PERBUTYL D), t-butyl cumyl peroxide (PERBUTYL C), dicumyl peroxide (PERCUMYL D, PERCUMYL D-40, PERCUMYL D-40MB(T)), α,α-bis(t-butylperoxy)-p-diisopropylbenzene, 2,5-dimethyl-2,5-di(t-butylperoxy)hexane (PERHEXA 25B, PERHEXA 25B-40), 2,5-dimethyl-2,5-di(t-butylperoxy)-hexyne-3 (PERHEXYNE 25B, PERHEXYNE 25B-40), benzoyl peroxide, t-butylperoxybenzene, 2,5-dimethyl-2,5-di(benzoylperoxy)hexane (PERHEXA 25Z), t-butyl peroxymaleate (t-butyl MA), t-butyl peroxyisopropylcarbonate (PERBUTYL I-75), methyl ethyl ketone peroxide (PERMEK D (DR), PERMEK H (HR, HY), PERMEK N (NR, NY), PERMEK S (SR), PERMEK F (FR), PERMEK G (GR, GY)), cyclohexanone peroxide (PERHEXA H), acetylacetone peroxide (PERCURE AH, AL), 1,1-di(t-hexylperoxy)-3,3,5-trimethylcyclohexane (PERHEXA TMH), 1,1-di(t-hexylperoxy)cyclohexane (PERHEXA HC), 1,1-di(t-butylperoxy)-2-methylcyclohexane (PERHEXA MC), 1,1-di(t-butylperoxy)cyclohexane (PERHEXA C-80 (S), PERHEXA C-75 (EB), PERHEXA C (C), PERHEXA C-40, PERHEXA C-40MB (S)), 2,2-di(t-butylperoxy)butane (PERHEXA 22), butyl 4,4-di-(t-butylperoxy) pentanoate (PERHEXA V, PERHEXA V-40 (F)), 2,2-di(4,4-di-(t-butylperoxy)cyclohexyl)propane (PERTETRA A), p-menthane hydroperoxide (PERMENTA H), diisopropylbenzene hydroperoxide (PERCUMYL P), 1,1,3,3-tetramethylbutyl hydroperoxide (PEROCTA H), cumene hydroperoxide (PERCUMYL H-80), t-butyl hydroperoxide (PERBUTYL H-69), di(2-t-butylperoxyisopropyl)benzene (PERBUTYL P, PERBUTYL P-40, PEROXYMON F-40, PERBUTYL P-40 MB(K)), di-t-hexyl peroxide (PERHEXYL D), diisobutyryl peroxide (PEROYL IB), di(3,5,5-trimethylhexanoyl) peroxide (PEROYL 355 (S)), dilauroyl peroxide (PEROYL L), disuccinic acid peroxide (PEROYL SA), di-(3-methylbenzoyl) peroxide, benzoyl (3-methylbenzoyl) peroxide, and a mixture of dibenzoyl peroxides (NYPER BMT-K40, NYPER BMT-M), dibenzoyl peroxide (NYPER BW, NYPER BO, NYPER FF, NYPER BS, NYPER E, NYPER NS), di(4-methylbenzoyl) peroxide (NYPER PMB), di-n-propyl peroxydicarbonate (PEROYL NPP-50M), diisopropyl peroxydicarbonate (PEROYL IPP-50, PEROYL IPP-27), di(4-t-butylcyclohexyl) peroxydicarbonate (PEROYL TCP), di(2-ethylhexyl) peroxydicarbonate (PEROYL OPP), di-sec-butyl peroxydicarbonate (PEROYL SBP), cumyl peroxyneodecanoate (PERCUMYL ND, PERCUMYL ND-50E), 1,1,3,3-tetramethylbutyl peroxyneodecanoate (PEROCTA ND, PEROCTA ND-50E), t-hexyl peroxyneodecanoate (PERHEXYL ND, PERHEXYL ND-50E), t-butyl peroxyneodecanoate (PERBUTYL ND, PERBUTYL ND-50E), t-butyl peroxyneoheptanoate (PERBUTYL NHP), t-hexyl peroxypivalate (PERHEXYL PV, PERHEXYL PV-50E), t-butyl peroxypivalate (PERBUTYL PV, PERBUTYL PV-40E), 1,1,3,3-tetramethylbutyl peroxy-2-ethylhexanoate (PEROCTA O), 2,5-dimethyl-2,5-di(2-ethylhexanoylperoxy)hexane (PERHEXA 250), t-hexyl peroxy-2-ethylhexanoate (PERHEXYL O, PERCURE HO(N)), t-butyl peroxy-2-ethylhexanoate (PERBUTYL O, PERCURE O), t-hexyl peroxyisopropylmonocarbonate (PERHEXYL I), t-butyl peroxy-3,5,5-trimethylhexanoate (PERBUTYL 355), t-butyl peroxylaurate (PERBUTYL L), t-butyl peroxy-2-ethylhexylmonocarbonate (PERBUTYL E), t-hexyl peroxybenzoate (PERHEXYL Z), t-butyl peroxyacetate (PERBUTYL A), a mixture of t-butyl peroxy-3-methylbenzoate and t-butyl peroxybenzoate (PERBUTYL ZT), t-butyl peroxybenzoate (PERBUTYL Z), t-butyl peroxyallylmonocarbonate (PEROMER AC), 3,3',4,4'-tetra(t-butylperoxycarbonyl)benzophenone (BTTB-25), and 2,3-dimethyl-2,3-diphenylbutane (NOFMER BC-90). Among these, preferred are of the dialkyl type. Furthermore, 2,5-dimethyl-2,5-di(t-butylperoxy)hexane is particularly preferred. In general, the type and amount of organic peroxide to be used are selected in consideration of the amount of active —O—O—, decomposition temperature, and the like.

Also, the cross-linking aid that can be used in this case is any compound that has reaction activity for peroxy radicals and polymer radicals, and examples thereof include a polyfunctional compound having a functional group such as $-CH{=}CH_2$, $-CH_2CH{=}CH_2$, $-CF{=}CF_2$, $-C(CF_3){=}CF_2$, $-C(CH_3){=}CF_2$, $-CF{=}CF(CF_3)$, $-CF{=}CF(CH_3)$, $-C(C_6H_5){=}CF_2$, $-CF{=}CF(C_6H_5)$, $-CH{=}CF_2$, $-CF{=}CHF$, $-C(CF_3){=}CHF$, $-CF{=}CH(CF_3)$, and $-CH{=}CF(CF_3)$ ("$C_6H_5$" in each formula represents a phenyl group). Specific examples thereof include triallyl cyanurate, triallyl isocyanurate (TAIC), triacrylformal, triallyl trimellitate, N,N'-n-phenylenebismaleimide, dipropagyl terephthalate, diaryl phthalate, tetraallyl terephthalateamide, triallyl phosphate, bismaleimide, fluorinated triallyl isocyanurate (1,3,5-tris(2,3,3-trifluoro-2-propenyl)-1,3,5-triazine 2,4,6-trione), tris(diallylamine)-S-triazine, triallyl phosphite, N,N-(diallylacrylamide), and 1,6-divinyldodecafluorohexane.

In addition, examples of the cross-linking aid to be used together with the peroxide cross-linking agent may also include a compound represented by a general formula (31):

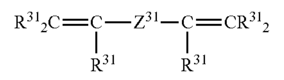

(in the formula, six $R^{31}$ are each independently H, a halogen atom, or an optionally halogenated group having 1 to 5 carbon atoms and optionally having an ether bond intercalated therein; and $Z^{31}$ is an optionally halogenated, linear or branched alkylene group having 1 to 18 carbon atoms and optionally containing a heteroatom, a cycloalkylene group, or a (per)fluoropolyoxyalkylene group).

Examples of the compound represented by the general formula (31) may include:

a compound represented by a general formula (32):

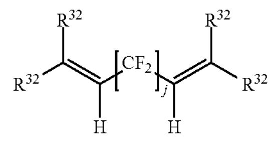

(in the formula, j is an integer of 2 to 10, preferably an integer of 4 to 8; and four $R^{32}$ are each independently H, F, or an alkyl group or (per)fluoroalkyl group having 1 to 5 carbon atoms);

a compound represented by a general formula (33):

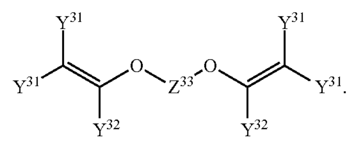

(in the formula, $Y^{31}$ is each independently F, Cl, or H; $Y^{32}$ is each independently F, Cl, H, or $OR^{33}$ (where $R^{33}$ is an optionally partially, substantially, or fully fluorinated or chlorinated, branched or linear alkyl group); $Z^{33}$ is an optionally fluorinated divalent group having 2 to 10 carbon atoms and optionally having an ether bond intercalated therein, and $Z^{33}$ is preferably a $—(CF_2)_m—$ group where m is an integer of 3 to 5; and the compound represented by the general formula (33) is preferably $F_2C{=}CF—O—(CF_2)_5—O—CF{=}CF_2$); and a compound represented by a general formula (34):

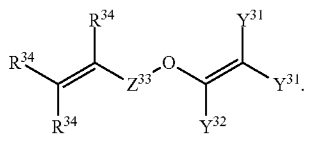

(in the formula, $Y^{31}$, $Y^{32}$, and $Z^{33}$ are each defined as described above; and $R^{34}$ is each independently H, F, or an alkyl group or (per)fluoroalkyl group having 1 to 5 carbon atoms).

Examples of the cross-linking agent or the cross-linking aid to be used together with the peroxide cross-linking agent may also include a compound having at least one structure represented by a general formula (35):

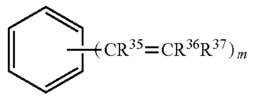

(in the formula, $R^{35}$ to $R^{37}$ are each independently a hydrogen atom, a fluorine atom, an alkyl group, a fluorinated alkyl group, or a substituted or unsubstituted aryl group, and at least one of $R^{35}$ to $R^{37}$ is a fluorine atom or a group containing a fluorine atom; m is an integer of 1 to 5; when m is 2 or more, m $R^{35}$ to $R^{37}$ may be the same as or different from each other; and the hydrogen atoms of the benzene ring are optionally substituted). When m is 1, it is preferable that the compound have 2 or more of the above structure.

Examples of the compound represented by the general formula (35) may include:

a compound represented by a general formula (36):

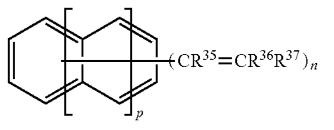

(in the formula, $R^{35}$ to $R^{37}$ are defined as described above; p is an integer of 0 to 2; and n is an integer of 2 to 6); and a compound represented by a general formula (37):

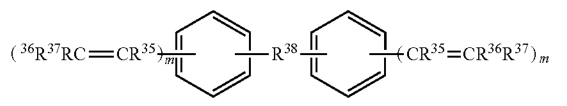

(in the formula, $R^{35}$ to $R^{37}$ are defined as described above; $R^{38}$ is a single bond, $—SO_2—$, —O—, —S—, —CO—, a heteroatom-containing group, a substituted or unsubstituted alkylene group, a substituted or unsubstituted cycloalkylene group, or a substituted or unsubstituted arylene group; m is an integer of 1 to 5; these groups may be partially or fully fluorinated).

The heteroatom-containing group is not limited as long as it is a divalent group containing a heteroatom. Examples of the heteroatom may include an oxygen atom, a nitrogen atom, a sulfur atom, a boron atom, and a phosphorus atom.

Examples of the cross-linking agent used in polyol cross-linking include a polyhydric alcohol compound such as bisphenol A and bisphenol AF.

Examples of the cross-linking agent used in polyamine crosslinking include a polyvalent amine compound such as hexamethylenediamine carbamate, N,N'-dicinnamylidene-1,6-hexanediamine, and 4,4'-bis(aminocyclohexyl)methane carbamate.

Examples of the cross-linking agent used in triazine crosslinking include an organotin compound such as tetraphenyltin and triphenyltin.

Examples of the cross-linking agent used in oxazole crosslinking, imidazole crosslinking, and thiazole crosslinking include:

a bisdiaminophenyl cross-linking agent, bisaminophenol cross-linking agent, or bisaminothiophenol cross-linking agent represented by a general formula (41):

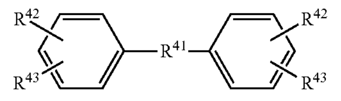

(in the formula, $R^{41}$ is $—SO_2—$, —O—, —CO—, an alkylene group having 1 to 6 carbon atoms, a perfluoroalkylene group having 1 to 10 carbon atoms, a single bond, or a group represented by the following formula:

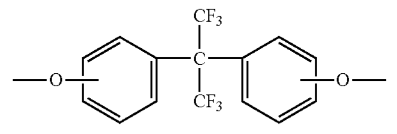

one of $R^{42}$ and $R^{43}$ is $—NH_2$ and the other is $—NHR^{44}$, $—NH_2$, —OH, or —SH, where $R^{44}$ is a hydrogen atom, a fluorine atom, or a monovalent organic group, and preferably $R^{42}$ is $—NH_2$ and $R^{43}$ is $—NHR^{44}$; specific preferred examples of the alkylene group having 1 to 6 carbon atoms may include a methylene group, an ethylene group, a propylene group, a butylene group, a pentylene group, and a hexylene group, and examples of the perfluoroalkylene group having 1 to 10 carbon atoms include:

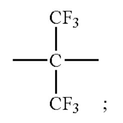

and note that these compounds are known as examples of bisdiaminophenyl compounds in Japanese Patent Publication No. 2-59177, Japanese Patent Laid-Open No. 8-120146, and the like);

a bisamidrazone cross-linking agent represented by a general formula (42):

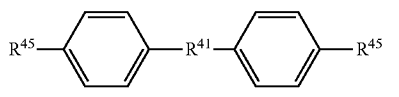

(in the formula, $R^{41}$ is defined as described above; and $R^{45}$ is each independently any of the following groups);

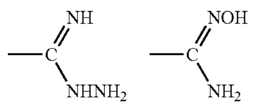

an amidrazone cross-linking agent represented by a general formula (43):

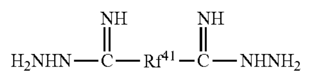

(in the formula, $Rf^{41}$ is a perfluoroalkylene group having 1 to 10 carbon atoms);

a bisamidoxime cross-linking agent represented by a general formula (44):

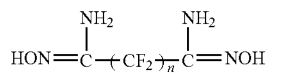

(in the formula, n is an integer of 1 to 10); and a compound represented by a general formula (45): $HN{=}CR^{45}R^{46}$ (in the formula, $R^{45}$ is selected from the group consisting of H, $NH_2$, and $NHR^{47}$; $R^{46}$ is selected from the group consisting of Ph, $SO_2H$, $NR^{48}R^{49}$, 2-pyridine, and $CH_2CONH_2$; $R^{47}$ is selected from the group consisting of Ph, $NH_2$, and CN; $R^{48}$ is selected from the group consisting of H, NHPh, $CH_2CONH_2$, a linear alkyl group having 1 to 8 carbon atoms, and a branched alkyl group having 1 to 8 carbon atoms; and $R^{49}$ is selected from the group consisting of Ph, $COOC(CH_3)_3$, $NH_2$, $CH_2COOH$, $CSNH_2$, $CNHNH_3{}^+Cl^-$, p-phenyl-CN,

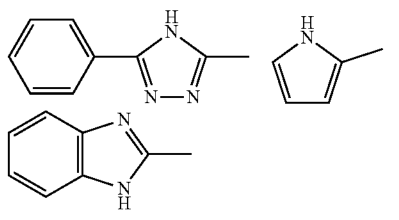

and COPh). These bisaminophenol cross-linking agent, bisaminothiophenol cross-linking agent, and bisdiaminophenyl cross-linking agent are conventionally used in crosslinking systems that use cyano groups as crosslinking points, but they also react with carboxyl groups and alkoxycarbonyl groups to form oxazole rings, thiazole rings, and imidazole rings, providing crosslinked products.

Examples of the cross-linking agent may also include a cross-linking agent represented by a general formula (46): $X^{41}—(CH_2)_n—R^{50}—(CH_2)_m—X^{41}$ (in the formula, $X^{41}$ is each independently an alkyne group, a cyano group, or $Y^{41}{}_pN_3$ ($Y^{41}$ is SO, $SO_2$, $C_6H_4$, or CO and p is 0 or 1); n and m are each independently an integer of 1 to 4; and $R^{50}$ is selected from the group consisting of:

i) a fluoroalkylene group having 3 to 10 carbon atoms;
ii) a fluoroalkoxylene group having 3 to 10 carbon atoms;
iii) a substituted arylene group;
iv) an oligomer comprising copolymerization units of vinylidene fluoride and perfluoro(methyl vinyl ether);
v) an oligomer comprising copolymerization units of vinylidene fluoride and hexafluoropropylene;
vi) an oligomer comprising copolymerization units of tetrafluoroethylene and perfluoro(methyl vinyl ether); and
vii) an oligomer comprising copolymerization units of tetrafluoroethylene and a hydrocarbon olefin). It is preferable that this cross-linking agent is used together with a perfluoroelastomer having a cyano group, an azide group, a sulfonyl azide group, a carbonyl azide group, or an alkyne group. For example, a cyano group of the perfluoroelastomer reacts with an azide group of the cross-linking agent to form a tetrazole ring, providing a crosslinked product.

Examples of the particularly preferred cross-linking agent include a compound having multiple 3-amino-4-hydroxyphenyl groups or 3-amino-4-mercaptophenyl groups, and a compound represented by a general formula (47):

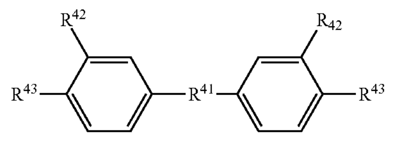

(in the formula, $R^{41}$, $R^{42}$, and $R^{43}$ are defined as described above), and specific examples thereof include 2,2-bis(3-amino-4-hydroxyphenyl)hexafluoropropane (generic name: bis(aminophenol) AF), 2,2-bis(3-amino-4-mercaptophenyl)hexafluoropropane, tetraaminobenzene, bis-3,4-diaminophenylmethane, bis-3,4-diaminophenyl ether, 2,2-bis(3,4-diaminophenyl)hexafluoropropane, 2,2-bis[3-amino-4-(N-phenylamino)phenyl]hexafluoropropane, 2,2-bis[3-amino-4-(N-methylamino)phenyl]hexafluoropropane, 2,2-bis[3-amino-4-(N-ethylamino)phenyl]hexafluoropropane, 2,2-bis[3-amino-4-(N-propylamino)phenyl]hexafluoropropane, 2,2-bis[3-amino-4-(N-perfluorophenylamino)phenyl]hexafluoropropane, and 2,2-bis[3-amino-4-(N-benzylamino)phenyl]hexafluoropropane.

Among these, 2,2-bis[3-amino-4-(N-phenylamino)phenyl]hexafluoropropane (AFTA-Ph) is preferred as the cross-linking agent from the viewpoint of heat resistance, steam resistance, amine resistance, and good crosslinkability.

The content of the cross-linking agent described above is preferably 0.05 to 10 parts by mass, and more preferably 0.5 to 5 parts by mass, based on 100 parts by mass of the perfluoroelastomer.

The crosslinkable composition may comprise a filler.

Examples of the filler include an organic filler, and from the viewpoint of heat resistance and plasma resistance (low particle generation and low weight loss during plasma irradiation), an organic pigment; an imide filler with an imide structure such as polyimide, polyamide-imide, and polyetherimide; and a ketone engineering plastic such as polyether ether ketone (PEEK) and polyether ketone (PEK) are preferred. In particular, an organic pigment is preferred.

Examples of the organic pigment include a condensed azo pigment, an isoindolinone pigment, a quinacridone pigment, a diketo-pyrrolo-pyrrole pigment, and an anthraquinone pigment, but among these, from the viewpoint of excellent heat resistance and chemical resistance and less influence on the characteristics of crosslinked products, a quinacridone pigment, a diketo-pyrrolo-pyrrole pigment, and an anthraquinone pigment are preferred, and a quinacridone pigment is more preferred.

Furthermore, a general filler may be contained as well. Examples of the general filler include an organic filler made of an engineering plastic such as polyarylate, polysulfone, polyethersulfone, polyphenylene sulfide, polyoxybenzoate, and polytetrafluoroethylene powder; a metal oxide filler such as aluminum oxide, silicon oxide, yttrium oxide, and titanium oxide; a metal carbide filler such as silicon carbide and aluminum carbide, and a metal nitride filler such as silicon nitride and aluminum nitride; and an inorganic filler such as aluminum fluoride, fluorocarbon, barium sulfate, carbon black, silica, clay, and talc.

Among these, from the viewpoint of shielding effects for various plasmas, carbon black, aluminum oxide, silicon oxide, yttrium oxide, silicon nitride, polyimide, fluorocarbon, and silicon carbide are preferred.

In addition, the inorganic filler and the organic filler may be compounded alone or in combination of two or more types.

The content of the filler in the crosslinkable composition is preferably 0.5 to 100 parts by mass, and more preferably 5 to 50 parts by mass, based on 100 parts by mass of the perfluoroelastomer.

Particularly, in a field where high purity and antistaining properties are not demanded, usual additives to be compounded into perfluoroelastomers if required, such as a processing aid, a plasticizer, and a coloring agent, can be compounded, and one or more types of ordinary cross-linking agents or cross-linking aids different from those described above may also be compounded.

The crosslinkable composition may comprise an organic basic compound. Examples of the organic basic compound may include:

octadecylamine of the formula: $CH_3(CH_2)_{17}—NH_2$;

erucamide of the formula: $H_2N—C(O)—(CH_2)_{11}—CH{=}CH—(CH_2)_7CH_3$;

oleamide of the formula: $H_2N—C(O)—(CH_2)_7—CH{=}CH—(CH_2)_7CH_3$;

hexamethylenediamine of the formula: $H_2N—(CH_2)_6—NH_2$; and 1,8-diazabicycloundec-7-ene (DBU) of the formula:

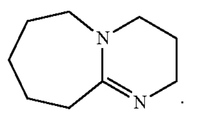

The crosslinkable composition can be prepared by mixing each of the above components using a normal processing machine for polymers, such as an open roll, a Banbury mixer, and a kneader. In addition, it can also be prepared by a method using an internal mixer.

Also, the present disclosure relates to a composition comprising a perfluoroelastomer and a polymer (1) containing a polymerization unit (1) based on a monomer (1) represented by a general formula (1) and having an ion exchange capacity of 1.50 meq/g or more.

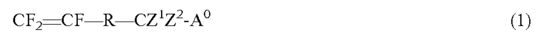

$$CF_2{=}CF—R—CZ^1Z^2\text{-}A^0 \quad (1)$$

(In the formula, R is a linking group, $Z^1$ and $Z^2$ are each independently F or $CF_3$, and $A^0$ is an anionic group.)

The suitable configuration of the perfluoroelastomer is the same as the configuration of the perfluoroelastomer obtained by the production method of the present disclosure.

The suitable configuration of the polymer (1) is the same as the configuration of the polymer (1) used in the production method of the present disclosure.

The form of the composition of the present disclosure is not limited, but it may be in the form of, for example, an aqueous dispersion, gum, crumb, powder, pellets, or the like. The aqueous dispersion refers to a dispersion system in which an aqueous medium is the dispersion medium and the perfluoroelastomer is the dispersoid. The aqueous medium described above is not limited as long as it is a liquid containing water, and it may be one containing, in addition to water, an organic solvent such as alcohol, ether, ketone, and paraffin wax.

The lower limit value of the content of the polymer (1) in the composition described above is preferably 0.0001% by mass, more preferably 0.001% by mass, still more preferably 0.01% by mass, and particularly preferably 0.1% by mass, based on the perfluoroelastomer. The upper limit value of the content of the polymer (1) in the composition described above is preferably 20% by mass, more preferably 10% by mass, still more preferably 6% by mass, further preferably 4% by mass, and most preferably 2% by mass or less.

The content of the polymer (1) in the composition described above can be determined by, for example, solid-state $^{19}F$-MAS NMR measurement. Examples of the method for measuring the content of the polymer (1) include methods for measuring the content of the respective polymers disclosed in International Publication No. WO 2014/099453, International Publication No. WO 2010/075497, International Publication No. WO 2010/075496, International Publication No. WO 2011/008381, International Publication No. WO 2009/055521, International Publication No. WO 1987/007619, Japanese Patent Laid-Open No. 61-293476, International Publication No. WO 2010/075494, International Publication No. WO 2010/075359, International Publication No. WO 2006/119224, International Publication No. WO 2013/085864, International Publication No. WO 2012/082707, International Publication No. WO 2012/082703, International Publication No. WO 2012/082454, International Publication No. WO 2012/082451, International Publication No. WO 2006/135825, International Publication No. WO 2004/067588, International Publication No. WO 2009/068528, Japanese Patent Laid-Open No. 2004-075978, Japanese Patent Laid-Open No. 2001-226436, International Publication No. WO 1992/017635, International Publication No. WO 2014/069165, Japanese Patent Laid-Open No. 11-181009, and the like. Specific examples of the apparatus used therefor include AVANCE III HD400 manufactured by Bruker and AVANCE300 manufactured by Bruker. The rotation speed is set according to the resonance frequency of the apparatus, and is set such that the spinning side band does not overlap the peaks used for the content calculation of the perfluoroelastomer or the polymer (1).

Also, the content of the polymer (1) in the composition described above may be measured by the following method. It can be measured by a method in which the composition described above is mixed with a solvent that dissolves the perfluoroelastomer, deionized water is added to the obtained mixed solution to extract the polymer (1) from the obtained mixed solution, the upper phase (aqueous phase) containing the polymer (1) is collected, and the mass of the residue (polymer (1)) obtained by heating and drying the collected upper phase is measured to calculate the content of the polymer (1).

As the solvent that dissolves the perfluoroelastomer, a perhalo solvent in which all of the hydrogen atoms are replaced with halogen atoms is preferred, and in particular, a perfluoro solvent in which all of the hydrogen atoms are replaced with fluorine atoms is preferred. Specific examples of the perfluoro solvent include a perfluoro tertiary amine such as perfluorotri-n-butylamine and perfluorotriethylamine, perfluorinated tetrahydrofuran, perfluorobenzene, Fluorinert FC-77 (manufactured by 3M Company), Demnum Solvent (manufactured by Daikin Industries, Ltd., main component: $C_6F_{14}$), R-318 (manufactured by Daikin Industries, Ltd., main component: $C_4FeCl_2$), and Fluorinert FC-43 (manufactured by 3M Company, main component: $(C_4F_9)_3N$), but among these, perfluorotri-n-butylamine and Fluorinert FC-77 are preferred from the viewpoint of handling properties.

Also, as the solvent that dissolves the perfluoroelastomer, various fluorinated solvents are preferably used in addition to those exemplified above, and specific examples thereof include a perfluoroalkane, a HFC (hydrofluorocarbon), a HFE (hydrofluoroether), and a HCFC (hydrochlorofluorocarbon). Specifically, mention may be made of HFE-7100 (manufactured by 3M Company, main component: $C_4F_9OCH_3$), HFE-7200 (manufactured by 3M Company, main component: $C_4F_9OC_2H_5$), and Vertrel XF (manufactured by The Chemours Company, main component: $C_5H_2F_{10}$).

The composition of the present disclosure may be an aqueous dispersion containing the perfluoroelastomer, the polymer (1), and the aqueous medium. The upper limit value of the solid concentration of the aqueous dispersion is preferably 50% by mass, more preferably 40% by mass, still more preferably 35% by mass, and particularly preferably 30% by mass, based on the aqueous dispersion. The lower limit value of the solid concentration of the aqueous dispersion is preferably 5% by mass, more preferably 10% by mass, still more preferably 15% by mass, and particularly preferably 20% by mass. The solid concentration of the aqueous dispersion can be adjusted by diluting or concentrating the aqueous dispersion obtained by polymerization.

The solid concentration of the aqueous dispersion refers to the concentration of solids contained in the aqueous dispersion. Examples of the solids include the perfluoroelastomer and the polymer (1). Also, the solid concentration of the aqueous dispersion may be the total content of the perfluoroelastomer and the polymer (1) in the aqueous dispersion. The solid concentration of the aqueous dispersion can be specified by drying 1 g of the aqueous dispersion at 150° C. for 60 minutes, measuring the mass of the non-volatile matter, and calculating the proportion of the mass of the non-volatile matter to the mass of the aqueous dispersion.

It is preferable that the composition of the present disclosure is substantially free from a fluorine-containing surfactant.

In the present disclosure, the expression "substantially free from a fluorine-containing surfactant" means that the proportion of the fluorine-containing surfactant contained is 10 ppm by mass or less based on the perfluoroelastomer. The proportion of the fluorine-containing surfactant contained is preferably 1 ppm by mass or less, more preferably 100 ppb by mass or less, still more preferably 10 ppb by mass or less, further preferably 1 ppb by mass or less, and particularly preferably the proportion of the fluorine-containing surfactant contained is below the detection limit as measured by liquid chromatography-mass spectrometry (LC/MS).

The proportion of the fluorine-containing surfactant contained can be quantified by a known method, and can be quantified by, for example, LC/MS analysis.

At first, to the obtained aqueous dispersion, powder, pellets, formed article, crosslinked product, or pulverized product obtained by micronizing the pellets, formed article, or crosslinked product, an organic solvent such as methanol is added to extract the fluorine-containing surfactant, and the extracted liquid is subjected to the LC/MS analysis. The molecular weight information is extracted from the resulting LC/MS spectrum to confirm agreement with the structural formula of the candidate surfactant. The extraction method may be the Soxhlet extraction method.

Thereafter, aqueous solutions having five or more different concentration levels of the confirmed surfactant are prepared, and LC/MS analysis is carried out for each concentration level to prepare a calibration curve with the area.

That is, the content of the fluorine-containing surfactant can be measured by, for example, adding methanol to the composition to carry out extraction and subjecting the resulting extracted liquid to the LC/MS analysis.

In order to further increase the extraction efficiency, a treatment by Soxhlet extraction, ultrasonic treatment, or the like may be carried out.

From the resulting LC/MS spectrum, molecular weight information is extracted, and a match with the structural formula of a candidate fluorine-containing surfactant is checked.

Thereafter, aqueous solutions having five or more different content levels of the confirmed fluorine-containing surfactant are prepared, and LC/MS analysis of the aqueous solution of each content is carried out, and the relationship between the content and the area for the content is plotted, and a calibration curve is drawn.

Then, using the calibration curve, the area of the LC/MS chromatogram of the fluorine-containing surfactant in the extract can be converted into the content of the fluorine-containing surfactant.

The fluorine-containing surfactant is the same as those exemplified in the production method of the present disclosure mentioned above. For example, the surfactant may be a fluorine atom-containing surfactant having, in the portion excluding the anionic group, 20 or less carbon atoms in total, may be a fluorine-containing surfactant having an anionic moiety having a molecular weight of 800 or less, and may be a fluorine-containing surfactant having a Log POW of 3.5 or less.

Examples of the anionic fluorine-containing surfactant described above include a compound represented by the general formula ($N^0$), and specific examples thereof include a compound represented by the general formula ($N^1$), a compound represented by the general formula ($N^2$), a compound represented by the general formula ($N^3$), a compound represented by the general formula ($N^4$), and a compound represented by the general formula ($N^5$). More specific examples thereof include a perfluorocarboxylic acid (I)

represented by the general formula (I), an ω-H perfluorocarboxylic acid (II) represented by the general formula (II), a perfluoroethercarboxylic acid (III) represented by the general formula (III), a perfluoroalkylalkylenecarboxylic acid (IV) represented by the general formula (IV), a perfluoroalkoxyfluorocarboxylic acid (V) represented by the general formula (V), a perfluoroalkylsulfonic acid (VI) represented by the general formula (VI), an ω-H perfluorosulfonic acid (VII) represented by the general formula (VII), a perfluoroalkylalkylenesulfonic acid (VIII) represented by the general formula (VIII), an alkylalkylenecarboxylic acid (IX) represented by the general formula (IX), a fluorocarboxylic acid (X) represented by the general formula (X), an alkoxyfluorosulfonic acid (XI) represented by the general formula (XI), a compound (XII) represented by the general formula (XII), and a compound (XIII) represented by the general formula (XIII).

It is preferable that the composition of the present disclosure contains little or no metal components. The metal content of the composition is preferably 10 ppm by mass or less, more preferably 7 ppm by mass or less, still more preferably 5 ppm by mass or less, and particularly preferably 1 ppm by mass or less. The composition with a reduced metal content may be a coagulated product or a dry product. The coagulated product can be obtained by coagulating the perfluoroelastomer in the aqueous dispersion, and the dried product can be obtained by drying the coagulated product. The composition with a reduced metal content can be suitably used for components in semiconductor manufacturing apparatuses.

The metal content of the composition can be determined by placing the composition in a platinum crucible, washing it with dilute nitric acid and ultrapure water, ashing it with a burner and an electric furnace, decomposing it by heating with sulfuric acid and hydrofluoric acid, dissolving it in dilute nitric acid to prepare a solution for measurement, measuring, for the obtained solution for measurement, the contents of 30 metal elements (Fe, Na, K, Li, Be, Mg, Al, Ca, Ti, V, Cr, Mn, Co, Ni, Cu, Zn, Ga, Rb, Sr, Zr, Mo, Ag, Cd, In, Sn, Cs, Ba, Pb, Bi, and Th) using an ICP mass spectrometer (manufactured by Agilent Technologies, Agilent 8800), and summing up each measured value.

Suitably, the composition of the present disclosure can be produced by the production method of the present disclosure.

The present disclosure also relates to a crosslinkable composition comprising the composition described above and a cross-linking agent. The suitable configuration of the cross-linking agent is the same as the configuration of the crosslinkable composition obtained by the production method of the present disclosure. The crosslinkable composition may comprise the filler mentioned above and usual additives to be compounded into perfluoroelastomers if required, such as a processing aid, a plasticizer, and a coloring agent.

By crosslinking the crosslinkable composition mentioned above, a crosslinked product can be obtained.

The crosslinking described above can be carried out in the order of primary crosslinking and secondary crosslinking. It is preferable to carry out the primary crosslinking at 150 to 250° C. for 5 to 120 minutes, and it is more preferable to carry out it at 170 to 200° C. for 5 to 60 minutes. As the crosslinking means, a known crosslinking means may be used, and examples thereof may include press crosslinking.

It is preferable to carry out the secondary crosslinking at 250 to 320° C. for 2 to 48 hours, and it is more preferable to carry out it at 280 to 310° C. for 5 to 24 hours. As the crosslinking means, a known crosslinking means may be used, and examples thereof may include oven crosslinking.

The crosslinkable composition may be formed to obtain a preform, followed by crosslinking to provide the crosslinked product (formed article). The method for forming the crosslinkable composition to obtain the preform may be a usual method, and it can be carried out by a known method such as a method in which the crosslinkable composition is heated and compressed in a metal mold, a method in which the crosslinkable composition is pressed into a heated metal mold, and a method in which the crosslinkable composition is extruded by an extruder. In the case of extruded products such as hoses and electric wires, the crosslinked product can be obtained by carrying out heating crosslinking with steam or the like after extrusion.

The crosslinked product of the present disclosure can be suitably used as a sealing material for semiconductor manufacturing apparatuses that particularly require heat resistance, and especially for semiconductor manufacturing apparatuses where high density plasma irradiation is carried out. Examples of the sealing material described above include an O-ring, a square ring, a gasket, a packing, an oil seal, a bearing seal, and a lip seal.

In addition, it can also be used for various polymer products used in semiconductor manufacturing apparatuses, such as a diaphragm, a tube, a hose, various rubber rolls, and a belt. It can also be used as a coating material and lining material.

Note that the semiconductor manufacturing apparatuses as used herein are not limited to those for manufacturing semiconductors in particular, but encompass a wide range of manufacturing apparatuses used in the semiconductor field that require a high level of cleanliness, such as those for manufacturing liquid crystal panels and plasma panels. Examples thereof may include the following.

(1) Etching Apparatuses
Dry etching apparatuses
Plasma etching apparatuses
Reactive ion etching apparatuses
Reactive ion beam etching apparatuses
Sputter etching apparatuses
Ion beam etching apparatuses
Wet etching apparatuses
Ashing apparatuses (2) Cleaning Apparatuses
Dry etching cleaning apparatuses
$UV/O_3$ cleaning apparatuses
Ion beam cleaning apparatuses
Laser beam cleaning apparatuses
Plasma cleaning apparatuses
Gas etching cleaning apparatuses
Extraction cleaning apparatuses
Soxhlet extraction cleaning apparatuses
High temperature high pressure extraction cleaning apparatuses
Microwave extraction cleaning apparatuses
Supercritical extraction cleaning apparatuses (3) Exposure Apparatuses
Steppers
Coater/developers (4) Polishing Apparatuses
CMP apparatuses (5) Film Forming Apparatuses
CVD apparatuses
Sputtering apparatuses (6) Diffusion/Ion Implantation Apparatuses Oxidation diffusion apparatuses Ion implantation apparatuses The crosslinked product of the present disclosure exhibits excellent performance as, for example, a sealing material for CVD apparatuses, plasma etching apparatuses, reactive ion etching apparatuses, ashing apparatuses, or excimer laser exposure machines.

In addition, the crosslinked product of the present disclosure has excellent heat resistance, oil resistance, amine resistance, chemical resistance, and low-temperature resistance, and is generally used for locations that slide in contact with other materials, encapsulate or seal other materials or substances, or are intended for vibration proofing or sound proofing. It can be used as various components in a variety of fields such as the automobile industry, aircraft industry, and semiconductor industry.

Examples of the fields in which the crosslinked product of the present disclosure is used include: the semiconductor-related field; the automobile field; the aircraft field; the space and rocket field; the shipping field; the chemical product field, such as chemical plants; the pharmaceutical field, such as pharmaceuticals; the photographic field, such as developers; the printing field, such as printing machines; the painting field, such as painting facilities; the analytical and physical and chemical machinery fields, such as analytical equipment and measuring equipment; the food equipment field, including food plant equipment and household products; the beverage and food production apparatus field; the pharmaceutical production apparatus field; the medical component field; the chemical agent transportation equipment field; the nuclear power plant equipment field; the iron and steel field, such as iron plate processing facilities; the general industrial field; the electrical field; the fuel cell field; the electronic component field; the optical equipment component field; the space equipment component field; the petrochemical plant equipment field; the field of equipment components for exploring and mining energy resources such as petroleum and gas; the petroleum refinement field; and the petroleum transportation equipment component field.

Examples of the forms of use of the crosslinked product of the present disclosure include various sealing materials and packings, such as a ring, a packing, a gasket, a diaphragm, an oil seal, a bearing seal, a lip seal, a plunger seal, a door seal, a lip and face seal, a gas delivery plate seal, a wafer support seal, and a barrel seal. It can be used as a sealing material for applications that require heat resistance, solvent resistance, chemical resistance, and non-stickiness.

Also, it can be used as a tube, a hose, a roll, various types of rubber roll, a flexible joint, a rubber plate, a coating, a belt, a damper, a valve, a valve seat, a valve body, a chemical resistant coating material, a laminating material, a lining material, and the like.

The cross-sectional shape of the ring, packing, and seal described above may be any of various shapes, and, specifically, it may be, for example, a square shape, an O-shape, or a ferrule, or may be an irregular shape such as a D-shape, an L-shape, a T-shape, a V-shape, an X-shape, or a Y-shape.

In the semiconductor-related field described above, the crosslinked product of the present disclosure can be used in, for example, a semiconductor manufacturing apparatus, a liquid crystal panel manufacturing apparatus, a plasma panel manufacturing apparatus, a plasma display panel manufacturing apparatus, a plasma-addressed liquid crystal panel manufacturing apparatus, an organic EL panel manufacturing apparatus, a field emission display panel manufacturing apparatus, a solar cell substrate manufacturing apparatus, and a semiconductor transport apparatus. Examples of such apparatuses include a CVD apparatus, a gas control apparatus such as a semiconductor gas control apparatus, a dry etching apparatus, a wet etching apparatus, a plasma etching apparatus, a reactive ion etching apparatus, a reactive ion beam etching apparatus, a sputter etching apparatus, an ion beam etching apparatus, an oxidation diffusion apparatus, a sputtering apparatus, an ashing apparatus, a plasma ashing apparatus, a cleaning apparatus, an ion implantation apparatus, a plasma CVD apparatus, a ventilation apparatus, an exposure apparatus, a polishing apparatus, a film forming apparatus, a dry etching cleaning apparatus, a UV/$O_3$ cleaning apparatus, an ion beam cleaning apparatus, a laser beam cleaning apparatus, a plasma cleaning apparatus, a gas etching cleaning apparatus, an extraction cleaning apparatus, a Soxhlet extraction cleaning apparatus, a high temperature high pressure extraction cleaning apparatus, a microwave extraction cleaning apparatus, a supercritical extraction cleaning apparatus, a cleaning apparatus involving hydrofluoric acid, hydrochloric acid, sulfuric acid, ozone water, or the like, a stepper, a coater/developer, a CMP apparatus, an excimer laser exposure machine, chemical solution piping, gas piping, an apparatus for carrying out plasma treatment such as $NF_3$ plasma treatment, $O_2$ plasma treatment, and fluorine plasma treatment, a heat treatment film forming apparatus, a wafer transport apparatus, a wafer cleaning apparatus, a silicon wafer cleaning apparatus, a silicon wafer treatment apparatus, an apparatus used in LP-CVD process, an apparatus used in lamp annealing process, and an apparatus used in reflow process.

Examples of the specific forms of use in the semiconductor-related field include various sealing materials such as an O-ring and a gasket for a gate valve, a quartz window, a chamber, a chamber lid, a gate, a bell jar, a coupling, and a pump; various sealing materials such as an O-ring for a resist developer and stripper, a hose, and a tube; a lining and a coating for a resist developer tank, a stripper tank, a wafer cleaning solution tank, and a wet etching tank; a diaphragm for a pump; a roll for wafer transport; a hose and a tube for a wafer cleaning solution; a sealing material for a clean facility, such as a sealant for a clean facility such as a clean room; a sealing material for a storage room for storing semiconductor manufacturing apparatuses and devices such as wafers; and a diaphragm for transferring a chemical solution used in a semiconductor manufacturing process.

In the automobile field described above, the crosslinked product of the present disclosure can be used for the engine body, the main drive system, the valve train system, the lubrication and cooling system, the fuel system, the air intake and exhaust system, the transmission system of the drive system, the steering system of the chassis, and the brake system, as well as an electrical component such as a basic electrical component, a control system electrical component, and an equipment electrical component. The automobile field described above also includes motorcycles.

In the engine body and its peripheral apparatuses as mentioned above, the crosslinked product of the present disclosure can be used for various sealing materials that require heat resistance, oil resistance, fuel oil resistance, resistance against antifreezing liquid for engine cooling, and steam resistance, and examples of such sealing materials include seals such as gaskets, shaft seals, and valve stem seals, non-contact or contact type packings such as self seal packings, piston rings, split ring type packings, mechanical seals, and oil seals, bellows, diaphragms, hoses, and tubes, as well as various sealing materials used for electric wires, cushioning materials, vibration proofing materials, and belt AT apparatuses.

Examples of the specific forms of use in the fuel system described above include an O-ring used for a fuel injector, a cold start injector, a fuel line quick connector, a sender flange quick connector, a fuel pump, a fuel tank quick connector, a gasoline mixing pump, a gasoline pump, a tube body of a fuel tube, a connector of a fuel tube, an injector, and the like; a seal used for an intake manifold, a fuel filter, a pressure regulating valve, a canister, a fuel tank cap, a fuel pump, a fuel tank, a fuel tank sender unit, a fuel injection apparatus, a fuel high pressure pump, a fuel line connector system, a pump timing control valve, a suction control valve, a solenoid sub-assembly, a fuel cut valve, and the like; a canister purge solenoid valve seal, an onboard refueling vapor recovery (ORVR) valve seal, a fuel pump oil seal, a fuel sender seal, a fuel tank rollover valve seal, a filler seal, an injector seal, a filler cap seal, and a filler cap valve seal; a hose such as a fuel hose, a fuel supply hose, a fuel return hose, a vapor (evaporation) hose, a vent (breather) hose, a filler hose, a filler neck hose, a hose in a fuel tank (in-tank hose), a carburetor control hose, a fuel inlet hose, and a fuel breather hose; a gasket used for a fuel filter, a fuel line connector system, and the like, and a flange gasket used for a carburetor and the like; a line material for a steam recovery line, a fuel feed line, a vapor/ORVR line, and the like; a diaphragm used for a canister, an ORVR, a fuel pump, a fuel tank pressure sensor, a gasoline pump, a carburetor sensor, a composite air controller (CAC), a pulsation damper, a canister, an autocock, and the like, and a pressure regulator diaphragm of a fuel injector; a fuel pump valve, a carburetor needle valve, a rollover check valve, and a check valve; a tube used in a vent (breather) and a fuel tank; a tank packing for a fuel tank or the like, and a packing for a carburetor acceleration pump piston; a fuel sender anti-vibration component for a fuel tank; an O-ring and a diaphragm for controlling a fuel pressure; an accelerator pump cup; an in-tank fuel pump mount; an injector cushion ring of a fuel injector; an injector seal ring; a needle valve core valve of a carburetor; an acceleration pump piston of a carburetor; a valve seat of a compound air controller (CAC); a fuel tank body; and a seal component for a solenoid valve.

Examples of the specific forms of use in the brake system described above include a diaphragm used for a master back, a hydraulic brake hose air brake, a brake chamber of an air brake, and the like; a hose used for a brake hose, a brake oil hose, a vacuum brake hose, and the like; various sealing materials such as an oil seal, an O-ring, a packing, and a brake piston seal; a breather valve and a vacuum valve for a master back and a check valve for a brake valve; a piston cup (rubber cup) for a master cylinder, and a brake cup; and a boot for a master cylinder and a vacuum booster of a hydraulic brake, and a wheel cylinder of a hydraulic brake, and an O-ring and a grommet for an anti-lock brake system (ABS).

Examples of the specific forms of use in the basic electrical component described above include an insulator and a sheath of an electric wire (harness), a tube of a harness exterior component, and a grommet for a connector.

Examples of the specific forms of use in the control system electrical component include a coating material of various sensor wires.

Examples of the specific forms of use in the equipment electrical component described above include an O-ring and a packing for a car air conditioner, a cooler hose, a high pressure air conditioner hose, and an air conditioner hose, a gasket for an electronic throttle unit, a plug boot for direct ignition, and a diaphragm for a distributor. The crosslinked product of the present disclosure can also be used for bonding electrical components.

Examples of the specific forms of use in the above air intake and exhaust system include a packing used for an intake manifold, an exhaust manifold, and the like, and a throttle body packing for a throttle; a diaphragm used for EGR (exhaust gas recirculation), pressing control (BPT), a wastegate, a turbo wastegate, an actuator, an actuator for a variable turbine geometry (VTG) turbo, an exhaust purification valve, and the like; a hose such as an EGR (exhaust gas recirculation) control hose, an emission control hose, a turbo oil hose (supply) and a turbo oil hose (return) of a turbocharger, a turbo air hose, an intercooler hose, a turbocharger hose, a hose connected to a compressor of a turbo engine equipped with an intercooler, an exhaust gas hose, an air intake hose, a turbo hose, and a DPF (diesel particulate filter) sensor hose; an air duct and a turbo air duct; an intake manifold gasket; and a sealing material EGR, a sealing material used for an afterburn prevention valve seat of an AB valve, a turbine shaft seal (of a turbocharger and the like), and a groove component of a rocker cover and air suction manifold used in automobile engines.

In addition, in exhaust gas control components, the crosslinked product of the present disclosure can be used as a seal used for a steam recovery canister, a catalytic converter, an exhaust gas sensor, an oxygen sensor, and the like, and a seal for a solenoid armature of steam recovery and steam canister; and an intake manifold gasket.

In addition, in components relating to diesel engines, the crosslinked product of the present disclosure can be used as an O-ring seal for a direct injection injector, a rotary pump seal, a control diaphragm, a fuel hose, a diaphragm for EGR, a priming pump, and a boost compensator, and the like. It can also be used as an O-ring, a sealing material, a hose, a tube, and a diaphragm used for a urea SCR system, a sealing material for a urea water tank body and a urea water tank of a urea SCR system, and the like.

Examples of the specific forms of use in the transmission system described above include a transmission-related bearing seal, oil seal, O-ring, packing, and torque converter hose.

Examples thereof also include a transmission oil seal, and a transmission oil hose, an ATF hose, an O-ring, and a packing of an AT.

Note that the transmission includes an AT (automatic transmission), an MT (manual transmission), a CVT (continuously variable transmission), a DCT (dual clutch transmission), and the like.

Examples thereof also include an oil seal, a gasket, an O-ring, and a packing for a manual or automatic transmission, an oil seal, a gasket, an O-ring, and a packing for a continuously variable transmission (a belt type or a toroidal type), a packing for an ATF linear solenoid, an oil hose for a manual transmission, an ATF hose for an automatic transmission, and a CVTF hose for a continuously variable transmission (a belt type or a toroidal type).

Examples of the specific forms of use in the steering system include a power steering oil hose and a high pressure power steering hose.

Examples of the forms used in the engine body of an automobile engine include gaskets such as a cylinder head gasket, a cylinder head cover gasket, an oil pan packing, and a general-purpose gasket, seals such as an O-ring, a packing, and a timing belt cover gasket, hoses such as a control hose, anti-vibration rubber of an engine mount, a control valve diaphragm, and a camshaft oil seal.

In the main motor system of an automobile engine, the crosslinked product of the present disclosure can be used for a shaft seal such as a crankshaft seal and a camshaft seal, and the like.

In the valve train system of an automobile engine, the crosslinked product of the present disclosure can be used as a valve stem oil seal of an engine valve, a valve seat of a butterfly valve, and the like.

In the lubrication/cooling system of an automobile engine, the crosslinked product of the present disclosure can be used as an engine oil cooler hose, an oil return hose, and a seal gasket of an engine oil cooler, a water hose around a radiator, a radiator seal, a radiator gasket, a radiator O-ring, a vacuum pump oil hose of a vacuum pump, a radiator hose, a radiator tank, a diaphragm for oil pressure, a fan coupling seal, and the like.

As described above, specific examples of use in the automobile field include an engine head gasket, an oil pan gasket, a manifold packing, an oxygen sensor seal, an oxygen sensor bush, a nitrogen oxide (NOx) sensor seal, a nitrogen oxide (NOx) sensor bush, a sulfur oxide sensor seal, a temperature sensor seal, a temperature sensor bush, a diesel particle filter sensor seal, a diesel particle filter sensor bush, an injector O-ring, an injector packing, a fuel pump O-ring and diaphragm, a gearbox seal, a power piston packing, a cylinder liner seal, a valve stem seal, a static valve stem seal, a dynamic valve stem seal, an automatic transmission front pump seal, a rear axle pinion seal, a universal joint gasket, a speedometer pinion seal, a foot brake piston cup, a torque transmission apparatus O-ring and oil seal, a discharge gas afterburner seal and bearing seal, an afterburner hose, a carburetor sensor diaphragm, an anti-vibration rubber (such as an engine mount, an exhaust part, a muffler hanger, a suspension bush, a center bearing, and a strut bumper rubber), a suspension anti-vibration rubber (such as a strut mount and a bush), a drive system anti-vibration rubber (such as a damper), a fuel hose, an EGR tube and hose, a twin cab tube, a carburetor needle valve core valve, a carburetor flange gasket, an oil hose, an oil cooler hose, an ATF hose, a cylinder head gasket, a water pump seal, a gearbox seal, a needle valve tip, a motorcycle reed valve reed, an automobile engine oil seal, a gasoline hose gun seal, a car air conditioner seal, an engine intercooler rubber hose, a seal of fuel line connector systems, a CAC valve, a needle tip, an electric wire around an engine, a filler hose, a car air conditioner O-ring, an intake gasket, a fuel tank material, a distributor diaphragm, a water hose, a clutch hose, a PS hose, an AT hose, a master back hose, a heater hose, an air conditioner hose, a ventilation hose, an oil filler cap, a PS rack seal, a rack & pinion boot, a CVJ boot, a ball joint dust cover, a strut dust cover, a weather strip, a glass run, a center unit packing, a body sight welt, a bumper rubber, a door latch, a dash insulator, a high tension cord, a flat belt, a poly V belt, a timing belt, a toothed belt, a V-ribbed belt, a tire, a wiper blade, a diaphragm and a plunger for an LPG vehicle regulator, a diaphragm and a valve for a CNG vehicle regulator, a DME compatible rubber component, an auto tensioner diaphragm and boot, an idle speed control diaphragm and valve, an auto speed control actuator, a negative pressure pump diaphragm, a check valve and plunger, an O.P.S. diaphragm and O-ring, a gasoline pressure relief valve, an engine cylinder sleeve O-ring and gasket, a wet cylinder sleeve O-ring and gasket, a differential gear seal and gasket (gear oil seal and gasket), a power steering apparatus seal and gasket (PSF seal and gasket), a shock absorber seal and gasket (SAF seal and gasket), a constant velocity joint seal and gasket, a wheel bearing seal and gasket, a metal gasket coating agent, a caliper seal, a boot, a wheel bearing seal, and a bladder used in vulcanization molding of a tire.

In the aircraft field, the space and rocket field, and the shipping field described above, the crosslinked product of the present disclosure can be used especially in a fuel system and a lubricating oil system.

In the aircraft field described above, the crosslinked product of the present disclosure can be used as, for example, various aircraft sealing components, various aircraft components in aircraft engine oil applications, a jet engine valve stem seal, gasket, and O-ring, a rotating shaft seal, a hydraulic equipment gasket, a fire wall seal, a fuel supply hose, gasket, and O-ring, an aircraft cable, oil seal, and shaft seal, and the like.

In the space and rocket field described above, the crosslinked product of the present disclosure can be used as, for example, a lip seal, a diaphragm, and an O-ring for a spacecraft, a jet engine, a missile, and the like, a gas turbine engine oil-resistant O-ring, a vibration isolation table pad for missile ground control, and the like.

In the shipping field, the crosslinked product of the present disclosure can be used as, for example, a screw propeller shaft stern seal, a diesel engine intake/exhaust valve stem seal, a valve seal of a butterfly valve, a valve seat and a shaft seal of a butterfly valve, a shaft seal of a butterfly valve, a stern tube seal, a fuel hose, a gasket, an engine O-ring, a ship cable, a ship oil seal, a ship shaft seal, and the like.

In the above chemical product field such as chemical plants and pharmaceutical field such as pharmaceuticals, the crosslinked product of the present disclosure can be used in steps that require chemical resistance at a high level, such as steps of producing chemical products including pharmaceuticals, agrochemicals, coating materials, resins, and the like.

Examples of the specific forms of use in the above chemical product field and pharmaceutical field include seals used in a chemical apparatus, a pump and a flow meter for chemical reagents, piping for chemical reagents, a heat exchanger, an agrochemical sprayer, an agrochemical transfer pump, gas piping, a fuel cell, an analytical instrument and physicochemical instrument (such as column fitting for analytical instruments and measurement instruments), an expansion joint of a flue gas desulfurization apparatus, a nitric acid plant, a power plant turbine, and the like, a seal used in a medical sterilization process, a seal for a plating solution, a belt roller seal for paper making, a wind tunnel joint seal; an O-ring used in a chemical apparatus such as a reactor and a stirrer, an analytical instrument and measurement instrument, a chemical pump, a pump housing, a valve, a rotary meter, and the like, an O-ring for a mechanical seal, and an O-ring for compressor sealing; a packing used in a tube joint part or the like of a high temperature vacuum dryer, a gas chromatography, and a pH meter, and a glass cooler packing for a sulfuric acid manufacturing apparatus; a diaphragm used in a diaphragm pump, an analytical instrument, a physicochemical instrument, and the like; a gasket used in an analytical instrument and a measurement instrument; a fitting wheel (ferrule) used in an analytical instrument and a measurement instrument; a valve seat; a U cup; a lining used in a chemical apparatus, a gasoline tank, a wind tunnel, and the like, and a corrosion-resistant lining for an anodized aluminum processing tank; a coating of a masking jig for plating; a valve component of an analytical instrument and a physicochemical instrument; an expansion joint of a flue gas desulfurization plant; an acid resistant hose against concentrated sulfuric acid and the like, a chlorine gas transfer hose, an oil-resistant hose, a rainwater drain hose for benzene and toluene storage tanks; a chemical resistant tube and a medical tube used in an analytical instrument and a physicochemical instrument; a trichlorethylene-resistant roll for fiber dyeing and a dyeing roll; a medical plug for drug; a medical rubber plug; a chemical solution bottle, a chemical solution tank, a bag, a chemical container; and protective equipment such as a glove and a boot that are resistant to strong acids and solvents.

In the above photographic field such as developers, the printing field such as printing machines, and the painting field such as painting facilities, the crosslinked product of the present disclosure can be used as a roll, a belt, a seal, a valve component, and the like of a dry copier.

Examples of the specific forms of use in the above photographic field, printing field, and painting field include a surface layer of a transfer roll of a copier, a cleaning blade of a copier, and a copier belt; a roll (such as a fixing roll, a crimping roll, and a pressure roll) and a belt for QA equipment such as a copier, a printer, and a facsimile; a roll, a roll blade, and a belt of a PPC copier; a roll of a film developer and an X-ray film developer; a printing roll, a scraper, a tube, a valve component, and a belt for a printing machine; an ink tube, a roll, and a belt of a printer; a painting roll, a scraper, a tube, and a valve component of application and painting facilities; and a development roll, a gravure roll, a guide roll, a guide roll for a magnetic tape manufacturing coating line, a gravure roll for a magnetic tape manufacturing coating line, a coating roll, and the like.

In the above food equipment field, including food plant equipment and household products, the crosslinked product of the present disclosure can be used in a food manufacturing process and for food transfer equipment or food storage equipment.

Examples of the specific forms of use in the above food equipment field include a seal for a plate-type heat exchanger, a solenoid valve seal for an automatic vending machine, a jar pot packing, a sanitary pipe packing, a pressure cooker packing, a water heater seal, a heat exchanger gasket, a diaphragm and a packing for a food processing treatment apparatus, a rubber material for a food processing treatment machine (e.g., various seals such as a heat exchanger gasket, a diaphragm, and an O-ring, piping, a hose, a sanitary packing, a valve packing, and a filling packing used as a joint between the mouth of a bottle or the like and a filler during filling). Examples thereof also include a packing, a gasket, a tube, a diaphragm, a hose, and a joint sleeve used for products such as alcoholic beverages and soft drinks, a filling apparatus, a food sterilizer, a brewing apparatus, a water heater, and various automatic food vending machines.

In the nuclear power plant equipment field described above, the crosslinked product of the present disclosure can be used for a check valve and a pressure reducing valve around a nuclear reactor, a seal for a uranium hexafluoride enricher, and the like.

Examples of the specific forms of use in the general industrial field described above include: a sealing material for hydraulic equipment such as a machine tool, a construction machine, and a hydraulic machine; a seal and a bearing seal of a hydraulic and lubrication machine; a sealing material used for a mandrel and the like; a seal used for a window of a dry cleaner and the like; a seal and a (vacuum) valve seal for a cyclotron, a proton accelerator seal, a seal for an automatic packaging machine, a diaphragm of a pump for an analyzer of sulfur dioxide gas and chlorine gas in air (pollution measuring equipment), a snake pump lining, a roll and a belt for a printer, a transport belt (a conveyor belt), a squeezing roll for acid-washing of an iron plate and the like, a robot cable, a solvent squeezing roll for aluminum rolling line and the like, a coupler O-ring, an acid resistant cushioning material, a dust seal and a lip rubber for a sliding part of a cutting machine, a gasket for garbage incinerator, a friction material, a metal or rubber surface modifier, and a covering material. The crosslinked product of the present disclosure can also be used as a gasket and a sealing material for an apparatus used in a papermaking process, a sealant for a clean room filter unit, an architectural sealant, a protective coating agent for concrete, cement, and the like, a glass cloth impregnating material, a polyolefin processing aid, a polyethylene formability improving additive, a fuel tank for a small generator, a lawnmower, and the like, and a pre-coated metal obtained by applying a primer treatment to a metal plate. In addition, the crosslinked product of the present disclosure can be used as a sheet and a belt by impregnating a woven fabric therewith and baking it.

Examples of the specific forms of use in the iron and steel field described above include an iron plate processing roll for iron plate processing facilities.

Examples of the specific forms of use in the electrical field described above include an insulating oil cap for the Shinkansen bullet train, a benching seal for a liquid-sealed transformer, a transformer seal, an oil well cable jacket, a seal for an oven such as an electric furnace, a window frame seal for a microwave oven, a sealing material used when bonding a wedge and a neck of CRT, a sealing material for a halogen lamp, a fixing agent for an electrical component, a sealing material for end treatment of a sheathed heater, and a sealing material used as an insulation and moisture proof treatment of a lead wire terminal of electrical equipment. The crosslinked product of the present disclosure can also be used as a covering material of an oil resistant/heat resistant electric wire, a highly heat resistant wire, a chemical resistant wire, a highly insulated wire, a high voltage transmission line, a cable, an electric wire used in a geothermal power generation apparatus, an electric wire used around an automobile engine, and the like. The crosslinked product of the present disclosure can also be used as an oil seal and a shaft seal of a vehicle cable. Moreover, the crosslinked product of the present disclosure can also be used as an electrical insulation material (such as a material used as an insulation spacer of various electric apparatuses, an insulation tape used in a joint, a terminal part, and the like of a cable, and a heat-shrinkable tube), and an electric and electronic apparatus materials used in a high temperature atmosphere (such as a lead wire material for a motor and a wire material around a high temperature furnace). The crosslinked product of the present disclosure can also be used in a sealing layer and a protective film (a back sheet) of a solar cell.

In the fuel cell field described above, the crosslinked product of the present disclosure can be used as a sealing material between electrodes or between an electrode and a separator, a seal, a packing, a separator, and the like of piping for hydrogen, oxygen, generated water, and the like in polymer electrolyte fuel cells, phosphoric acid salt fuel cells, and the like.

In the electronic component field described above, the crosslinked product of the present disclosure can be used as a heat dissipation material raw material, an electromagnetic wave shielding material raw material, a gasket for a computer hard disk drive (magnetic recorder), and the like. It is also used as a cushioning rubber (a crash stopper) for a hard disk drive, a binder for an electrode active material of a nickel hydrogen secondary battery, a binder for an active material of a lithium-ion battery, a polymer electrolyte for a lithium secondary battery, a binder for the positive electrode of an alkaline rechargeable battery, a binder for an EL element (an electroluminescence element), a binder for the electrode active material of a capacitor, an encapsulating agent, a sealant, a film and a sheet for a covering material for the quartz of an optical fiber, an optical fiber covering material, and the like, a potting, a coating, and an adhesive seal for electronic components and circuit boards, a fixative for an electronic component, a modifying agent for an encapsulating agent such as epoxy, a coating agent for a printed circuit board, a modifying agent for a printed wiring board prepreg resin such as epoxy, an anti-scattering material for a light bulb and the like, a gasket for a computer, a cooling hose for a large computer, a packing such as a gasket or an O-ring for a secondary battery and especially a lithium secondary battery, a sealing layer for covering one or both outer surfaces of an organic EL structure, a connector, and a damper.

In the chemical agent transportation equipment field described above, the crosslinked product of the present disclosure can be used as a safety valve and a shipping valve for trucks, trailers, tank trucks, ships, and the like.

In the above field of equipment components for exploring and mining energy resources such as petroleum and gas, the crosslinked product of the present disclosure can be used as various sealing materials used when mining oil, natural gas, and the like, an electric connector boot used in oil wells, and the like.

Examples of the specific forms of use in the above field of equipment components for exploring and mining energy resources include a drill bit seal, a pressure regulating diaphragm, a horizontal drilling motor (stator) seal, a stator bearing (shaft) seal, a sealing material used in a blowout preventer (BOP), a sealing material used in a rotary blowout prevention apparatus (pipe wiper), a sealing material and a gas-liquid connector used in MWD (measurement while drilling) system, a logging tool seal used in a logging apparatus (logging equipment) (such as an O-ring, a seal, a packing, a gas-liquid connector, and a boot), an inflatable packer and a completion packer and a packer seal used therein, a seal and a packing used in a cementing apparatus, a seal used in a perforator, a seal and a packing and a motor lining used in a mud pump, an underground auditory detector cover, a U-cup, a composition seating cup, a rotating seal, a laminated elastomeric bearing, a flow control seal, a sand volume control seal, a safety valve seal, a seal of a hydraulic fracturing apparatus (fracturing equipment), a seal and a packing for a linear packer and a linear hanger, a wellhead seal and packing, a seal and a packing for a chalk and a valve, a sealing material for LWD (logging while drilling), a diaphragm used in oil exploration and oil drilling applications (such as a diaphragm for supplying lubricating oil to oil drilling bits), and a seal element for gate valves, electronic boots, and perforation guns.

Besides, the crosslinked product of the present disclosure can also be used in a joint seal for a kitchen, a bathroom, a washroom, and the like; a ground sheet of an outdoor tent; a seal for a stamp material; a rubber hose for a gas heat pump and a Freon-resistant rubber hose; an agricultural film, lining, and weather-resistant cover; a tank of a laminated steel sheet or the like used in the fields of construction and household electric appliances, and the like.

Moreover, the crosslinked product of the present disclosure can also be used as an article combined with a metal such as aluminum. Examples of such forms of use include a door seal, a gate valve, a pendulum valve, a solenoid tip, and also a piston seal and a diaphragm combined with a metal, a metal rubber component combined with a metal, such as a metal gasket.

The crosslinked product of the present disclosure can also be used as a rubber component, a brake shoe, a brake pad, and the like of bicycles.

Also, one exemplary form of the crosslinked product of the present disclosure is a belt.

Examples of the belt are as follows: a power transmission belt (including a flat belt, a V-belt, a V-ribbed belt, a toothed belt, and the like), a flat belt used as a transport belt (conveyor belt) at various high-temperature sites, e.g., around an engine of agricultural machinery, a machine tool, industrial machinery, and the like; a conveyor belt for transporting bulk and particulate materials such as coal, crushed stone, earth and sand, ore, wood chips, and the like in a high temperature environment; a conveyor belt used in a steel mill such as a blast furnace; a conveyor belt in applications exposed to a high temperature environment in precision equipment assembly plants, food factories, and the like; a V-belt and a V-ribbed belt for agricultural machinery, general equipment (such as OA equipment, printing machines, and commercial dryers), automobiles, and the like; a transmission belt for a transfer robot; a toothed belt such as a transmission belt for food machines and machine tools; and a toothed belt used in an automobile, OA equipment, medical equipment, a printing machine, and the like.

In particular, a timing belt is a representative example of a toothed belt for automobiles.

The belt described above may have a single-layer structure or a multi-layer structure.

In the case of a multilayer structure, the belt described above may be composed of a layer obtained by crosslinking the crosslinkable composition of the present disclosure and a layer composed of a further material.

Examples of the layer composed of a further material in the belt with a multilayer structure include a layer composed of a further rubber, a layer composed of a thermoplastic resin, various fiber reinforced layers, canvas, and a metal foil layer.

The crosslinked product of the present disclosure can also be used as an industrial anti-vibration pad, an anti-vibration mat, a railway slab mat, a pad, an automobile anti-vibration rubber, and the like. Examples of the automobile anti-vibration rubber include an anti-vibration rubber for an engine mount, a motor mount, a member mount, a strut mount, a bush, a damper, a muffler hanger, a center bearing, and the like.

Further examples of the forms of use include a joint member for a flexible joint, an expansion joint, and the like, a boot, and a grommet. In the shipping field, the crosslinked product of the present disclosure can be used as a marine pump and the like, for example.

The joint member refers to a joint used in piping and piping facilities, and used in applications for preventing vibration and noise generated from the piping system, absorbing expansion, contraction and displacement resulting from a temperature change and a pressure change, absorbing a dimensional change, mitigating and preventing the influences of earthquakes and land subsidence, and the like.

The flexible joint and the expansion joint can be preferably used as, for example, a complex-shape formed article for shipbuilding piping, for mechanical piping of a pump, a compressor, and the like, for chemical plant piping, for electrical piping, for civil engineering and water piping, and for automobiles.

The boot can be preferably used as a complex-shape formed article for various industrial boots, for example, a boot for an automobile such as a constant velocity joint boot, a dust cover, a rack and pinion steering boot, a pin boot, and a piston boot, a boot for agricultural machinery, a boot for an industrial vehicle, a boot for construction machinery, a boot for hydraulic machinery, a boot for pneumatic machinery, a boot for a centralized lubricator, a boot for liquid transfer, a boot for fire extinguishing, and a boot for transferring various types of liquefied gas.

The crosslinked product of the present disclosure can also be used for a diaphragm for a filter press, a diaphragm for a blower diaphragm, a diaphragm for supplying water, a diaphragm for a liquid storage tank, a diaphragm for a pressure switch, a diaphragm for an accumulator, a diaphragm for an air spring such as a suspension, and the like.

By adding the crosslinked product of the present disclosure to a rubber or a resin, an antislipping agent can be obtained that produces a formed article or a coating film that is not slippery in an environment that gets wet with water such as rain, snow, ice, or sweat.

In addition, the crosslinked product of the present disclosure can also be used as, for example, a cushioning material for hot press molding when producing decorative plywood, a printed circuit board, an electrical insulation board, and a rigid polyvinyl chloride laminate made of melamine resin, phenol resin, epoxy resin, or the like.

Besides, the crosslinked product of the present disclosure can also contribute to give impermeability to various supports such as sealing gaskets related to weapons and protective clothing against contact with invasive chemical agents.

The crosslinked product of the present disclosure can also be used as an O (square)-ring, a V-ring, an X-ring, a packing, a gasket, a diaphragm, an oil seal, a bearing seal, a lip seal, a plunger seal, a door seal, a lip and face seal, a gas delivery plate seal, a wafer support seal, a barrel seal, and other various sealing materials used for sealing lubricating oil (such as engine oil, transmission oil, and gear oil) containing amine-type additives (in particular, amine-type additives used as antioxidants and detergent dispersants) used in transportation systems such as automobiles and ships, and fuel oil and grease (in particular, urea-based grease), and can also be used as a tube, a hose, various rubber rolls, a coating, a belt, a valve body of a valve, and the like. The crosslinked product of the present disclosure can also be used as a laminating material and a lining material.

The crosslinked product of the present disclosure can also be used as a covering material for heat resistant and oil resistant electric wires used as, for example, lead electric wires for sensors that come into contact with transmission oil and/or engine oil and detect their oil temperature and/or oil pressure in internal combustion engines of automobiles and the like, and can also be used in a high temperature oil atmosphere such as in the oil pan of automatic transmissions and engines.

Besides, the crosslinked product of the present disclosure may be used to form a vulcanized film. Specific examples thereof include applications such as a non-stick oil resistant roll for a copier, a weather strip for preventing weathering and freezing, an infusion rubber stopper, a vial rubber stopper, a mold release agent, a non-stick light-weight transport belt, an adhesion preventing coating on a play gasket of an automobile engine mount, a synthetic fiber coating processing, a bolt member or a joint having thin packing-coated layer, and the like.

Note that the applications of the crosslinked product of the present disclosure with respect to the automobile-related components encompass applications for motorcycle components with similar structures.

Also, examples of the fuel in the above automobile-related field include light oil, gasoline, and fuel for diesel engines (including biodiesel fuel).

In addition to being crosslinked and used as a crosslinked product, the crosslinkable composition of the present disclosure can also be used as various components in a variety of industrial fields. Therefore, applications of the crosslinkable composition of the present disclosure will be described next.

The crosslinkable composition of the present disclosure can be used for a surface modifier for metals, rubbers, plastics, glass, and the like; a sealing material and a covering material that require heat resistance, chemical resistance, oil resistance, and non-stickiness, such as a metal gasket and an oil seal; a non-sticky covering material or a bleed barrier, such as a roll for OA equipment and a belt for OA equipment; impregnation of a woven fabric sheet and a belt, and application by baking; and the like.

The crosslinkable composition of the present disclosure, by being configured to have a high viscosity and a high concentration, can be used as a sealing material, a lining, and a sealant having a complex shape by an ordinary method; by being configured to have a low viscosity, can be used to form a thin film of several micrometers; and, by being configured to have a medium viscosity, can be used to coat a pre-coated metal, an O-ring, a diaphragm, and a reed valve.

Furthermore, it can also be used for application to a transportation roll or a belt for woven fabrics and paper leaves, a belt for printing, a chemical resistant tube, a medicine stopper, and a fuel hose.

As articles and substrates to be covered with the crosslinkable composition of the present disclosure, the following can be used: metals such as iron, stainless steel, copper, aluminum, and brass; glass products such as glass plates, woven and non-woven fabrics of glass fibers; formed articles and covered products of general purpose and heat resistant resins such as polypropylene, polyoxymethylene, polyimide, polyamide-imide, polysulfone, polyethersulfone, and polyether ether ketone; formed articles and covered products of general purpose rubbers such as SBR, butyl rubber, NBR, and EPDM, and of heat resistant rubbers such as silicone rubber and fluororubber; woven and non-woven fabrics of natural fibers and synthetic fibers; and the like.

The covered products formed from the crosslinkable composition of the present disclosure can be used in fields where heat resistance, solvent resistance, lubricity, and non-stickiness are required, and examples of the specific applications include rolls (for example, fixing rolls and adhesion rolls) and transportation belts for OA equipment such as copiers, printers, and facsimiles; sheets and belts; O-rings, diaphragms, chemical resistant tubes, fuel hoses, valve seals, gaskets for chemical plants, engine gaskets, and the like.

The crosslinkable composition of the present disclosure can also be dissolved in a solvent and used as a coating material or adhesive. It can also be used as an emulsion dispersion (latex) and as a coating material.

The composition described above is used as, for example, a sealing material and a lining for various apparatuses, pipes, and the like, and a surface-treating agent for structures made of inorganic and organic substrates such as metal, ceramic, glass, stone, concrete, plastic, rubber, wood, paper, and fiber.

The composition described above can be applied to a substrate and the like by dispenser coating or screen printing coating.

The crosslinkable composition of the present disclosure may be used as a coating material composition for casting a film or for immersing a substrate such as fabric, plastic, metal, or elastomer.

In particular, the crosslinkable composition of the present disclosure may be used, in the form of latex, to produce covered fabrics, protective gloves, impregnated fibers, O-ring coverings, coverings for fuel system quick coupling O-rings, coverings for fuel system seals, coverings for fuel tank rollover valve diaphragms, coverings for fuel tank pressure sensor diaphragms, coverings for oil filter and fuel filter seals, coverings for fuel tank sender seals and sender head fitting seals, coverings for copier fusing mechanism rolls, and polymer coating material compositions.

It is useful for covering silicone rubbers, nitrile rubbers, and other elastomers. To increase the thermal stability thereof as well as both the permeation resistance and the chemical resistance of substrate elastomers, the crosslinkable composition of the present disclosure is also useful for covering components made from such elastomers. Other applications include coverings for heat exchangers, expansion joints, butts, tanks, fans, flue ducts and other pipe conduits, and storage structures such as concrete storage structures. The composition described above may be applied to exposed cross-sections of multilayer component structures, for example, in methods for producing hose structures and diaphragms. Sealing members in connections and joints are often composed of hard materials, and the crosslinkable composition of the present disclosure provides a tight fit with improved frictional interface, leakage along the sealing surface reduced to a trace amount, and enhanced dimensions. The latex thereof increases seal durability in a variety of automobile system applications.

The crosslinkable composition of the present disclosure can also be used in production of power steering systems, fuel systems, air conditioning systems, and any joints where hoses and tubes are connected to other components. Further usefulness of the composition described above is in repairing manufacturing defects (and damages caused by use) in multilayer rubber structures such as three-layer fuel hoses. The composition described above is also useful for application to thin steel plates that can be formed or embossed before or after the coating material is applied. For example, multiple layers of covered steel can be assembled to create a gasket between two rigid metal members. The sealing effect is obtained by applying the crosslinkable composition of the present disclosure between those layers. This process can be used to produce engine head gaskets and exhaust manifold gaskets for the purpose of lowering the bolt forces and strains of the assembled components, while providing good fuel savings and low emissions due to low cracks, deflections, and hole strains.

In addition, the crosslinkable composition of the present disclosure can also be used as a coating agent; a substrate-integrated gasket and packing formed by dispenser-molding the composition onto a substrate containing an inorganic material such as metal or ceramic; a multi-layer article obtained by being coated onto a substrate containing an inorganic material such as metal or ceramic; and the like.

While embodiments have been described above, it will be understood that various changes in form and details can be made without departing from the gist and scope of the claims.

According to the present disclosure, provided is a method for producing a perfluoroelastomer aqueous dispersion by polymerizing a perfluoromonomer in the presence of a polymer (1) and an aqueous medium to produce an aqueous dispersion of a perfluoroelastomer, the polymer (1) containing a polymerization unit (1) based on a monomer (1) represented by a general formula (1) and the polymer (1) having an ion exchange capacity of 1.50 meq/g or more.

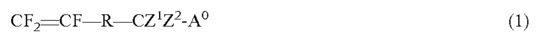

$CF_2{=}CF{-}R{-}CZ^1Z^2{-}A^0$ (1)

(In the formula, R is a linking group, $Z^1$ and $Z^2$ are each independently F or $CF_3$, and $A^0$ is an anionic group.)

In the production method of the present disclosure, it is preferable that $A^0$ is —COOM or —$SO_3M$ (in the formula, M is H, a metal atom, $NR^7{}_4$, imidazolium optionally having a substituent, pyridinium optionally having a substituent, or phosphonium optionally having a substituent and $R^7$ is H or an organic group).

In the production method of the present disclosure, it is preferable that the monomer (1) is a monomer (2) represented by a general formula (2).

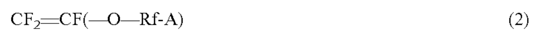

$CF_2{=}CF({-}O{-}Rf{-}A)$ (2)

(In the formula, Rf is a fluorine-containing alkylene group having 1 to 40 carbon atoms or a fluorine-containing alkylene group having 2 to 100 carbon atoms and having an ether bond or a keto group. A is —COOM, —$SO_3M$, —$OSO_3M$, or —$C(CF_3)_2OM$ (M is H, a metal atom, $NR^7{}_4$, imidazolium optionally having a substituent, pyridinium optionally having a substituent, or phosphonium optionally having a substituent and $R^7$ is H or an organic group).)

In the production method of the present disclosure, it is preferable that A is —COOM or —$SO_3M$ (in the formula, M is H, a metal atom, $NR^7{}_4$, imidazolium optionally having a substituent, pyridinium optionally having a substituent, or phosphonium optionally having a substituent and $R^7$ is H or an organic group).

In the production method of the present disclosure, it is preferable that the polymer (1) has a weight average molecular weight of $1.4\times10^4$ or more.

In the production method of the present disclosure, it is preferable that the content of the polymerization unit (1) is 50 mol % or more based on all polymerization units constituting the polymer (1).

In the production method of the present disclosure, it is preferable that the polymer (1) is added in an amount of 0.01 to 20% by mass based on 100% by mass of the aqueous medium.

In the production method of the present disclosure, it is preferable that the polymerization of the perfluoromonomer is carried out substantially in the absence of a fluorine-containing surfactant.

In the production method of the present disclosure, it is preferable that the polymerization of the perfluoromonomer is carried out in the presence of a pH adjuster.

In the production method of the present disclosure, it is preferable that the polymerization of the perfluoromonomer is carried out in the presence of a polymerization initiator and that the polymerization initiator is added in an amount of 0.0001 to 10% by mass based on 100% by mass of the perfluoromonomer.

Also, according to the present disclosure, provided is a method for producing a crosslinkable composition, comprising obtaining an aqueous dispersion of a perfluoroelastomer by the production method described above, and then mixing the aqueous dispersion or the perfluoroelastomer obtained by recovering the perfluoroelastomer from the aqueous dispersion with at least one selected from the group consisting of an inorganic nitride, an organotin compound, an ammonia-generating compound, and a cross-linking agent, to provide a crosslinkable composition.

Also, according to the present disclosure, provided is a method for producing a crosslinked product, comprising obtaining a crosslinkable composition by the production method described above, and then crosslinking the crosslinkable composition to provide a crosslinked product.

Also, according to the present disclosure, provided is a composition comprising a perfluoroelastomer and a polymer (1) containing a polymerization unit (1) based on a monomer (1) represented by a general formula (1) and having an ion exchange capacity of 1.50 meq/g or more.

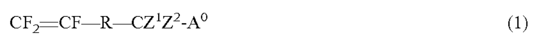

$$CF_2{=}CF{-}R{-}CZ^1Z^2{-}A^0 \quad (1)$$

(In the formula, R is a linking group, $Z^1$ and $Z^2$ are each independently F or $CF_3$, and $A^0$ is an anionic group.)

In the composition of the present disclosure, it is preferable that $A^0$ is —COOM or —$SO_3M$ (in the formula, M is H, a metal atom, $NR^7{}_4$, imidazolium optionally having a substituent, pyridinium optionally having a substituent, or phosphonium optionally having a substituent and $R^7$ is H or an organic group).

In the composition of the present disclosure, it is preferable that the monomer (1) is a monomer (2) represented by a general formula (2).

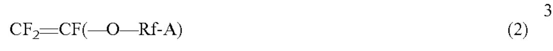

$$CF_2{=}CF({-}O{-}Rf{-}A) \quad (2)$$

(In the formula, Rf is a fluorine-containing alkylene group having 1 to 40 carbon atoms or a fluorine-containing alkylene group having 2 to 100 carbon atoms and having an ether bond or a keto group. A is —COOM, —$SO_3M$, —$OSO_3M$, or —$C(CF_3)_2OM$ (M is H, a metal atom, $NR^7{}_4$, imidazolium optionally having a substituent, pyridinium optionally having a substituent, or phosphonium optionally having a substituent and $R^7$ is H or an organic group).)

In the composition of the present disclosure, it is preferable that A is —COOM or —$SO_3M$ (in the formula, M is H, a metal atom, $NR^7{}_4$, imidazolium optionally having a substituent, pyridinium optionally having a substituent, or phosphonium optionally having a substituent and $R^7$ is H or an organic group).

In the composition of the present disclosure, it is preferable that the polymer (1) has a weight average molecular weight of $1.4\times10^4$ or more.

In the composition of the present disclosure, it is preferable that the content of the polymerization unit (1) is 50 mol % or more based on all polymerization units constituting the polymer (1).

In the composition of the present disclosure, it is preferable that the content of the polymer (1) is 0.0001 to 20% by mass based on the perfluoroelastomer.

It is preferable that the composition of the present disclosure is substantially free from a fluorine-containing surfactant.

It is preferable that the composition of the present disclosure is an aqueous dispersion.

In the composition of the present disclosure, it is preferable that the solid concentration of the aqueous dispersion is 5 to 50% by mass based on the aqueous dispersion.

In the composition of the present disclosure, it is preferable that the metal content of the composition is 10 ppm by mass or less.

Also, according to the present disclosure, provided is a crosslinkable composition comprising the composition described above and at least one selected from the group consisting of an inorganic nitride, an organotin compound, an ammonia-generating compound, and a cross-linking agent.

Also, according to the present disclosure, provided is a crosslinked product obtained by crosslinking the crosslinkable composition described above.

EXAMPLES

Next, embodiments of the present disclosure will now be described with reference to Examples, but the present disclosure is not limited only to these Examples.

Each numerical value in Examples was measured by the following methods.

<Oxygen Concentration in Reactor>

Gas discharged from the discharge gas line connected to the reactor was measured and analyzed using a low-concentration oxygen analyzer (trade name "PS-820-L", manufactured by Iijima Electronics Corporation) to thus determine the oxygen concentration in the reactor during polymerization.

<Concentration of Polymer>

In a vacuum dryer, about 1 g of an aqueous solution of a polymer was dried at 60° C. for 60 minutes, the mass of non-volatile matter was measured, and the ratio of the mass of the non-volatile matter to the mass (1 g) of the aqueous solution of the polymer was expressed in percentage and taken as the concentration thereof.

<Weight Average Molecular Weight (Mw) and Number Average Molecular Weight (Mn) of Polymer>

The Mw and Mn were determined by gel permeation chromatography (GPC) using 1260 Infinity II manufactured by Agilent Technologies, using a column manufactured by Tosoh Corporation (one TSKgel G3000$PW_{XL}$), performing measurement by allowing a mixed solvent of Tris buffer and acetonitrile (Tris buffer:acetonitrile=8:2 (v/v)) as the solvent to flow at a flow rate of 0.5 ml/min, and calculating the molecular weights using monodisperse polyethylene oxide (PEO) and polyethylene glycol (PEG) as standards.

In the measurement of Mw and Mn of the polymer obtained in Preparation Example 4, columns manufactured by Tosoh Corporation (one TSKgel G3000$PW_{XL}$ and one TSG gel $GMPW_{XL}$) were used in a coupled manner, in place of the column described above.

<Alternation Ratio>

$^{19}F$-NMR measurement of the polymer was carried out, and from the total integrated value of each of the two peaks (the peak appearing at −75 ppm to −80 ppmm and the peak appearing at −80 ppm to −84 ppm) derived from "$OCF_2$*" of $CF_2{=}CFOCF_2CF_2SO_3Na$ that appear in the NMR spectrum, the alternation ratio was calculated according to the following calculation formula.

$$\text{Alternation ratio } (\%) \geq (b\times2)/(a+b)\times100$$

a: total integrated value of peak in −75 ppm to −80 ppmm area b: total integrated value of peak in −80 ppm to −84 ppm area The alternation ratio calculated as described above is the ratio of the polymerization unit adjacent to the polymerization unit based on VdF among the polymerization unit based on $CF_2{=}CFOCF_2CF_2SO_3Na$ in the polymer.

The ratio of the carbon atom (C*) in the polymerization unit based on VdF ($C^*H_2{=}CF_2$) bonded to the carbon atom (C*) in the polymerization unit based on $CF_2{=}C^*FOCF_2CF_2SO_3Na$ can be determined by the following calculation formula.

$$Ratio(\%)=(b\times 2)/(a+b)\times 100$$

The ratio of carbon atoms other than the carbon atom (C*) in the polymerization unit based on VdF ($C^*H_2{=}CF_2$) (carbon atoms (C) in the polymerization unit based on $C^{}F_2{=}C^{}FOCF_2CF_2SO_3Na$ and carbon atom (C) in the polymerization unit based on VdF ($CH_2{=}C^{**}F_2$)) bonded to the carbon atom (C*) in the polymerization unit based on $CF_2{=}C^*FOCF_2CF_2SO_3Na$ can be determined by the following calculation formula.

$$Ratio(\%)=(a-b)/(a+b)\times 100$$

<Solid Concentration of Aqueous Dispersion Containing Perfluoroelastomer>

In an air dryer, 1 g of the aqueous dispersion containing the perfluoroelastomer was dried at a condition of 150° C. for 60 minutes, and the proportion of the mass of the non-volatile matter to the mass of the aqueous dispersion (1 g) was expressed by percentage and taken as the solid concentration thereof.

<Compositional Features of Perfluoroelastomer>

Measurement was performed by $^{19}F$-NMR (solid-state NMR) and a Fourier transform infrared spectrophotometer (FT-IR).

<Iodine Content>

Measurement was performed by elemental analysis.

<Glass Transition Temperature of Perfluoroelastomer>

As for the glass transition temperature, by using a differential scanning calorimeter (manufactured by Mettler-Toledo, DSC822e) and increasing the temperature of 10 mg of the sample at 10° C./min, a DSC curve was obtained, and then the peak top temperature of the differential curve specified in JIS K6240 was taken as the glass transition temperature.

<Mooney Viscosity of Perfluoroelastomer>

The Mooney viscosity was measured in accordance with JIS K6300 at 170° C. or 100° C. using a Mooney viscometer MV2000E model manufactured by ALPHA TECHNOLOGIES.

<Polymer Adhesion Rate>

The ratio (adhesion rate to a polymerization tank) of the mass of polymer deposits adhering to the polymerization tank after the completion of polymerization to the total amount of the polymer (the perfluoroelastomer) after the completion of polymerization was determined by the following expression.

$$\text{Polymer adhesion rate(mass \%)}=\text{Mass of polymer deposits/Mass of resulting polymer(including polymer deposits)}\times 100$$

$$\text{Mass of resulting polymer}=\text{Mass of aqueous dispersion}\times\text{Solid concentration(mass \%) of aqueous dispersion/100+Mass of polymer deposits}$$

Polymer deposits include the polymer adhering to the inside of a polymerization tank such as the inner wall of a polymerization tank and a stirring blade after an aqueous dispersion is removed from the polymerization tank after the completion of polymerization, and the polymer that is freed from the aqueous dispersion due to aggregation and floats or precipitates without being dispersed in the aqueous dispersion. The mass of polymer deposits is the mass after water contained in the polymer deposits is dried and removed at 120° C.

<Polymerization Rate>

The polymerization rate was calculated by the following expression.

$$\text{Polymerization rate}=\{\text{weight of aqueous dispersion}\times\text{solid concentration}/100\}/\{(\text{amount of pure water used in polymerization}+\text{amount of water contained in aqueous solution of polymer (1) used in polymerization})\times\text{polymerization time}\}$$

The units for each amount in the expression are as follows.

weight of aqueous dispersion: g
solid concentration: % by mass
amount of pure water used in polymerization: kg
amount of water contained in aqueous solution of polymer (1) used in polymerization: kg
polymerization time: hour
polymerization rate: g/(hour×kg)

<Average Particle Size>

As for the average particle size (the cumulant average diameter) of perfluoroelastomer particles in an aqueous dispersion, measurement was carried out by dynamic light scattering using ELSZ-1000S (manufactured by Otsuka Electronics Co., Ltd.), and the average particle size was calculated by a cumulant method.

<Number of Perfluoroelastomer Particles in Aqueous Dispersion>

The number of perfluoroelastomer particles in an aqueous dispersion was calculated by the following expression.

$$\text{Number of polymer particles}=\left\{\frac{\text{Solid concentration of aqueous dispersion (mass\%)}}{100-\text{Solid concentration of aqueous dispersion (mass\%)}}\right\}/\left\{\frac{4}{3}\times 3.14\times\left(\frac{\text{Average particle size (nm)}}{2}\times 10^{-9}\right)^3\times\text{Specific gravity}\times 10^6\right\}$$

In the expression, the average particle size is a cumulant average size as calculated by the method described above, and the number of polymer particles (the number of perfluoroelastomer particles) is the number of particles per 1 cc of water, with the measured value of the specific gravity of the perfluoroelastomer being used as the specific gravity.

<Metal Content in Perfluoroelastomer Obtained after Coagulation, Washing, and Drying>

The metal content in the perfluoroelastomer was determined by placing the perfluoroelastomer in a platinum crucible, washing it with dilute nitric acid and ultrapure water, ashing it with a burner and an electric furnace, decomposing it by heating with sulfuric acid and hydrofluoric acid, dissolving it in dilute nitric acid to prepare a solution for measurement, measuring, for the obtained solution for measurement, the contents of 30 metal elements (Fe, Na, K, Li, Be, Mg, Al, Ca, Ti, V, Cr, Mn, Co, Ni, Cu, Zn, Ga, Rb, Sr, Zr, Mo, Ag, Cd, In, Sn, Cs, Ba, Pb, Bi, and Th) using an ICP mass spectrometer (manufactured by Agilent Technologies, Agilent 8800), and summing up each measured value.

Preparation Example 1

To 110 g of a monomer A represented by $CF_2{=}CFOCF_2CF_2COOH$ and 220 g of water was added ammonium persulfate (APS), and the mixture was stirred at 52° C. for 96 hours under a nitrogen atmosphere to obtain a polymer A aqueous solution A-1 containing a polymer A, which is a homopolymer of $CF_2{=}CFOCF_2CF_2COOH$. APS was additionally added as appropriate during the reaction and 5 mol % was used in total. The oxygen concentration in the reactor varied in the range of 11 ppm by volume to 61 ppm by volume. As a result of GPC analysis of the obtained polymer A aqueous solution A-1, the polymer A had a Mw of 15,000 and a Mn of 10,000. Water was added to the obtained polymer A aqueous solution A-1 to adjust the concentration to 2.2% by mass (polymer A aqueous solution A-2).

Preparation Example 2

To 150 g of the monomer A represented by $CF_2{=}CFOCF_2CF_2COOH$ and 300 g of water was added APS, and the mixture was stirred at 52° C. for 96 hours under a nitrogen atmosphere to obtain a polymer B aqueous solution B-1 containing a polymer B, which is a homopolymer of $CF_2{=}CFOCF_2CF_2COOH$. APS was additionally added as appropriate during the reaction and 4 mol % was used in total. The oxygen concentration in the reactor varied in the range of 30 ppm by volume to 65 ppm by volume. As a result of GPC analysis of the obtained polymer B aqueous solution B-1, the polymer B had a Mw of 17,000 and a Mn of 11,000. Water was added to the obtained polymer B aqueous solution B-1 to adjust the concentration to 2.2% by mass (polymer B aqueous solution B-2).

Preparation Example 3

30 g of a monomer C represented by $CF_2{=}CFOCF_2CF(CF_3)OCF_2CF_2COOH$, 60 g of water, 0.5 eq of $NH_3$ (an amount corresponding to 0.5 equivalents relative to the monomer C), and 2 mol % of APS were added, and the mixture was stirred at 52° C. for 72 hours under a nitrogen atmosphere to obtain a polymer C aqueous solution C-1 containing a polymer C, which is a homopolymer of $CF_2{=}CFOCF_2CF(CF_3)OCF_2CF_2COOH$. The oxygen concentration in the reactor varied in the range of 20 ppm by volume to 50 ppm by volume. As a result of GPC analysis of the obtained polymer C aqueous solution C-1, the polymer C had a Mw of 14,000 and a Mn of 9,000. To the obtained polymer C aqueous solution C-1 were added water and 0.4 eq of $NH_3$ (an amount corresponding to 0.4 equivalents relative to the monomer C used in the polymerization), and the concentration was adjusted to 2.8% by mass (polymer C aqueous solution C-2).

Example 1

<Polymerization of CN Group-Containing Perfluoroelastomer>

In a stainless steel autoclave with an internal volume of 0.5 liters (made of SUS316, equipped with a FULLZONE type stirring blade and one baffle plate) without an ignition source, 108.2 g of deionized water and 88.6 g of the polymer A aqueous solution A-2 (solid concentration: 2.2% by mass) were placed, and the system was then thoroughly purged with nitrogen gas, degassed, and heated to 54° C. while stirring at 1,000 rpm. Then, a mixed gas of tetrafluoroethylene (TFE) and perfluoromethyl vinyl ether (PMVE) (TFE/PMVE=24/76 mol % ratio) was charged therein such that the internal pressure reached 0.83 MPa·G. Next, 0.259 g of $CF_2{=}CFOCF_2CF(CF_3)OCF_2CF_2CN$ (CNVE) was pressed in with nitrogen along with 0.8 g of deionized water, and then 1.03 g of ammonium persulfate (APS) was dissolved in 2.5 g of deionized water and pressed in with nitrogen to initiate the reaction.

As the polymerization progressed, the pressure in the tank was decreased, and therefore, when the pressure reached 0.735 MPa·G, 2 g of TFE and 2.2 g of PMVE were introduced into the autoclave to raise the pressure. Similarly, as the reaction progressed, TFE and PMVE were pressed in at a ratio of 60/40 mol %, and the pressure was repeatedly increased and decreased between 0.735 MPa·G and about 0.89 MPa·G, so that 28 g of TFE and 30.8 g of PMVE were pressed in by the completion of polymerization. During the polymerization, when the total amount of TFE charged reached 6, 10, 14, 18, and 24 g respectively, 0.259 g of $CF_2{=}CFOCF_2CF(CF_3)OCF_2CF_2CN$ was pressed in with nitrogen five times along with 0.8 g of deionized water.

Thereafter, the autoclave was cooled and the unreacted monomer was released to obtain 248 g of an aqueous dispersion with a solid concentration of 19.7% by mass. The polymerization time was 7.3 hours. After the aqueous dispersion was taken out, the polymer adhering to the stirring blade, wall inside the tank, and baffle plate of the autoclave was collected and heated to remove moisture, and the amount thereof was 5.7 g. The adhesion rate was calculated according to the above expression and it was 10.4% by mass.

(Post-Treatment of CN Group-Containing Perfluoroelastomer)

100 g of the obtained aqueous dispersion was mixed with and diluted with 75 g of deionized water. This mixed and diluted solution was added dropwise to 700 g of a 10% aqueous hydrochloric acid solution. The dropping was carried out while stirring the aqueous hydrochloric acid solution.

The perfluoroelastomer was coagulated in the aqueous hydrochloric acid solution, and thus the coagulated perfluoroelastomer was filtered out, transferred to 100 g of deionized water, and washed with stirring for 5 minutes. After 5 minutes, the perfluoroelastomer was again filtered out, transferred to 100 g of deionized water, and washed with stirring for 5 minutes. After this, the washing operation with 100 g of deionized water was repeated, and the perfluoroelastomer was filtered out when the pH of the washing water after rinsing reached 6 or higher. The filtered-out perfluoroelastomer was vacuum dried at 70° C. for 48 hours. The obtained perfluoroelastomer was 19.3 g.

(Analysis of CN Group-Containing Perfluoroelastomer)

Analysis of the obtained perfluoroelastomer showed the following results.

Compositional features of perfluoroelastomer: TFE/PMVE/CNVE=58.4/41.1/0.53 mol %

Glass transition temperature: −3.4° C.

The polymerization rate was calculated according to the above expression and it was 34.2 g/(hour×kg).

The cumulant average diameter of perfluoroelastomer particles in the aqueous dispersion was 49.7 nm. The number of perfluoroelastomer particles in the aqueous dispersion was calculated according to the above expression and it was $1.9\times10^{15}$ particles/cc.

Example 2

The polymerization was carried out in the same manner as in Example 1, except that the amount of deionized water initially charged was changed to 86.5 g and the amount of the polymer A aqueous solution A-2 (solid concentration: 2.2% by mass) was changed to 110.8 g, respectively, thereby obtaining 255 g of an aqueous dispersion with a solid concentration of 21.2% by mass.

The polymerization time was 6.8 hours. The polymer adhering inside the tank was collected and heated to remove moisture, and the amount thereof was 2.8 g and the adhesion rate was 5.0% by mass.

The obtained aqueous dispersion was subjected to the post-treatment in the same manner as in Example 1, thereby obtaining 19.6 g of the perfluoroelastomer.

Analysis of the obtained perfluoroelastomer showed the following results.

Compositional features of perfluoroelastomer: TFE/PMVE/CNVE=57.7/41.7/0.58 mol %

Glass transition temperature: −3.4° C.

The polymerization rate was 40.7 g/(hour×kg), the cumulant average diameter of perfluoroelastomer particles in the aqueous dispersion was 45.4 nm, and the number of perfluoroelastomer particles in the aqueous dispersion was $2.7\times10^{15}$ particles/cc.

Example 3

The polymerization was carried out in the same manner as in Example 1, except that the amount of deionized water initially charged was changed to 64.8 g and the amount of the polymer A aqueous solution A-2 (solid concentration: 2.2% by mass) was changed to 133.0 g, respectively, thereby obtaining 257 g of an aqueous dispersion with a solid concentration of 21.4% by mass.

The polymerization time was 6.9 hours. The polymer adhering inside the tank was collected and heated to remove moisture, and the amount thereof was 0.7 g and the adhesion rate was 1.3% by mass.

The obtained aqueous dispersion was subjected to the post-treatment in the same manner as in Example 1, thereby obtaining 19.6 g of the perfluoroelastomer.

Analysis of the obtained perfluoroelastomer showed the following results.

Compositional features of perfluoroelastomer: TFE/PMVE/CNVE=57.3/42.1/0.64 mol %

Glass transition temperature: −3.3° C.

The polymerization rate was 41.2 g/(hour×kg), the cumulant average diameter of perfluoroelastomer particles in the aqueous dispersion was 44.3 nm, and the number of perfluoroelastomer particles in the aqueous dispersion was $3.0\times10^{15}$ particles/cc.

Example 4

(Production of CN Group-Containing Perfluoroelastomer)

In a stainless steel autoclave with an internal volume of 6 liters (made of SUS316, equipped with a MAXBLEND type stirring blade and one baffle plate) without an ignition source, 1,255.3 g of deionized water and 1,083.3 g of the polymer B aqueous solution B-2 (solid concentration: 2.2% by mass) were placed, and the system was then thoroughly purged with nitrogen gas, degassed, and heated to 54.5° C. while stirring at 400 rpm. Then, a mixed gas of tetrafluoroethylene (TFE) and perfluoromethyl vinyl ether (PMVE) (TFE/PMVE=24/76 mol % ratio) was charged therein such that the internal pressure reached 0.83 MPa·G. Next, 1.21 g of $CF_2{=}CFOCF_2CF(CF_3)OCF_2CF_2CN$ (CNVE) was pressed in with nitrogen along with 1.5 g of deionized water, and then 14.7 g of ammonium persulfate (APS) was dissolved in 30 g of deionized water and pressed in with nitrogen to initiate the reaction.

As the polymerization progressed, when the pressure reached 0.735 MPa·G, 12 g of TFE and 13.3 g of PMVE were introduced into the autoclave to raise the pressure. Similarly, as the reaction progressed, TFE and PMVE were pressed in at a ratio of 60/40 mol %, and the pressure was repeatedly increased and decreased between 0.735 MPa·G and about 0.85 MPa·G. When 202.4 g of the mixed monomers were added, 16.44 g of a 10% aqueous ammonia solution was pressed in with nitrogen, and by the completion of polymerization, 328 g of TFE and 363.1 g of PMVE were pressed in, including the 12 g of TFE and 13.3 g of PMVE described above. During the polymerization, as intermediate addition, 1.21 g of CNVE was pressed into the polymerization tank 17 times, each time along with 1.5 g of deionized water. The x-th ($1\le x\le 17$) intermediate addition of CNVE was carried out when the amount of TFE charged exceeded $\{(328/18)\times x\}$g.

Thereafter, the autoclave was cooled and the unreacted monomer was released to obtain 3,127 g of an aqueous dispersion with a solid concentration of 23.1% by mass. The polymerization time was 6.6 hours. After the aqueous dispersion was taken out, the polymer adhering inside the tank was collected and heated to remove moisture, and the amount thereof was 20.1 g and the adhesion rate was 2.7% by mass.

For 1,000 g of the obtained aqueous dispersion, the post-treatment was carried out in the same manner as in Example 1, except that the deionized water added was 750 g, the 10% aqueous hydrochloric acid solution to which the diluted solution was added dropwise was 7,000 g, and the deionized water for washing was 1,000 g, thereby obtaining 221.3 g of the perfluoroelastomer.

Analysis of the obtained perfluoroelastomer showed the following results.

Compositional features of perfluoroelastomer: TFE/PMVE/CNVE=58.1/41.3/0.53 mol %

Mooney viscosity: ML 1+20 (170° C.)=71

Glass transition temperature: −3.4° C.

Metal content: 1.6 ppm by mass

The polymerization rate was 46.6 g/(hour×kg), the cumulant average diameter of perfluoroelastomer particles in the aqueous dispersion was 54.6 nm, and the number of perfluoroelastomer particles in the aqueous dispersion was $1.8\times10^{15}$ particles/cc.

To 100 parts by mass of the perfluoroelastomer obtained by carrying out the post-treatment, 2.0 parts by mass of 2,2-bis[3-amino-4-(N-phenylamino)phenyl]hexafluoropropane (AFTA-Ph) as a cross-linking agent and 5 parts by mass of calcium oxide (CML #35, manufactured by Ohmi Chemical Industry Co., Ltd.) as a filler were compounded, and the mixture was kneaded in an open roll to prepare a crosslinkable perfluoroelastomer composition.

The obtained perfluoroelastomer composition was pressed at 200° C. for 40 minutes to carry out crosslinking, and then further subjected to oven crosslinking at 290° C. for 24 hours to produce a crosslinked product with a thickness of 2 mm and an O-ring (P-24). By the following methods, various physical properties of the perfluoroelastomer composition and the crosslinked product were measured. The results are shown in Table 1.

<Crosslinkability>

Concerning the perfluoroelastomer composition, a crosslinking curve at 200° C. was determined using RPA2000 manufactured by ALPHA TECHNOLOGIES, and the minimum torque (ML), the maximum torque (MH), the induction time (T10), and the optimum crosslinking time (T90) were determined.

<Ordinary-State Properties>

Using the crosslinked product with a thickness of 2 mm, the 100% modulus (MPa), the tensile breaking strength (MPa), and the tensile elongation at break (%) were measured in accordance with JIS-K6251.

<Hardness>

Using the crosslinked product with a thickness of 2 mm, the hardness (Shore A) was measured in accordance with JIS-K6253 (peak value).

<Specific Gravity of Crosslinked Product>

Using the crosslinked product with a thickness of 2 mm, the specific gravity of the crosslinked product was measured using an automatic specific gravity meter DMA-220H (manufactured by Shinko Denshi Co., Ltd.).

Furthermore, the compression set of the O-ring (P-24) was measured by the following method. The compression set of the O-ring was 24.4%.

<Compression Set>

The compression set was measured in accordance with the method described in ASTM D395 or JIS K6262. Using a compression apparatus, the O-ring was compressed at ordinary temperature to a compressibility of 25% (the O-ring with a thickness (cross-sectional diameter) of 3.5 mm was compressed to a thickness of 2.625 mm).

Next, the compression apparatus to which the compressed O-ring was fixed was left to stand still in an electric furnace, left at 300° C. for 70 hours, and then the compression apparatus was taken out of the electric furnace. Thereafter, the compression apparatus to which the compressed O-ring was fixed was left to stand still in another electric furnace and left at 70° C. for 24 hours. The O-ring was removed from the compression apparatus, the removed O-ring was left to stand still in a thermostatic chamber at 23° C. for 30 minutes, and the thickness of the O-ring (t2) was measured. The compression set was determined by the following expression. When the compression set is small, it means that the crosslinked product has a low compression set and excellent compression set properties, even after being used under severe conditions.

$$\text{Compression set}(\%)=(t_0-t_2)/(t_0-t_1)\times 100$$

$t_0$: original thickness of O-ring (mm)

$t_1$: thickness of spacer (mm)

$t_2$: thickness of O-ring after compression test (mm)

In the test described above, $t_0$=3.5 mm and $t_1$=2.625 mm.

Example 5

The polymerization was carried out in the same manner as in Example 1, except that the amount of deionized water initially charged was changed to 84.9 g and the amount of the polymer A aqueous solution A-2 (solid concentration: 2.2% by mass) was changed to 110.8 g, respectively, and that the pH was then adjusted to 7.1 by adding aqueous ammonia, thereby obtaining 256 g of an aqueous dispersion with a solid concentration of 21.1% by mass.

The polymerization time was 11.5 hours. The polymer adhering inside the tank was collected and heated to remove moisture, and the amount thereof was 0.5 g and the adhesion rate was 0.8% by mass.

The obtained aqueous dispersion was subjected to the post-treatment in the same manner as in Example 1, thereby obtaining 20.0 g of the perfluoroelastomer.

Analysis of the obtained perfluoroelastomer showed the following results.

Compositional features of perfluoroelastomer: TFE/PMVE/CNVE=57.6/41.8/0.60 mol %

Glass transition temperature: −3.1° C.

The polymerization rate was 24.2 g/(hour×kg), the cumulant average diameter of perfluoroelastomer particles in the aqueous dispersion was 82.3 nm, and the number of perfluoroelastomer particles in the aqueous dispersion was $4.5\times10^{14}$ particles/cc.

Example 6

The polymerization was carried out in the same manner as in Example 1, except that the amount of deionized water initially charged was changed to 128.1 g and the amount of the polymer A aqueous solution A-2 (solid concentration: 2.2% by mass) was changed to 66.5 g, respectively, and that, after the initiation of polymerization, 1.03 g of a 10% aqueous ammonia solution was pressed in with nitrogen when 16.8 g of the mixed monomers were added, thereby obtaining 248 g of an aqueous dispersion with a solid concentration of 19.6% by mass.

The polymerization time was 7.5 hours. The polymer adhering inside the tank was collected and heated to remove moisture, and the amount thereof was 6.3 g and the adhesion rate was 11.5% by mass.

For 100 g of the obtained aqueous dispersion, the post-treatment was carried out in the same manner as in Example 1, except that the deionized water added was 75 g, the 10% aqueous hydrochloric acid solution to which the diluted solution was added dropwise was 500 g, and the deionized water for washing was 100 g, thereby obtaining 19.0 g of the perfluoroelastomer.

Analysis of the obtained perfluoroelastomer showed the following results.

Compositional features of perfluoroelastomer: TFE/PMVE/CNVE=57.7/41.9/0.48 mol %

Glass transition temperature: −3.2° C.

The polymerization rate was 33.4 g/(hour×kg), the cumulant average diameter of perfluoroelastomer particles in the aqueous dispersion was 54.8 nm, and the number of perfluoroelastomer particles in the aqueous dispersion was $1.4\times10^{15}$ particles/cc.

Example 7

(Polymerization of Iodine-Containing Perfluoroelastomer)

In a stainless steel autoclave with an internal volume of 0.5 liters (made of SUS316, equipped with a FULLZONE type stirring blade and one baffle plate) without an ignition source, 113.2 g of deionized water and 101.6 g of the polymer B aqueous solution B-2 (solid concentration: 2.2% by mass) were placed, and the system was then thoroughly purged with nitrogen gas, degassed, and heated to 50° C. while stirring at 1,000 rpm. After charging therein a mixed gas of tetrafluoroethylene (TFE) and perfluoromethyl vinyl ether (PMVE) (TFE/PMVE=25.6/74.4 mol % ratio) such that the internal pressure reached 0.83 MPa·G, 0.0424 g of ammonium persulfate (APS) was dissolved in 1.5 g of deionized water and pressed in with nitrogen to initiate the reaction.

As the polymerization progressed, when the pressure dropped to 0.783 MPa·G, 0.416 g of a diiodine compound $I(CF_2)_4I$ as a chain transfer agent was pressed in along with 1.5 g of deionized water. Then, when the pressure reached 0.735 MPa·G, 2 g of TFE and 1.8 g of PMVE were introduced into the autoclave to raise the pressure. Similarly, as the reaction progressed, TFE and PMVE were pressed in at a ratio of 64.8/35.2 mol %, and the pressure was repeatedly increased and decreased between 0.735 MPa·G and about 0.89 MPa·G. After the initiation of the reaction, 0.00294 g of APS was pressed in with nitrogen every 12 hours along with 1.5 g of deionized water to continue the reaction. When 26.6 g of the mixed monomers were added, 1.54 g of a 10% aqueous ammonia solution was pressed in with nitrogen, and by the completion of polymerization, 44 g of TFE and 39.6 g of PMVE were pressed in.

Thereafter, the autoclave was cooled and the unreacted monomer was released to obtain 298 g of an aqueous dispersion with a solid concentration of 23.8% by mass. The polymerization time was 34.2 hours. After the aqueous dispersion was taken out, the polymer adhering inside the tank was collected and heated to remove moisture, and the amount thereof was 0.5 g and the adhesion rate was 0.7% by mass.

(Post-Treatment of Iodine-Containing Perfluoroelastomer)

For 200 g of the obtained aqueous dispersion, the post-treatment was carried out in the same manner as in Example 1, except that the deionized water added was 150 g, the 10% aqueous hydrochloric acid solution to which the diluted solution was added dropwise was 1,300 g, and the deionized water for washing was 200 g, thereby obtaining 46.6 g of the perfluoroelastomer.

Analysis of the obtained perfluoroelastomer showed the following results.

Compositional features of perfluoroelastomer: TFE/PMVE=61.1/38.9 mol %

Iodine content: 0.19% by mass

Mooney viscosity: ML 1+10 (100° C.)=69

Glass transition temperature: −3.8° C.

Metal content: 3.5 ppm by mass

The polymerization rate was 9.1 g/(hour×kg), the cumulant average diameter of perfluoroelastomer particles in the aqueous dispersion was 119.9 nm, and the number of perfluoroelastomer particles in the aqueous dispersion was $1.7\times10^{14}$ particles/cc.

To 100 parts by mass of the perfluoroelastomer obtained by carrying out the post-treatment, 2.0 parts by mass of triallyl isocyanurate (TAIC, manufactured by Nihon Kasei Co., Ltd.) as a cross-linking agent, 1.0 parts by mass of 2,5-dimethyl-2,5-bis(t-butylperoxy)hexane (PERHEXA 25B, manufactured by NOF Corporation), and 15 parts by mass of carbon black (Thermax N-990, manufactured by Cancarb Ltd.) as a filler were compounded, and the mixture was kneaded in an open roll to prepare a crosslinkable perfluoroelastomer composition.

The obtained perfluoroelastomer composition was pressed at 160° C. for 10 minutes to carry out crosslinking, and then further subjected to oven crosslinking at 180° C. for 4 hours to produce a crosslinked product with a thickness of 2 mm and an O-ring (P-24). In the same manner as in Example 4, various physical properties of the perfluoroelastomer composition and the crosslinked product were measured. The results are shown in Table 1.

Example 8

The polymerization was carried out in the same manner as in Example 1, except that the amount of deionized water initially charged was changed to 46.9 g and the polymer A aqueous solution A-2 was changed to 152.2 g of the polymer C aqueous solution C-2 (solid concentration: 2.8% by mass), respectively, thereby obtaining 253 g of an aqueous dispersion with a solid concentration of 21.8% by mass.

The polymerization time was 9.2 hours. The polymer adhering inside the tank was collected and heated to remove moisture, and the amount thereof was 4.3 g and the adhesion rate was 7.2% by mass.

For 100 g of the obtained aqueous dispersion, the post-treatment was carried out in the same manner as in Example 1, except that the deionized water added was 75 g, the 10% aqueous hydrochloric acid solution to which the diluted solution was added dropwise was 800 g, and the deionized water for washing was 100 g, thereby obtaining 16.6 g of the perfluoroelastomer.

Analysis of the obtained perfluoroelastomer showed the following results.

Compositional features of perfluoroelastomer: TFE/PMVE/CNVE=58.3/41.2/0.51 mol %

Glass transition temperature: −3.0° C.

The polymerization rate was 30.9 g/(hour×kg), the cumulant average diameter of perfluoroelastomer particles in the aqueous dispersion was 105.2 nm, and the number of perfluoroelastomer particles in the aqueous dispersion was $2.3\times10^{14}$ particles/cc.

TABLE 1

| | Example 4 | Example 7 |
|---|---|---|
| Formulation (parts by mass) | | |
| CN group-containing perfluoroelastomer | 100 | |
| Iodine-containing perfluoroelastomer | | 100 |
| AFTA-Ph | 2 | |
| PERHEXA 25B | | 1 |
| TAIC | | 2 |
| Calcium oxide | 5 | |
| MT carbon | | 15 |
| Crosslinkability | | |
| Crosslinking temperature (° C.) | 200 | 160 |
| ML (dNm) | 2.4 | 0.2 |
| MH (dNm) | 13.0 | 12.1 |
| T10 (min) | 6.1 | 1.6 |
| T90 (min) | 24.4 | 4.9 |
| Crosslinking conditions | | |
| Press crosslinking | At 200° C. for 40 minutes | At 160° C. for 30 minutes |
| Oven crosslinking | At 290° C. for 24 hours | At 180° C. for 4 Hours |
| Ordinary-state properties | | |
| 100% modulus (MPa) | 2.0 | 5.7 |
| Tensile breaking strength (MPa) | 14.4 | 14.9 |
| Tensile elongation at break (%) | 244 | 199 |
| Crosslinked product | | |
| Hardness (peak value) | 60.5 | 74.4 |
| Specific gravity | 2.05 | 2.00 |

Preparation Example 4

To a reactor were added 170 g of sodium 1,1,2,2-tetrafluoro-2-((1,2,2-trifluorovinyl)oxy)ethane-1-sulfonate (monomer D), 340 g of water, and ammonium persulfate (APS) in an amount corresponding to 2.0 mol % relative to the amount of the monomer D. The mixture was stirred at 40° C. for 72 hours under $N_2$ flow to obtain a polymer D aqueous solution D-1 containing a polymer D, which is a homopolymer of the monomer D. The oxygen concentration in the reactor varied in the range of 15 ppm by volume to 800 ppm by volume.

As a result of GPC analysis of the obtained polymer D aqueous solution D-1, the polymer D had a Mw of 10,000 and a Mn of 8,000.

300 ml of Amberlite (IR120B(H)-HG) was measured into a container, washed with water until no coloring was observed, and then 500 ml of 1M-HCl was added and the mixture was stirred at room temperature for 1 hour. A column equipped with a cock was filled with Amberlite, and water was allowed to flow until the acidity of the dripping liquid became neutral. The polymer D aqueous solution D-1 was fed into the column equipped with a cock to start dripping. After the completion of dripping, water was allowed to flow until the dripping liquid became neutral to obtain a polymer E aqueous solution E-1 containing a polymer E of 1,1,2,2-tetrafluoro-2-((1,2,2-trifluorovinyl)oxy)ethane-1-sulfonic acid (monomer E). The concentration of the obtained aqueous solution was 1.5% by mass. The polymer E aqueous solution E-1 was analyzed. The polymer E had a Mw of 10,000 and a Mn of 8,000. When this aqueous solution was subjected to DLS analysis, the particle size could not be measured.

Example 9

The polymerization was carried out in the same manner as in Example 1, except that the amount of deionized water initially charged was changed to 63.8 g and the polymer A aqueous solution A-2 was changed to 130.0 g of the polymer E aqueous solution E-1 (solid concentration: 1.5% by mass), respectively, and that the pH was then adjusted to 5.9 by adding aqueous ammonia, thereby obtaining 259 g of an aqueous dispersion with a solid concentration of 22.0% by mass.

The polymerization time was 10.1 hours. The polymer adhering inside the tank was collected and heated to remove moisture, and the amount thereof was 0.4 g and the adhesion rate was 0.7% by mass.

For 100 g of the obtained aqueous dispersion, the post-treatment was carried out in the same manner as in Example 1, except that the deionized water added was 75 g, the 35% aqueous hydrochloric acid solution to which the diluted solution was added dropwise was 750 g, and the deionized water for washing was 100 g, thereby obtaining 20.8 g of the perfluoroelastomer.

Analysis of the obtained perfluoroelastomer showed the following results.

Compositional features of perfluoroelastomer: TFE/PMVE/CNVE=54.0/45.4/0.62 mol %

Glass transition temperature: −6.2° C.

Metal content: 2.2 ppm by mass

The polymerization rate was 29.4 g/(hour×kg), the cumulant average diameter of perfluoroelastomer particles in the aqueous dispersion was 69.5 nm, and the number of perfluoroelastomer particles in the aqueous dispersion was $7.9\times10^{14}$ particles/cc.

Example 10

The polymerization was carried out in the same manner as in Example 7, except that the amount of deionized water initially charged was changed to 65.7 g, the polymer B aqueous solution B-2 was changed to 130.0 g of the polymer E aqueous solution E-1 (solid concentration: 1.5% by mass), the amount of APS pressed in before the initiation of the reaction was changed to 0.141 g, and the amount of APS pressed in every 12 hours was changed to 0.0294 g, respectively, and that the pH was then adjusted to 5.9 by adding aqueous ammonia, thereby obtaining 299 g of an aqueous dispersion with a solid concentration of 23.7% by mass.

The polymerization time was 33.0 hours. The polymer adhering inside the tank was collected and heated to remove moisture, and the amount thereof was 0.47 g and the adhesion rate was 0.7% by mass.

For 200 g of the obtained aqueous dispersion, the post-treatment was carried out in the same manner as in Example 1, except that the deionized water added was 150 g, the 10% aqueous hydrochloric acid solution to which the diluted solution was added dropwise was 1,300 g, and the deionized water for washing was 1,000 g, thereby obtaining 51.2 g of the perfluoroelastomer.

Analysis of the obtained perfluoroelastomer showed the following results.

Compositional features of perfluoroelastomer: TFE/PMVE=61.3/38.7 mol %

Iodine content: 0.18% by mass

Glass transition temperature: −6.7° C.

The polymerization rate was 9.3 g/(hour×kg), the cumulant average diameter of perfluoroelastomer particles in the aqueous dispersion was 129.7 nm, and the number of perfluoroelastomer particles in the aqueous dispersion was $1.3\times10^{14}$ particles/cc.

Example 11

In a stainless steel autoclave with an internal volume of 6 liters (made of SUS316, equipped with a stirring blade and one baffle plate) without an ignition source, 1,383.4 g of deionized water and 1,197.3 g of the polymer B aqueous solution B-2 (solid concentration: 2.2% by mass) were placed, and the system was then thoroughly purged with nitrogen gas, degassed, and heated to 50° C. while stirring at 400 rpm. After charging therein a mixed gas of tetrafluoroethylene (TFE) and perfluoromethyl vinyl ether (PMVE) (TFE/PMVE=25.6/74.4 mol % ratio) such that the internal pressure reached 0.83 MPa·G, 1.277 g of ammonium persulfate (APS) was dissolved in 5.0 g of deionized water and pressed in with nitrogen to initiate the reaction.

As the polymerization progressed, when the pressure reached 0.735 MPa·G, 14 g of TFE and 12 g of PMVE were introduced into the autoclave to raise the pressure, and 5.11 g of a diiodine compound $I(CF_2)_4I$ as a chain transfer agent was pressed in along with 5.0 g of deionized water. Similarly, as the reaction progressed, TFE and PMVE were pressed in at a ratio of 65.9/34.1 mol %, and the pressure was repeatedly increased and decreased between 0.735 MPa·G and about 0.87 MPa·G. After the initiation of the reaction, 0.2394 g of APS was pressed in with nitrogen every 12 hours along with 3.0 g of deionized water to continue the reaction. When 337.8 g of the mixed monomers were added, 18.53 g of a 10% aqueous ammonia solution was pressed in with nitrogen, and by the completion of polymerization, 616 g of TFE and 528 g of PMVE were pressed in. During the polymerization, when the total amount of TFE charged reached 308, 364, 434, and 490 g respectively, 2.08 g of 1,1,2,2-tetrafluoro-3-iodo-1-((1,2,2-trifluorovinyl)oxy)propane was pressed in with nitrogen four times along with 1.5 g of deionized water.

Thereafter, the autoclave was cooled and the unreacted monomer was released to obtain 3,773.7 g of an aqueous dispersion with a solid concentration of 29.8% by mass. The polymerization time was 52.7 hours. After the aqueous dispersion was taken out, the polymer adhering inside the tank was collected and heated to remove moisture, and the amount thereof was 0.7 g and the adhesion rate was 0.06% by mass.

For 200 g of the obtained aqueous dispersion, the post-treatment was carried out in the same manner as in Example 1, except that the deionized water added was 150 g, the 10% aqueous hydrochloric acid solution to which the diluted solution was added dropwise was 1,300 g, and the deionized water for washing was 200 g, thereby obtaining 56.8 g of the perfluoroelastomer.

Analysis of the obtained perfluoroelastomer showed the following results.

Iodine content: 0.44% by mass

Mooney viscosity: ML 1+10 (100° C.)=61.1

Glass transition temperature: −1.4° C.

The polymerization rate was 8.3 g/(hour×kg), the cumulant average diameter of perfluoroelastomer particles in the aqueous dispersion was 119.1 nm, and the number of perfluoroelastomer particles in the aqueous dispersion was $2.3\times10^{14}$ particles/cc.

Example 12

The polymerization was carried out in the same manner as in Example 11, except that the amount of deionized water initially charged was changed to 831.8 g, the polymer B aqueous solution B-2 was changed to 1,756.1 g of the polymer E aqueous solution E-1 (solid concentration: 1.5% by mass), the amount of APS pressed in before the initiation of the reaction was changed to 4.257 g, and the amount of APS pressed in every 12 hours was changed to 0.798 g, respectively, and that the pH was then adjusted to 5.9 by adding aqueous ammonia, thereby obtaining 3,776.4 g of an aqueous dispersion with a solid concentration of 29.8% by mass.

The polymerization time was 30.0 hours. The polymer adhering inside the tank was collected and heated to remove moisture, and the amount thereof was 0.1 g and the adhesion rate was 0.01% by mass.

For 200 g of the obtained aqueous dispersion, the post-treatment was carried out in the same manner as in Example 1, except that the deionized water added was 150 g, the 10% aqueous hydrochloric acid solution to which the diluted solution was added dropwise was 1,300 g, and the deionized water for washing was 200 g, thereby obtaining 56.4 g of the perfluoroelastomer.

Analysis of the obtained perfluoroelastomer showed the following results.

Compositional features of perfluoroelastomer: TFE/PMVE=64.1/35.9 mol %

Iodine content: 0.43% by mass

Mooney viscosity: ML 1+10 (100° C.)=57.5

Glass transition temperature: −3.1° C.

The polymerization rate was 14.7 g/(hour×kg), the cumulant average diameter of perfluoroelastomer particles in the aqueous dispersion was 116.2 nm, and the number of perfluoroelastomer particles in the aqueous dispersion was $2.5\times10^{14}$ particles/cc.

Preparation Example 5

To a reactor were added 6.8 g of the monomer D represented by sodium 1,1,2,2-tetrafluoro-2-((1,2,2-trifluorovinyl)oxy)ethane-1-sulfonate, 34 g of water, and ammonium persulfate (APS) in an amount corresponding to 1.5 mol % relative to the amount of sodium 1,1,2,2-tetrafluoro-2-((1,2,2-trifluorovinyl)oxy)ethane-1-sulfonate. After purging with $N_2$ and degassing, 3.2 g of VdF was introduced, and the mixture was stirred at 60° C. for 2 hours under sealed conditions to obtain a polymer F aqueous solution F-1 containing a polymer F, which is a copolymer of the monomer D and VdF. After heating, the internal pressure of the reactor increased to 0.30 MPaG, and decreased to 0.19 MPaG as the reaction took place. Water was added to the obtained aqueous solution F-1 containing a polymer F to adjust the concentration to 2.65% by mass (polymer F aqueous solution F-2).

When the obtained polymer F aqueous solution F-2 was analyzed by NMR to examine the compositional features of the polymer, the molar ratio between the polymerization unit based on the monomer D and the polymerization unit based on the VdF contained in the polymer was 1.0/1.0. Also, the alternation ratio between the polymerization unit based on the monomer D and the polymerization unit based on VdF in the polymer F was 76% or more. The obtained polymer F had a weight average molecular weight (Mw) of $15.3\times10^4$ and a number average molecular weight (Mn) of $7.2\times10^4$.

Example 13

The polymerization was carried out in the same manner as in Example 1, except that the amount of deionized water initially charged was changed to 118.8 g and the polymer A aqueous solution A-2 was changed to 78.0 g of the polymer F aqueous solution F-2 (solid concentration: 2.65% by mass), respectively, thereby obtaining 252 g of an aqueous dispersion with a solid concentration of 20.8% by mass.

The polymerization time was 5.3 hours. The polymer adhering inside the tank was collected and heated to remove moisture, and the amount thereof was 4.0 g and the adhesion rate was 7.7% by mass.

For 100 g of the obtained aqueous dispersion, the post-treatment was carried out in the same manner as in Example 1, except that the deionized water added was 75 g, the 10% aqueous hydrochloric acid solution to which the diluted solution was added dropwise was 700 g, and the deionized water for washing was 100 g, thereby obtaining 19.1 g of the perfluoroelastomer.

Analysis of the obtained perfluoroelastomer showed the following results.

Compositional features of perfluoroelastomer: TFE/PMVE/CNVE=57.1/42.5/0.38 mol %

Glass transition temperature: −5.4° C.

The polymerization rate was 50.3 g/(hour×kg), the cumulant average diameter of perfluoroelastomer particles in the aqueous dispersion was 42.0 nm, and the number of perfluoroelastomer particles in the aqueous dispersion was $3.4\times10^{14}$ particles/cc.

The invention claimed is:

1. A method for producing a perfluoroelastomer aqueous dispersion by polymerizing a perfluoromonomer in the presence of a polymer (1) and an aqueous medium to produce an aqueous dispersion of a perfluoroelastomer, the polymer (1) containing a polymerization unit (1) based on a monomer (1) represented by a general formula (1) and the polymer (1) having an ion exchange capacity of 1.50 meq/g or more:

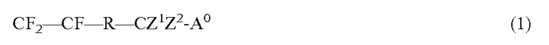

$$CF_2{=}CF{-}R{-}CZ^1Z^2{-}A^0 \quad (1)$$

wherein R is a linking group; $Z^1$ and $Z^2$ are each independently F or $CF_3$; and $A^0$ is an anionic group, wherein the perfluoroelastomer is a fluoropolymer having a perfluoromonomer unit content of 90 mol % or more based on all polymerization units, a glass transition temperature of 20° C. or lower, a melting peak (ΔH) of 4.5 J/g or lower, and a fluorine atom concentration in the fluoropolymer of 71% by mass or more.

2. The production method according to claim 1, wherein $A^0$ is —COOM or —$SO_3M$, where M is H, a metal atom, $NR^7_4$, imidazolium, pyridinium, or phosphonium and $R^7$ is H or an organic group.

3. The production method according to claim 1, wherein the monomer (1) is a monomer (2) represented by a general formula (2):

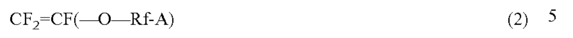
$CF_2$=CF(—O—Rf-A) (2)

wherein Rf is a fluorine-containing alkylene group having 1 to 40 carbon atoms or a fluorine-containing alkylene group having 2 to 100 carbon atoms and having an ether bond or a keto group; and A is-COOM, —$SO_3$M, —$OSO_3$M, or —C($CF_3$)$_2$OM, where M is H, a metal atom, $NR^7_4$, imidazolium, pyridinium, or phosphonium and $R^7$ is H or an organic group.

4. The production method according to claim 3, wherein A is —COOM or —$SO_3$M, where M is H, a metal atom, $NR^7_4$, imidazolium, pyridinium, or phosphonium and $R^7$ is H or an organic group.

5. The production method according to claim 1, wherein the polymer (1) has a weight average molecular weight of $1.4\times10^4$ or more.

6. The production method according to claim 1, wherein a content of the polymerization unit (1) is 50 mol % or more based on all polymerization units constituting the polymer (1).

7. The production method according to claim 1, wherein the polymer (1) is added in an amount of 0.01 to 20% by mass based on 100% by mass of the aqueous medium.

8. The production method according to claim 1, wherein the polymerization of the perfluoromonomer is carried out substantially in the absence of a fluorine-containing surfactant.

9. The production method according to claim 1, wherein the polymerization of the perfluoromonomer is carried out in the presence of a pH adjuster.

10. The production method according to claim 1, wherein the polymerization of the perfluoromonomer is carried out in the presence of a polymerization initiator and the polymerization initiator is added in an amount of 0.0001 to 10% by mass based on 100% by mass of the perfluoromonomer.

11. A method for producing a crosslinkable composition, comprising obtaining an aqueous dispersion of a perfluoroelastomer by the production method according to claim 1, and then mixing the aqueous dispersion or the perfluoroelastomer obtained by recovering the perfluoroelastomer from the aqueous dispersion with at least one selected from the group consisting of an inorganic nitride, an organotin compound, an ammonia-generating compound, and a cross-linking agent, to provide a crosslinkable composition.

12. A method for producing a crosslinked product, comprising obtaining a crosslinkable composition by the production method according to claim 11, and then crosslinking the crosslinkable composition to provide a crosslinked product.

13. A composition comprising a perfluoroelastomer and a polymer (1) containing a polymerization unit (1) based on a monomer (1) represented by a general formula (1) and having an ion exchange capacity of 1.50 meq/g or more:

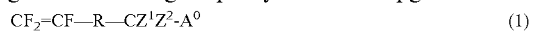
$CF_2$=CF—R—C$Z^1Z^2$-$A^0$ (1)

wherein R is a linking group; $Z^1$ and $Z^2$ are each independently F or $CF_3$; and $A^0$ is an anionic group, wherein the perfluoroelastomer is a fluoropolymer having a perfluoromonomer unit content of 90 mol % or more based on all polymerization units, a glass transition temperature of 20° C. or lower, a melting peak (ΔH) of 4.5 J/g or lower, and a fluorine atom concentration in the fluoropolymer of 71% by mass or more.

14. The composition according to claim 13, wherein $A^0$ is-COOM or —$SO_3$M, where M is H, a metal atom, $NR^7_4$, imidazolium, pyridinium, or phosphonium and $R^7$ is H or an organic group.

15. The composition according to claim 13, wherein the monomer (1) is a monomer (2) represented by a general formula (2):

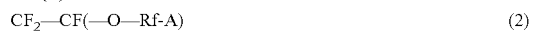
$CF_2$—CF(—O—Rf-A) (2)

wherein Rf is a fluorine-containing alkylene group having 1 to 40 carbon atoms or a fluorine-containing alkylene group having 2 to 100 carbon atoms and having an ether bond or a keto group; and A is —COOM, —$SO_3$M, —$OSO_3$M, or —C($CF_3$)$_2$OM, where M is H, a metal atom, $NR^7_4$, imidazolium, pyridinium, or phosphonium and $R^7$ is H or an organic group.

16. The composition according to claim 15, wherein A is-COOM or —$SO_3$M, where M is H, a metal atom, $NR^7_4$, imidazolium, pyridinium, or phosphonium and $R^7$ is H or an organic group.

17. The composition according to claim 13, wherein the polymer (1) has a weight average molecular weight of $1.4\times10^4$ or more.

18. The composition according to claim 13, wherein a content of the polymerization unit (1) is 50 mol % or more based on all polymerization units constituting the polymer (1).

19. The composition according to claim 13, wherein a content of the polymer (1) is 0.0001 to 20% by mass based on the perfluoroelastomer.

20. The composition according to claim 13, wherein the composition is substantially free from a fluorine-containing surfactant.

21. The composition according to claim 13, wherein the composition is an aqueous dispersion.

22. The composition according to claim 21, wherein a solid concentration of the aqueous dispersion is 5 to 50% by mass based on the aqueous dispersion.

23. A crosslinkable composition comprising the composition according to claim 13 and at least one selected from the group consisting of an inorganic nitride, an organotin compound, an ammonia-generating compound, and a crosslinking agent.

24. A crosslinked product obtained by crosslinking the crosslinkable composition according to claim 23.

* * * * *